United States Patent
Srinivasan et al.

(10) Patent No.: US 9,276,942 B2
(45) Date of Patent: Mar. 1, 2016

(54) MULTI-TENANCY IDENTITY MANAGEMENT SYSTEM

(71) Applicant: Oracle International Corporation, Redwood Shores, CA (US)

(72) Inventors: Uppili Srinivasan, Fremont, CA (US); Vasukiammaiyar Asokkumar, Sunnyvale, CA (US)

(73) Assignee: Oracle International Corporation, Redwood Shores, CA (US)

(*) Notice: Subject to any disclaimer, the term of this patent is extended or adjusted under 35 U.S.C. 154(b) by 90 days.

(21) Appl. No.: 13/838,813

(22) Filed: Mar. 15, 2013

(65) Prior Publication Data
US 2014/0075565 A1 Mar. 13, 2014

Related U.S. Application Data

(60) Provisional application No. 61/698,463, filed on Sep. 7, 2012, provisional application No. 61/698,413, filed on Sep. 7, 2012, provisional application No. 61/698,459, filed on Sep. 7, 2012, provisional application No. 61/785,299, filed on Mar. 14, 2013.

(51) Int. Cl.
*H04L 29/06* (2006.01)

(52) U.S. Cl.
CPC ............. *H04L 63/104* (2013.01); *H04L 63/10* (2013.01)

(58) Field of Classification Search
CPC .................................................... H04L 63/104
See application file for complete search history.

(56) References Cited

U.S. PATENT DOCUMENTS

| | | | |
|---|---|---|---|
| 6,052,684 A | 4/2000 | Du | |
| 6,085,188 A | 7/2000 | Bachmann et al. | |

(Continued)

FOREIGN PATENT DOCUMENTS

| | | |
|---|---|---|
| WO | WO2010/149222 | 12/2010 |
| WO | 2014039772 | 3/2014 |

(Continued)

OTHER PUBLICATIONS

An Introduction to Role-Based Access Control, NIST/ITL Bulletin, Retrieved from the Internet: URL: http://csrc.nist.gov/groups/SNS/rbac/documents/design_implementation/Intro_role_based_access.htm on Oct. 22, 2013, Dec. 1995, 5 pages.

(Continued)

*Primary Examiner* — Victor Lesniewski
(74) *Attorney, Agent, or Firm* — Kilpatrick Townsend and Stockton LLP

(57) ABSTRACT

A multi-tenant identity management (IDM) system enables IDM functions to be performed relative to various different customers' domains within a shared cloud computing environment and without replicating a separate IDM system for each separate domain. The IDM system can provide IDM functionality to service instances located within various different customers' domains while enforcing isolation between those domains. A cloud-wide identity store can contain identity information for multiple customers' domains, and a cloud-wide policy store can contain security policy information for multiple customers' domains. The multi-tenant IDM system can provide a delegation model in which a domain administrator can be appointed for each domain, and in which each domain administrator can delegate certain roles to other user identities belong to his domain. Service instance-specific administrators can be appointed by a domain administrator to administer to specific service instances within a domain.

18 Claims, 32 Drawing Sheets

(56) References Cited

U.S. PATENT DOCUMENTS

| | | | |
|---|---|---|---|
| 6,236,988 B1 | 5/2001 | Aldred | |
| 6,516,416 B2 | 2/2003 | Gregg et al. | |
| 6,526,513 B1 | 2/2003 | Shrader et al. | |
| 6,553,364 B1 | 4/2003 | Wu | |
| 7,031,967 B2* | 4/2006 | Cheng et al. | |
| 7,051,039 B1 | 5/2006 | Murthy et al. | |
| 7,130,839 B2* | 10/2006 | Boreham et al. | |
| 7,136,867 B1 | 11/2006 | Chatterjee et al. | |
| 7,290,288 B2 | 10/2007 | Gregg et al. | |
| 7,571,473 B1* | 8/2009 | Boydstun | G06F 21/41 726/21 |
| 7,664,866 B2 | 2/2010 | Wakefield | |
| 7,953,896 B2* | 5/2011 | Ward et al. | 709/252 |
| 7,992,194 B2 | 8/2011 | Damodaran et al. | |
| 8,095,629 B2* | 1/2012 | Ward et al. | 709/221 |
| 8,151,323 B2 | 4/2012 | Harris et al. | |
| 8,214,747 B1* | 7/2012 | Yankovich et al. | 715/751 |
| 8,266,616 B1 | 9/2012 | Jacquot et al. | |
| 8,387,136 B2* | 2/2013 | Lee et al. | 726/20 |
| 8,387,137 B2* | 2/2013 | Lee et al. | 726/20 |
| 8,402,514 B1* | 3/2013 | Thompson et al. | 726/4 |
| 8,434,129 B2* | 4/2013 | Kannappan et al. | 726/3 |
| 8,572,602 B1 | 10/2013 | Colton et al. | |
| 8,631,477 B2* | 1/2014 | Chen et al. | 726/6 |
| 8,631,478 B2* | 1/2014 | Chen et al. | 726/6 |
| 8,769,622 B2* | 7/2014 | Chang et al. | 726/4 |
| 8,769,704 B2* | 7/2014 | Peddada et al. | 726/28 |
| 8,789,157 B2* | 7/2014 | Sinn | 726/7 |
| 8,843,997 B1 | 9/2014 | Hare | |
| 2002/0004390 A1 | 1/2002 | Cutaia et al. | |
| 2002/0059210 A1 | 5/2002 | Makus et al. | |
| 2002/0095395 A1 | 7/2002 | Larson et al. | |
| 2004/0215610 A1 | 10/2004 | Dixon et al. | |
| 2005/0086239 A1* | 4/2005 | Swann et al. | 707/100 |
| 2005/0144033 A1* | 6/2005 | Vreeke et al. | 705/1 |
| 2005/0273346 A1* | 12/2005 | Frost | 705/1 |
| 2006/0059539 A1 | 3/2006 | Shashikumar et al. | |
| 2006/0143704 A1 | 6/2006 | Rits et al. | |
| 2006/0277595 A1 | 12/2006 | Kinser et al. | |
| 2007/0005536 A1 | 1/2007 | Caswell et al. | |
| 2007/0028098 A1 | 2/2007 | Baartman et al. | |
| 2007/0055602 A1 | 3/2007 | Mohn | |
| 2007/0169168 A1 | 7/2007 | Lim | |
| 2007/0282942 A1 | 12/2007 | Bailey et al. | |
| 2007/0283147 A1 | 12/2007 | Fried et al. | |
| 2008/0080718 A1* | 4/2008 | Meijer et al. | 380/282 |
| 2008/0083036 A1* | 4/2008 | Ozzie et al. | 726/27 |
| 2008/0089520 A1 | 4/2008 | Keszler | |
| 2008/0133533 A1* | 6/2008 | Ganugapati | G06F 21/45 |
| 2008/0147584 A1 | 6/2008 | Buss | |
| 2008/0189250 A1 | 8/2008 | Cha et al. | |
| 2008/0313716 A1* | 12/2008 | Park | 726/4 |
| 2009/0024522 A1 | 1/2009 | Reunert et al. | |
| 2009/0089407 A1 | 4/2009 | Chalupa et al. | |
| 2009/0097657 A1* | 4/2009 | Scheidt et al. | 380/277 |
| 2009/0126007 A1* | 5/2009 | Zamberlan et al. | 726/19 |
| 2009/0144729 A1* | 6/2009 | Guizar | 717/176 |
| 2009/0178102 A1 | 7/2009 | Alghathbar et al. | |
| 2009/0205018 A1 | 8/2009 | Ferraiolo et al. | |
| 2009/0217267 A1 | 8/2009 | Gebhart et al. | |
| 2009/0240728 A1 | 9/2009 | Shukla et al. | |
| 2009/0259683 A1 | 10/2009 | Murty | |
| 2009/0265753 A1 | 10/2009 | Anderson et al. | |
| 2009/0320093 A1 | 12/2009 | Glazier et al. | |
| 2010/0125477 A1* | 5/2010 | Mousseau et al. | 705/7 |
| 2010/0145718 A1 | 6/2010 | Elmore et al. | |
| 2010/0191774 A1 | 7/2010 | Masaon et al. | |
| 2010/0306818 A1 | 12/2010 | Li et al. | |
| 2010/0333116 A1 | 12/2010 | Prahlad et al. | |
| 2011/0023107 A1* | 1/2011 | Chen | H04L 63/0281 726/12 |
| 2011/0040793 A1 | 2/2011 | Davidson et al. | |
| 2011/0053555 A1 | 3/2011 | Cai et al. | |
| 2011/0112939 A1 | 5/2011 | Nelson et al. | |
| 2011/0126207 A1 | 5/2011 | Wipfel et al. | |
| 2011/0131146 A1* | 6/2011 | Skutnik | 705/321 |
| 2011/0138051 A1 | 6/2011 | Dawson et al. | |
| 2011/0145199 A1 | 6/2011 | Prasad | |
| 2011/0277016 A1* | 11/2011 | Hockings | G06F 21/41 726/4 |
| 2011/0296018 A1 | 12/2011 | Deng et al. | |
| 2011/0307523 A1 | 12/2011 | Balani et al. | |
| 2011/0313902 A1 | 12/2011 | Liu et al. | |
| 2011/0314466 A1 | 12/2011 | Berg et al. | |
| 2012/0005341 A1 | 1/2012 | Seago et al. | |
| 2012/0079134 A1 | 3/2012 | Outhred et al. | |
| 2012/0131194 A1 | 5/2012 | Morgan | |
| 2012/0136936 A1 | 5/2012 | Quintuna | |
| 2012/0221454 A1 | 8/2012 | Morgan | |
| 2012/0226796 A1 | 9/2012 | Morgan | |
| 2012/0226808 A1 | 9/2012 | Morgan | |
| 2012/0233220 A1* | 9/2012 | Kaschenvsky et al. | 707/803 |
| 2012/0284776 A1* | 11/2012 | Sundaram | G06F 21/6218 726/4 |
| 2012/0297441 A1 | 11/2012 | Boldyrev et al. | |
| 2012/0304191 A1 | 11/2012 | Morgan | |
| 2012/0311154 A1 | 12/2012 | Morgan | |
| 2013/0014107 A1 | 1/2013 | Kirchhofer | |
| 2013/0019276 A1* | 1/2013 | Biazetti | H04L 65/40 726/1 |
| 2013/0047230 A1* | 2/2013 | Krishnan et al. | 726/7 |
| 2013/0061306 A1* | 3/2013 | Sinn | H04L 67/10 726/7 |
| 2013/0086060 A1 | 4/2013 | Donley et al. | |
| 2013/0086065 A1 | 4/2013 | Sharma et al. | |
| 2013/0086210 A1 | 4/2013 | Yiu et al. | |
| 2013/0086211 A1 | 4/2013 | Sondhi et al. | |
| 2013/0086628 A1 | 4/2013 | Kottahachchi et al. | |
| 2013/0086639 A1 | 4/2013 | Sondhi et al. | |
| 2013/0086658 A1 | 4/2013 | Kottahachchi et al. | |
| 2013/0086669 A1 | 4/2013 | Sondhi et al. | |
| 2013/0204994 A1 | 8/2013 | Deshmukh et al. | |
| 2013/0212160 A1 | 8/2013 | Lawson et al. | |
| 2013/0212420 A1 | 8/2013 | Lawson et al. | |
| 2013/0254882 A1 | 9/2013 | Kannappan et al. | |
| 2013/0268480 A1 | 10/2013 | Dorman | |
| 2013/0268491 A1 | 10/2013 | Chung et al. | |
| 2013/0275509 A1 | 10/2013 | Micucci et al. | |
| 2013/0290710 A1* | 10/2013 | Broder et al. | 713/168 |
| 2013/0298212 A1 | 11/2013 | Shah et al. | |
| 2013/0318241 A1 | 11/2013 | Acharya et al. | |
| 2013/0332984 A1 | 12/2013 | Sastry et al. | |
| 2013/0332985 A1 | 12/2013 | Sastry et al. | |
| 2014/0020054 A1 | 1/2014 | Lim | |
| 2014/0059002 A1 | 2/2014 | Lockhart et al. | |
| 2014/0074539 A1 | 3/2014 | Doering et al. | |
| 2014/0074540 A1 | 3/2014 | Evans et al. | |
| 2014/0074544 A1 | 3/2014 | Seetharam et al. | |
| 2014/0074659 A1 | 3/2014 | Chatterjee et al. | |
| 2014/0074788 A1 | 3/2014 | Chatterjee et al. | |
| 2014/0074793 A1 | 3/2014 | Doering et al. | |
| 2014/0074999 A1 | 3/2014 | Khalsa et al. | |
| 2014/0075016 A1 | 3/2014 | Chatterjee et al. | |
| 2014/0075027 A1 | 3/2014 | Chatterjee et al. | |
| 2014/0075031 A1 | 3/2014 | Doering et al. | |
| 2014/0075032 A1 | 3/2014 | Vasudevan et al. | |
| 2014/0075033 A1 | 3/2014 | Doering et al. | |
| 2014/0075034 A1 | 3/2014 | Vasudevan et al. | |
| 2014/0075239 A1 | 3/2014 | Prathipati et al. | |
| 2014/0075499 A1 | 3/2014 | Arun et al. | |
| 2014/0075501 A1 | 3/2014 | Srinivasan et al. | |
| 2014/0141743 A1 | 5/2014 | Shaw | |
| 2014/0143083 A1 | 5/2014 | Prathipati et al. | |
| 2014/0280943 A1 | 9/2014 | Bobrov et al. | |
| 2015/0074279 A1 | 3/2015 | Maes et al. | |

FOREIGN PATENT DOCUMENTS

| | | |
|---|---|---|
| WO | 2014039882 | 3/2014 |
| WO | 2014039918 | 3/2014 |

(56) References Cited

FOREIGN PATENT DOCUMENTS

| WO | 2014039919 | 3/2014 |
|---|---|---|
| WO | 2014039921 | 3/2014 |

OTHER PUBLICATIONS

Oracle Internet Directory Administrator's Guide: Introduction to LDAP and Oracle Internet Directory, Oracle, 10g Release 2, B14082-02, Retrieved from the Internet: URL: http://docs.oracle.com/cd/B14099_19/idmanage.1012/b14082/intro.htm on Oct. 1, 2013, 1999, 9 pages.

XACML v3.0 Hierarchical Resource Profile Version 1.0, Oasis, Working Draft 7, Retrieved from the Internet: URL: http://xml.coverpages.org/XACML-v30-HierarchicalResourceProfile-WD7.pdf on Aug. 29, 2013, Apr. 1, 2009, 22 pages.

U.S. Appl. No. 13/485,372, Non-Final Office Action, mailed Feb. 28, 2013, 14 pages.

Anthony et al., "Consolidation Best Practices: Oracle Database 12c plugs you into the cloud", Oracle White Paper, Retrieved from the Internet: URL: http://www.oracle.com/us/products/database/database-private-cloud-wp-360048.pdf on Oct. 1, 2013, Jul. 2013, 30 pages.

Bierman et al., "Network Configuration Protocol (NETCONF) Access Control Model", Internet Engineering Task Force, RFC 6536, Retrieved from the Internet: URL: http://tools.ietf.org/html/rfc6536 on Aug. 29, 2013, Mar. 2012, 50 pages.

Chanliau et al., "Oracle Fusion Middleware: Oracle Platform Security Services (OPSS) FAQ", Oracle, Retrieved from the Internet: URL: http://www.oracle.com/technetwork/testcontent/opss-faq-131489.pdf on Oct. 1, 2013, Jul. 2010, 6 pages.

Chiba et al., "Dynamic Authorization Extension to Remote Authentication Dial in User Service (RADIUS)", Network Working Group, RFC 5176, Retrieved from the Internet: URL: http://tools.ietf.org/html/rfc5176 on Aug. 29, 2013, Jan. 2008, 35 pages.

Clemm et al., "Web Distributed Authoring and Versioning (WebDAV) Access Control Protocol", Network Working Group, RFC 3744, Retrieved from the Internet: URL: http://www.ietf.org/rfc/rfc3744.txt on Aug. 29, 2013, May 2004, 66 pages.

Datta et al., "Oracle Fusion Middleware Developer's Guide for Oracle Identity Manager", Oracle, 11g Release 2, E27150-08, Retrieved from the Internet: URL: http://docs.oracle.com/cd/E37115_01/dev.1112/e27150/toc.htm on Oct. 1, 2013, Sep. 2013, 1102 pages.

International Patent Application No. PCT/US2013/058426, International Search Report and Written Opinion, mailed Nov. 8, 2013, 9 pages.

Subi et al., "Oracle Fusion Middleware Application Security Guide", Oracle, 11g Release 1, E10043-09, Retrieved from the Internet: URL: http://docs.oracle.com/cd/E21764_01/core.1111/e10043/underjps.htm on Oct. 1, 2013, May 2011, 834 pages.

Teger et al., "Oracle Fusion Middleware Developer's Guide for Oracle Access Management", Oracle, 11g Release 2, E27134-06, Retrieved from the Internet: URL: http://docs.oracle.com/cd/E37115_01/dev.1112/e27134/toc.htm on Oct. 1, 2013, Jul. 2013, 372 pages.

Teger, "Oracle Fusion Middleware Developer's Guide for Oracle Entitlements Server", Oracle, 11 g Release 1, E27154-01, Retrieved from the Internet: URL: http://docs.oracle.com/cd/E27559_01/dev.1112/e27154/handle_auth_calls.htm on Oct. 1, 2013, Jul. 2012, 132 pages.

International Patent Application No. PCT/US2013/058639, International Search Report and Written Opinion, mailed Jan. 8, 2014, 10 pages.

International Patent Application No. PCT/US2013/058642, International Search Report and Written Opinion, mailed Feb. 7, 2014, 17 pages.

International Patent Application No. PCT/US2013/058638, International Search Report and Written Opinion, mailed Jan. 8, 2014, 11 pages.

International Patent Application No. PCT/US2013/058596, International Search Report and Written Opinion, mailed Nov. 22, 2013, 9 pages.

"Basic Traversals," The Neo4J Manual, Neo Technology, Inc. (copyright 2012) 7 pages.

"LDAP Authentication Overview," Juniper Networks, Inc. (copyright 1999-2010) 4 pages.

"Using ldapsearch managing " *Red Hat Directory Server 8.2 Administration Guide for managing Directory Server instances Edition 8.2.8*, Red Hat, Inc. (copyright 2010) 3 pages.

Afgan et al. "CloudMan as a Tool Execution Framework for the Cloud ," IEEE Proceedings of the 35th International Convention on Information and Communication Technology, Electronics and Microelectronics (MIPRO 2012), pp. 437-441 (2012).

Bastos et al. "Towards a Cloud-Based Environment for Space Systems Concept Design ," IEEE International Conference on Information Society (I-SOCIETY), pp. 478-483 (2012).

Hunter "LDAP Searching—Setting the SCOPE Parameters," available at http://www.idevelopment.info/data/LDAP/LDAP_Resources/SEARCH_Setting_the_SCOPE_Parameter.shtml (copyright 1998-2013) 2 pages.

Paul et al. "Architectures for the future networks and the next generation Internet: A survey ," Computer Communications 34:2-42 (2011).

Demarest et al., Oracle Cloud Computing, an Oracle White Paper, Oracle Corporation, Redwood Shores, CA, May 2010, 22 pages.

U.S. Appl. No. 13/842,269, Non Final Office Action mailed on Jun. 5, 2014, 12 pages.

International Application No. PCT/US2013/058642, Invitation to restrict or pay additional fees mailed on Jul. 23, 2014, 3 pages.

U.S. Appl. No. 13/838,113, Non-Final Office Action mailed on Aug. 28, 2014, 14 pages.

U.S. Appl. No. 13/838,537, Non-Final Office Action mailed on Sep. 11, 2014, 22 pages.

International Application. No. PCT/US2013/058426, Written Opinion mailed on Aug. 19, 2014, 7 pages.

International Application. No. PCT/US2013/058596, Written Opinion mailed on Aug. 19, 2014, 6 pages.

International Application. No. PCT/US2013/058642, Written Opinion mailed on Sep. 11, 2014, 8 pages.

International Application No. PCT/US2013/058426, International Preliminary Report on Patentability mailed on Dec. 5, 2014, 6 pages.

International Application No. PCT/US2013/058596, International Preliminary Report on Patentability mailed on Dec. 5, 2014, 6 pages.

U.S. Appl. No. 13/840,943, Non-Final Office Action mailed on Dec. 18, 2014, 10 pages.

U.S. Appl. No. 13/842,269, Notice of Allowance mailed on Nov. 3, 2014, 8 pages.

U.S. Appl. No. 13/842,833, Notice of Allowance mailed on Dec. 15, 2014, 11 pages.

U.S. Appl. No. 13/907,689, Non-Final Office Action mailed on Jan. 7, 2015, 11 pages.

U.S. Appl. No. 14/019,051, Non-Final Office Action mailed on Nov. 20, 2014, 5 pages.

Emig et al., An Access Control Metamodel for Web Service-Oriented Architecture, IEEE, 2007, pp. 1-8.

Jahid et al., MyABDAC: Compiling XACML Policies for Attribute-Based Database Access Control, ACM, Feb. 23, 2011, pp. 97-108.

Kagal et al., A Policy Language for a Pervasive Computing Environment, Proceedings of the 4th IEEE International Workshop on Policies for Distributed Systems and Networks, 2003, pp. 63-74.

Koved et al., Access Rights Analysis for Java, Proceedings of the 17th ACM SIGPLAN conference on Object-oriented programming, systems, languages, and applications, 2002, pp. 359-372.

U.S. Appl. No. 13/838,113, Notice of Allowance mailed on Feb. 23, 2015, 15 pages.

U.S. Appl. No. 13/838,537, Notice of Allowance mailed on Feb. 4, 2015, 19 pages.

U.S. Appl. No. 14/019,051, Notice of Allowance mailed on Feb. 27, 2015, 7 pages.

(56) References Cited

OTHER PUBLICATIONS

International Application No. PCT/US2013/058638, International Preliminary Report on Patentability mailed on Jun. 12, 2015, 8 pages.
Haslam, Virtualisation arrives for Exa logic 2—Details from Launch Event, http://www.veriton.co.uk!roller/fmw/entry/exalogic_2_details_from_launch, Jul. 26, 2012.
Ranganathan, Architecting the Oracle VM solution using the Oracle Sun ZFS Storage Appliances and Oracle Sun Servers, http://www.oracle.com/technetwork/articles/systems-hardware-architecture/vm-solution-using-zfs-storage-174070.pdf, Sep. 2010.

U.S. Appl. No. 13/835,307, Notice of Allowance mailed on Jul. 7, 2015, 5 pages.
U.S. Appl. No. 13/836,625, Non-Final Office Action mailed on Jun. 19, 2015, 41 pages.
U.S. Appl. No. 13/844,018, Non-Final Office Action mailed on Jun. 11, 2015, 27 pages.
U.S. Appl. No. 13/907,689, Final Office Action mailed on May 21, 2015, 12 pages.
U.S. Appl. No. 13/907,728, Non-Final Office Action mailed on Jul. 2, 2015, 14 pages.

\* cited by examiner

302
CLOUD SECURITY FOUNDATION

304
CLOUD SHARED IDM

306
ORACLE IDM/SECURITY

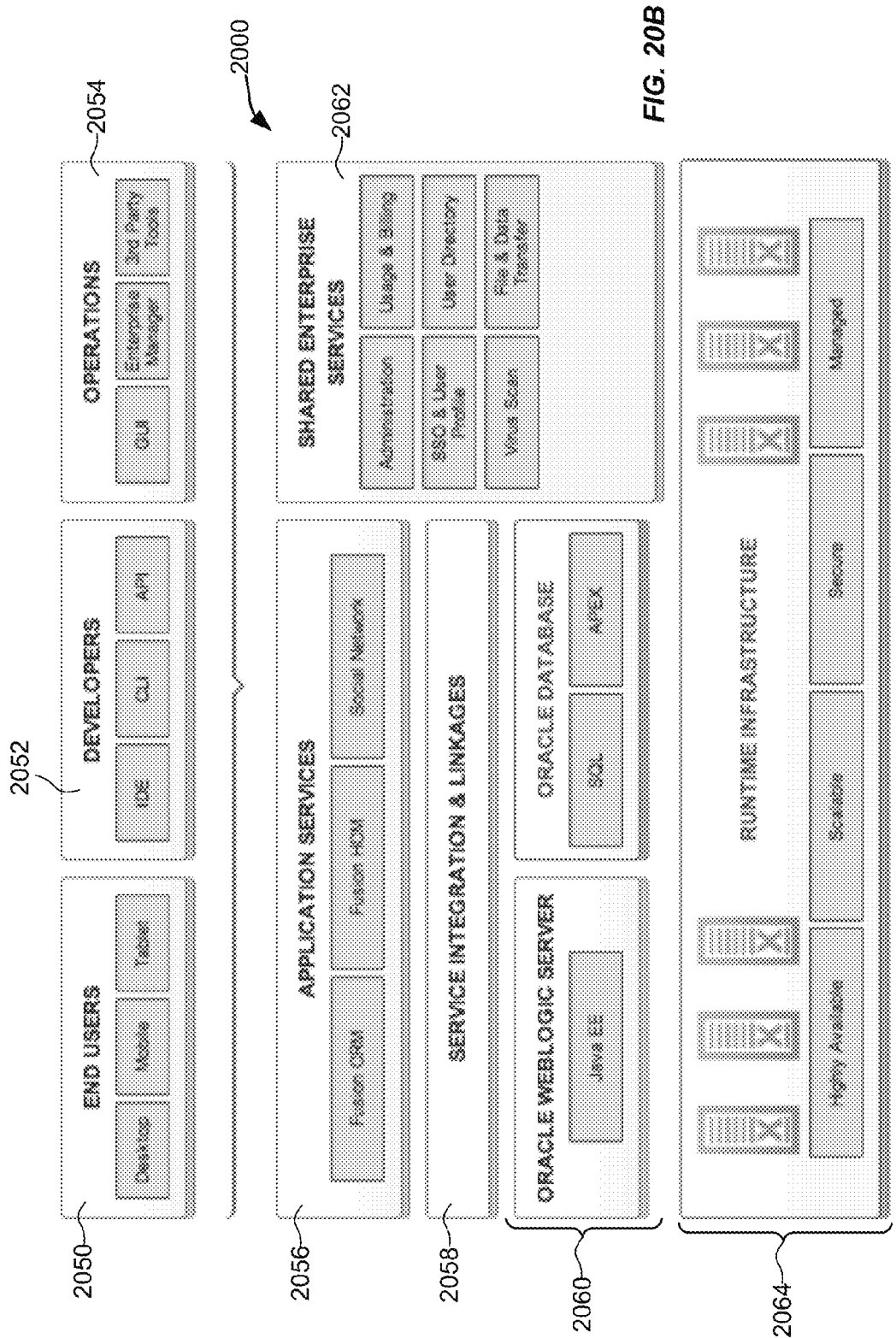

MULTI-TENANCY IDENTITY MANAGEMENT SYSTEM

CROSS-REFERENCE TO RELATED APPLICATIONS

The present application claims priority under 35 U.S.C. §119(e) to: U.S. Provisional Patent Application No. 61/698,463, filed Sep. 7, 2012, titled SHARED IDENTITY MANAGEMENT ARCHITECTURE, the entire contents of which are incorporated herein by reference for all purposes; U.S. Provisional Patent Application No. 61/698,413, filed Sep. 7, 2012, titled TENANT AUTOMATION SYSTEM, the entire contents of which are incorporated herein by reference for all purposes; U.S. Provisional Patent Application No. 61/698,459, filed Sep. 7, 2012, titled SERVICE DEVELOPMENT INFRASTRUCTURE; and U.S. Provisional Patent Application No. 61/785,299, filed Mar. 14, 2013, titled CLOUD INFRASTRUCTURE, the entire contents of which are incorporated herein by reference for all purposes.

BACKGROUND

The disclosure below relates generally to computer security, and more specifically to identity management within a cloud computing environment that is partitioned into various separate identity domains.

Cloud computing involves the use of computing resources (e.g., hardware and software) that are delivered as a service over a network (typically the Internet). Cloud computing entrusts remote services with a user's data, software, and computation. Cloud computing can be used to offer software as as service (Saas) or a platform as a service (PaaS), for example. In a business model using SaaS, users can be provided access to application software and databases. The cloud providers can manage the infrastructure and platforms on which the applications execute. SaaS providers generally price applications using a subscription fee. SaaS can allow a business the potential to reduce information technology operational costs by outsourcing hardware and software maintenance and support to the cloud provider. This outsourcing can enable the business to reallocate information technology operations costs away from hardware/software spending and personnel expenses, towards meeting other information technology goals. Furthermore, with applications hosted centrally, updates can be released without the need for users to install new software. However, because users' data are stored on the cloud provider's server, some organizations can be concerned about potential unauthorized access to that data.

End users can access cloud-based applications through a web browser or a light-weight desktop or mobile application. Meanwhile, the business software and users' data can be stored on servers at a location that is remote from that business and from those users. Cloud computing at least theoretically allows enterprises to deploy their applications more rapidly, with improved manageability and less maintenance. Cloud computing at least theoretically enables information technology managers to adjust resources more quickly to meet sometimes fluctuating and unpredictable business demands.

Identity management (IDM) is the task of controlling information about users of computer system. Such information can include information that authenticates the identities of such users. Such information can include information that describes which data those users are authorized to access. Such information can include information that describes which actions those users are authorized to perform relative to various system resources (e.g., files, directories, applications, communication ports, memory segments, etc.) IDM can also include the management of descriptive information about each user and about how and by whom that descriptive information can be accessed and modified.

Potentially, a cloud computing environment could include a separate IDM system, or separate instance of an IDM system, for each separate organization that used the cloud computing environment. However, such a scheme could be seen as being duplicative of effort and as being wasteful of computing resources.

SUMMARY

Certain embodiments of the invention involve an identity management (IDM) system that is implemented in a cloud computing environment and that is partitioned into multiple separate identity domains.

In an embodiment of the invention, a set of constructs all align together to create an abstraction of, or "tenant-sliced" view of, a single IDM system. This single IDM system can include multiple separate components or sub-systems. The IDM system can be shared among multiple independent and separate "tenants," or IDM system customers, so that the IDM system is more densely utilized. Thus, there is no need for a separate IDM system to be instantiated for each separate customer. The single IDM system can be configured such that, for each tenant of the IDM system, a virtual view of the IDM system that is specific to that tenant can be presented to that tenant's users.

Embodiments of the invention can use the concept of virtualization. Separate views of the IDM system can be virtualized within the single IDM system in a manner that is conceptually similar to the manner in which multiple separate virtual machines can be virtualized on a single host computing device. This virtualization can be achieved by configuring the IDM system in a specific manner. The IDM system can involve multiple separate layers, including upper layers and lower layers that are conceptually vertically stacked one on top of the other. The upper layers, at least, can be partitioned. In the IDM system, various different services (e.g., authentication and/or authorization services) can be associated with various different tenants of the IDM system. The IDM system can isolate each tenant so that each tenant is capable of interacting only with the IDM system "slice," or partition, that is dedicated to that tenant. Thus, the IDM system can enforce isolation between tenants.

BRIEF DESCRIPTION OF THE DRAWINGS

FIG. 3 is a block diagram that illustrates an example of an overview of a layered cloud-based IDM system, according to an embodiment of the invention;

FIG. 20B is a simplified block diagram of a hardware/software stack that may be used to implement a cloud infrastructure system according to an embodiment of the present invention;

DETAILED DESCRIPTION

Figure 1:
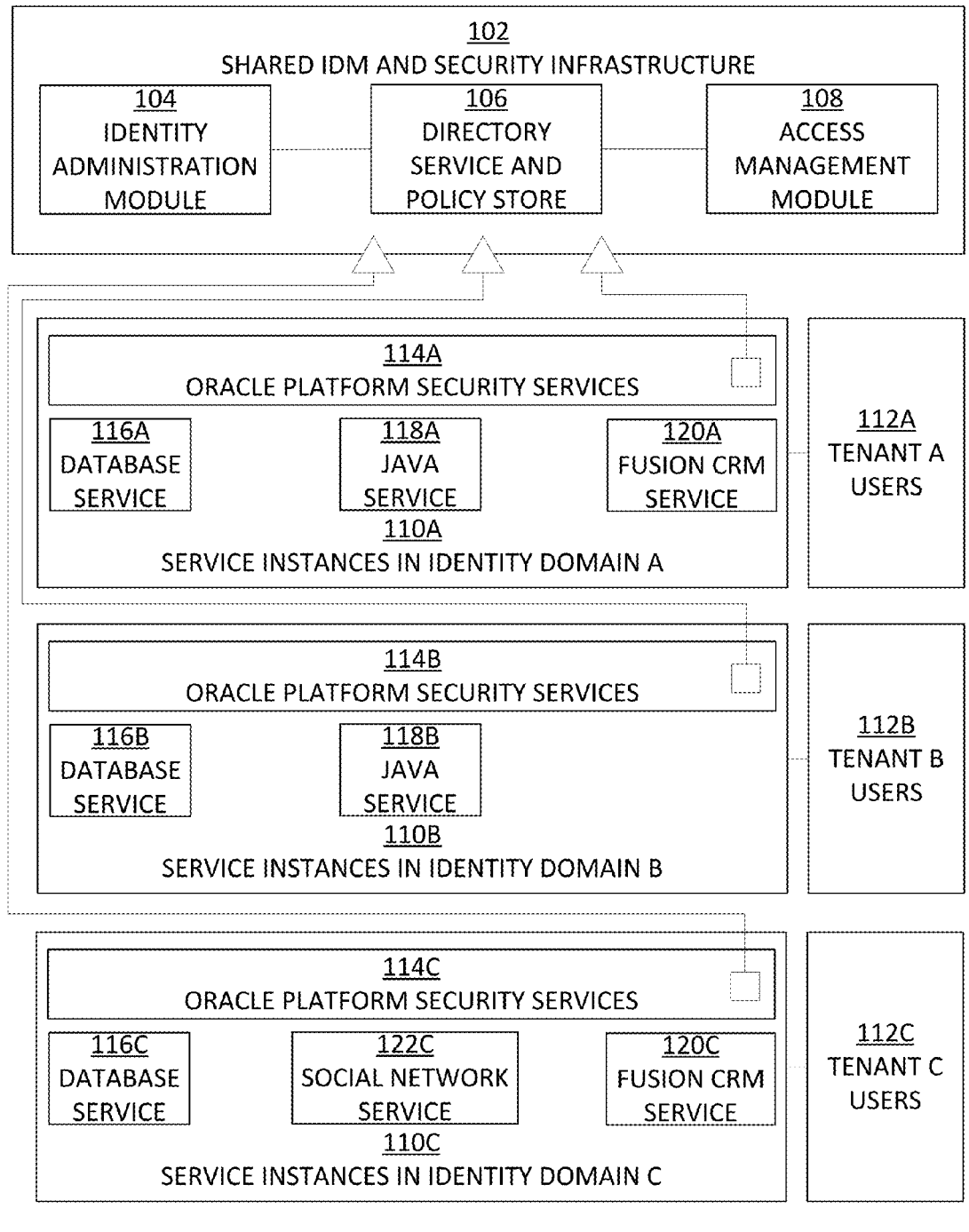
FIG. 1 is a block diagram that conceptually illustrates an example of a shared IDM system from a tenant's perspective, according to an embodiment of the invention.

In the following description, for the purposes of explanation, specific details are set forth in order to provide a thorough understanding of embodiments of the invention. However, it will be apparent that the invention may be practiced without these specific details.

Certain embodiments of the present invention provide techniques for automating the provisioning, managing and tracking of services provided by a cloud infrastructure system.

In certain embodiments, a cloud infrastructure system may include a suite of applications, middleware and database service offerings that are delivered to a customer in a self-service, subscription-based, elastically scalable, reliable, highly available, and secure manner. An example of such a cloud infrastructure system is the Oracle Public Cloud provided by the present assignee.

A cloud infrastructure system may provide many capabilities including, but not limited to, provisioning, managing and tracking a customer's subscription for services and resources in the cloud infrastructure system, providing predictable operating expenses to customers utilizing the services in the cloud infrastructure system, providing robust identity domain separation and protection of a customer's data in the cloud infrastructure system, providing customers with a transparent architecture and control of the design of the cloud infrastructure system, providing customers assured data protection and compliance with data privacy standards and regulations, providing customers with an integrated development experience for building and deploying services in the cloud infrastructure system and providing customers with a seamless integration between business software, middleware, database and infrastructure services in the cloud infrastructure system.

In certain embodiments, services provided by the cloud infrastructure system may include a host of services that are made available to users of the cloud infrastructure system on demand such as online data storage and backup solutions, Web-based e-mail services, hosted office suites and document collaboration services, database processing, managed technical support services and the like. Services provided by the cloud infrastructure system can dynamically scale to meet the needs of its users. A specific instantiation of a service provided by cloud infrastructure system is referred to herein as a service instance. In general, any service made available to a user via a communication network such as the Internet from a cloud service provider's system is referred to as a cloud service. Typically, in a public cloud environment, servers and systems that make up the cloud service provider's system are different from the customer's own on-premises servers and systems. For example, a cloud service provider's system may host an application and a user may, via a communication network such as the Internet, on demand, order and use the application.

A service in a computer network cloud infrastructure includes protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and script-language middleware engine for private use by a networked developer. As another example, a service can include access to an email software application hosted on a cloud vendor's web site.

Figure 20A:
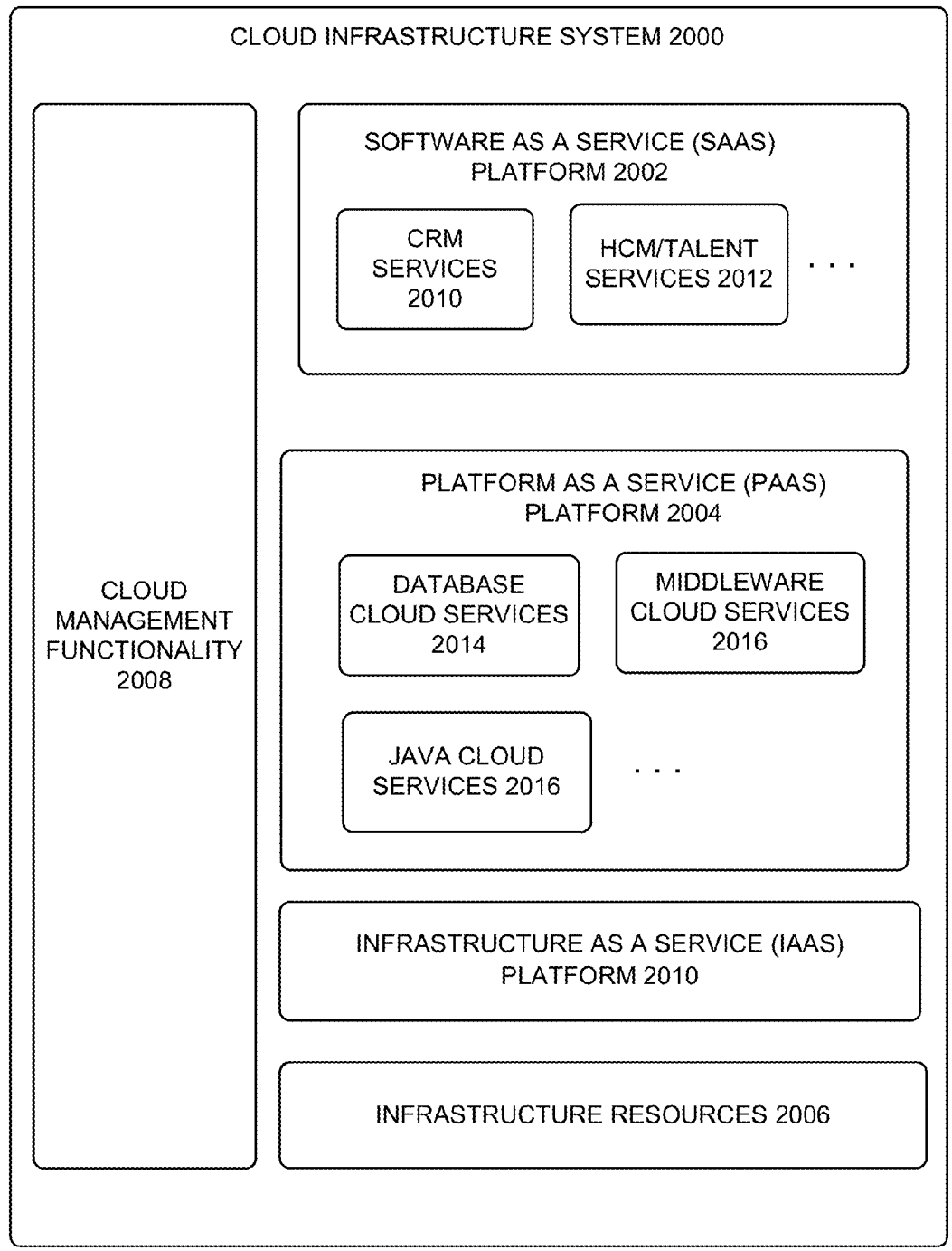
FIG. 20A is a logical view of a cloud infrastructure system according to one embodiment of the present invention.

FIG. 20A is a logical view of a cloud infrastructure system according to one embodiment of the present invention. Cloud infrastructure system 2000 may provide a variety of services via a cloud or networked environment. These services may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2000. Cloud infrastructure system 2000 then performs processing to provide the services in the customer's subscription order.

Cloud infrastructure system 2000 may provide the cloud services via different deployment models. For example, services may be provided under a public cloud model where cloud infrastructure system 2000 is owned by an organization selling cloud services (e.g., owned by Oracle) and the services are made available to the general public or different industry enterprises. As another example, services may be provided under a private cloud model where cloud infrastructure system 2000 is operated solely for a single organization and may provide services for one or more entities within the organization. The cloud services may also be provided under a community cloud model where cloud infrastructure system 2000 and the services provided by system 2000 are shared by several organizations in a related community. The cloud services may also be provided under a hybrid cloud model, which is a combination of two or more different models.

As shown in FIG. 20A, cloud infrastructure system 2000 may comprise multiple components, which working in conjunction, enable provision of services provided by cloud infrastructure system 2000. In the embodiment illustrated in FIG. 20A, cloud infrastructure system 2000 includes a SaaS platform 2002, a PaaS platform 2004, an IaaS platform 2010, infrastructure resources 2006, and cloud management functionality 2008. These components may be implemented in hardware, or software, or combinations thereof.

SaaS platform 2002 is configured to provide cloud services that fall under the SaaS category. For example, SaaS platform 2002 may provide capabilities to build and deliver a suite of on-demand applications on an integrated development and deployment platform. SaaS platform 2002 may manage and control the underlying software and infrastructure for providing the SaaS services. By utilizing the services provided by SaaS platform 2002, customers can utilize applications executing on cloud infrastructure system 2000. Customers can acquire the application services without the need for customers to purchase separate licenses and support.

Various different SaaS services may be provided. Examples include without limitation services that provide solutions for sales performance management, enterprise integration and business flexibility for large organizations, and the like. In one embodiment, the SaaS services may include Customer Relationship Management (CRM) services 2010 (e.g., Fusion CRM services provided by the Oracle cloud), Human Capital Management (HCM)/Talent Management services 2012, and the like. CRM services 2010 may include services directed to reporting and management of a sales activity cycle to a customer, and others. HCM/Talent services 2012 may include services directed to providing global workforce lifecycle management and talent management services to a customer.

Various different PaaS services may be provided by PaaS platform 2004 in a standardized, shared and elastically scalable application development and deployment platform. Examples of PaaS services may include without limitation services that enable organizations (such as Oracle) to consolidate existing applications on a shared, common architecture, as well as the ability to build new applications that leverage the shared services provided by the platform. PaaS platform 2004 may manage and control the underlying software and infrastructure for providing the PaaS services. Customers can acquire the PaaS services provided by cloud infrastructure system 2000 without the need for customers to purchase separate licenses and support. Examples of PaaS services include without limitation Oracle Java Cloud Service (JCS), Oracle Database Cloud Service (DBCS), and others.

By utilizing the services provided by PaaS platform 2004, customers can utilize programming languages and tools supported by cloud infrastructure system 2000 and also control the deployed services. In some embodiments, PaaS services provided by the cloud infrastructure system 2000 may include database cloud services 2014, middleware cloud services (e.g., Oracle Fusion Middleware services) 2016 and Java cloud services 2017. In one embodiment, database cloud services 2014 may support shared service deployment models that enable organizations to pool database resources and offer customers a database-as-a-service in the form of a database cloud, middleware cloud services 2016 provides a platform for customers to develop and deploy various business applications and Java cloud services 2017 provides a platform for customers to deploy Java applications, in the cloud infrastructure system 2000. The components in SaaS platform 2002 and PaaS platform 2004 illustrated in FIG. 20A are meant for illustrative purposes only and are not intended to limit the scope of embodiments of the present invention. In alternate embodiments, SaaS platform 2002 and PaaS platform 2004 may include additional components for providing additional services to the customers of cloud infrastructure system 2000.

Various different IaaS services may be provided by IaaS platform 2010. The IaaS services facilitate the management and control of the underlying computing resources such as storage, networks, and other fundamental computing resources for customers utilizing services provided by the SaaS platform and the PaaS platform.

In certain embodiments, cloud infrastructure system 2000 includes infrastructure resources 2006 for providing the resources used to provide various services to customers of the cloud infrastructure system 2000. In one embodiment, infrastructure resources 2006 includes pre-integrated and optimized combinations of hardware such as servers, storage and networking resources to execute the services provided by the PaaS platform and the SaaS platform.

In certain embodiments, cloud management functionality 2008 provides comprehensive management of cloud services (e.g., SaaS, PaaS, IaaS services) in the cloud infrastructure system 2000. In one embodiment, cloud management functionality 2008 includes capabilities for provisioning, managing and tracking a customer's subscription received by the cloud infrastructure system 2000, and the like.

FIG. 20B is a simplified block diagram of a hardware/software stack that may be used to implement cloud infrastructure system 2000 according to an embodiment of the present invention. It should be appreciated that implementation depicted in FIG. 20B may have other components than those depicted in FIG. 20B. Further, the embodiment shown in FIG. 20B is only one example of a cloud infrastructure system that may incorporate an embodiment of the invention. In some other embodiments, cloud infrastructure system 2000 may have more or fewer components than shown in FIG. 20B, may combine two or more components, or may have a different configuration or arrangement of components. In certain embodiments, the hardware and software components are stacked so as to provide vertical integration that provides optimal performance.

Various types of users may interact with cloud infrastructure system 2000. These users may include, for example, end users 2050 that can interact with cloud infrastructure system 2000 using various client devices such as desktops, mobile devices, tablets, and the like. The users may also include developers/programmers 2052 who may interact with cloud infrastructure system 2000 using command line interfaces (CLIs), application programming interfaces (APIs), through various integrated development environments (IDEs), and via other applications. User may also include operations personnel 2054. These may include personnel of the cloud service provider or personnel of other users.

Application services layer 2056 identifies various cloud services that may be offered by cloud infrastructure system 2000. These services may be mapped to or associated with respective software components 2060 (e.g., Oracle WebLogic server for providing Java services, oracle database for providing database services, and the like) via a service integration and linkages layer 2058.

In certain embodiments, a number of internal services 2062 may be provided that are shared by different components or modules of cloud infrastructure system 2000 and by the services provided by cloud infrastructure system 2000. These internal shared services may include, without limitation, a security and identity service, an integration service, an enterprise repository service, an enterprise manager service, a virus scanning and white list service, a high availability, backup and recovery service, service for enabling cloud support in IDEs, an email service, a notification service, a file transfer service, and the like.

Runtime infrastructure layer 2064 represents the hardware layer on which the various other layers and components are built. In certain embodiments, runtime infrastructure layer 2064 may comprise one Oracle's Exadata machines for providing storage, processing, and networking resources. An Exadata machine may be composed of various database servers, storage Servers, networking resources, and other components for hosting cloud-services related software layers. In certain embodiments, the Exadata machines may be designed to work with Oracle Exalogic, which is an engineered system providing an assemblage of storage, compute, network, and software resources. The combination of Exadata and Exalogic provides a complete hardware and software engineered solution that delivers high-performance, highly available, scalable, secure, and a managed platform for providing cloud services.

Figure 21:
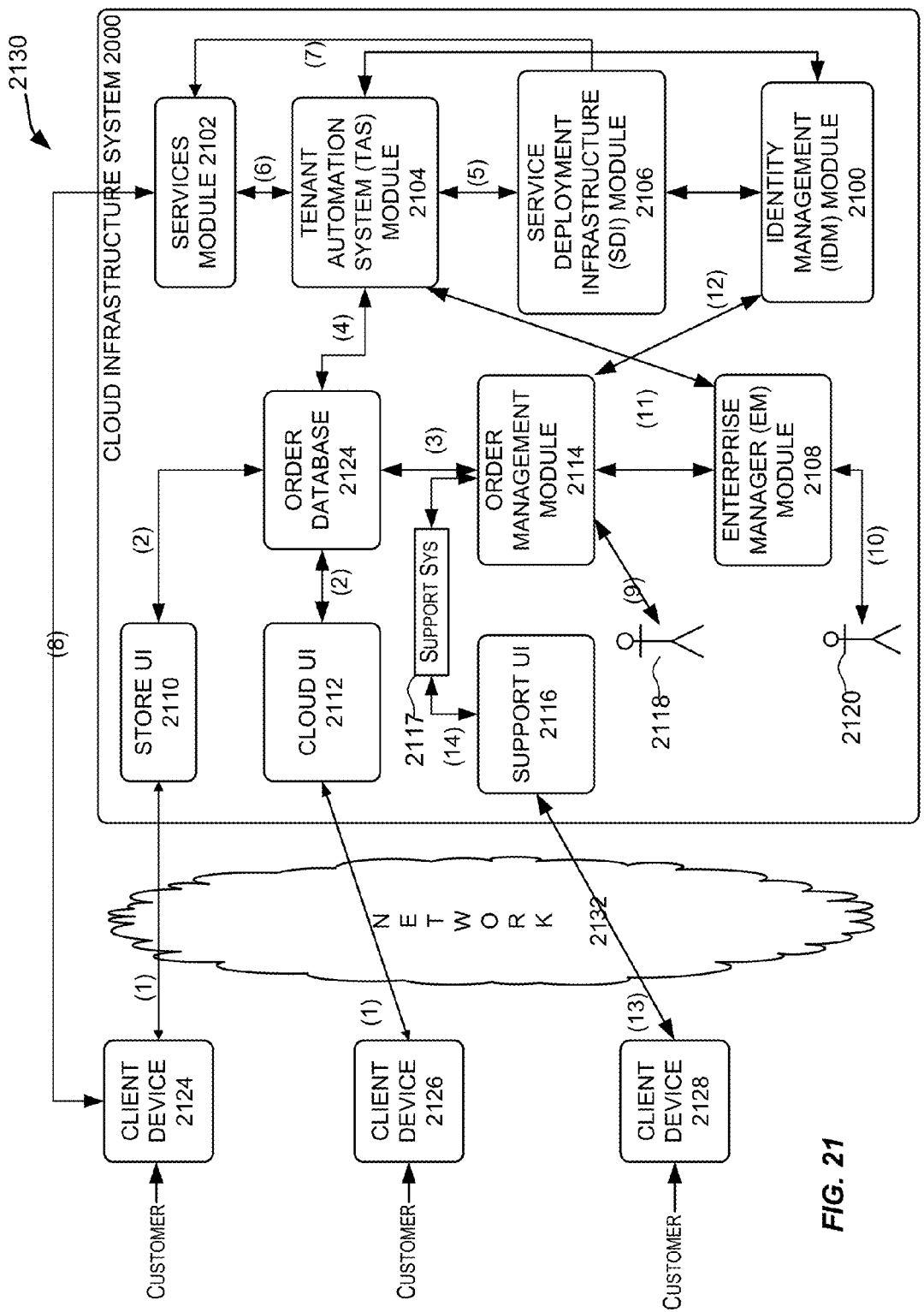
FIG. 21 is a simplified block diagram of a system environment for implementing the cloud infrastructure system shown in FIG. 20A.

FIG. 21 is a simplified block diagram of a system environment for implementing the cloud infrastructure system shown in FIG. 20A according to an embodiment of the present invention. In the illustrated embodiment, system environment 2130 includes one or more client computing devices 2124, 2126 and 2128 that may be used by users to interact with cloud infrastructure system 2000. A client device may be configured to operate a client application such as a web browser, a proprietary client application (e.g., Oracle Forms), or some other application, which may be used by a user of the client device to interact with cloud infrastructure system 2000 to utilize services provided by cloud infrastructure system 2000.

It should be appreciated that cloud infrastructure system 2000 depicted in FIG. 21 may have other components than those depicted in FIG. 21. Further, the embodiment shown in FIG. 21 is only one example of a cloud infrastructure system that may incorporate an embodiment of the invention. In some other embodiments, cloud infrastructure system 2000 may have more or fewer components than shown in FIG. 21, may combine two or more components, or may have a different configuration or arrangement of components.

Client computing devices 2124, 2126 and 2128 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computing device. For example, client computing devices 2124, 2126 and 2128 may be any other electronic device, such as a thin-client computer, Internet-enabled gaming system, and/or personal messaging device, capable of communicating over a network (e.g., network 2132 described below). Although exemplary system environment 2130 is shown with three client computing devices, any number of client computing devices may be supported. Other devices such as devices with sensors, etc. may interact with cloud infrastructure system 2000.

A network 2132 may facilitate communications and exchange of data between clients 2124, 2126 and 2128 and cloud infrastructure system 2000. Network 2132 may be any type of network familiar to those skilled in the art that can support data communications using any of a variety of commercially-available protocols, including without limitation TCP/IP, SNA, IPX, AppleTalk, and the like. Merely by way of example, network 2132 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

Cloud infrastructure system 2000 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up cloud infrastructure system 2000 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, cloud infrastructure system 2000 may be adapted to automatically provision, manage and track a customer's subscription to services offered by cloud infrastructure system 2000. In one embodiment, as depicted in FIG. 21, the components in cloud infrastructure system 2000 include an Identity Management (IDM) module 2100, a services module 2102, a Tenant Automation System (TAS) module 2104, a Service Deployment Infrastructure (SDI) module 2106, an Enterprise Manager (EM) module 2108, one or more front-end web interfaces such as a store user interface (UI) 2110, a cloud user interface (UI) 2112, and a support user interface (UI) 2116, an order management module 2114, sales personnel 2118, operator personnel 2120 and an order database 2124. These modules may include or be provided using one or more computers and/or servers which may be general purpose computers, specialized server computers, server farms, server clusters, or any other appropriate arrangement and/or combination. In one embodiment, one or more of these modules can be provided by cloud management functionality 2008 or IaaS platform 2010 in cloud infrastructure system 2000. The various modules of the cloud infrastructure system 2000 depicted in FIG. 21 are meant for illustrative purposes only and are not intended to limit the scope of embodiments of the present invention. Alternative embodiments may include more or fewer modules than those shown in FIG. 21.

In an exemplary operation, at (1) a customer using a client device such as client device 2124 or 2126 may interact with cloud infrastructure system 2000 by browsing the various services provided by cloud infrastructure system 2000 and placing an order for a subscription for one or more services offered by cloud infrastructure system 2000. In certain embodiments, the customer may access store UI 2110 or cloud UI 2112 and place a subscription order via these user interfaces.

The order information received by cloud infrastructure system 2000 in response to the customer placing an order may include information identifying the customer and one or more services offered by the cloud infrastructure system 2000 that the customer intends to subscribe to. A single order may include orders for multiple services. For instance, a customer may login to cloud UI 2112 and request a subscription for a CRM service and a Java cloud service in the same order.

Additionally, the order may also include one or more service levels for the ordered services. As used herein, and as will be discussed in greater detail below, a service level for a service determines the amount of resources to be allocated for providing the requested service in the context of the subscription, such as the amount of storage, amount of computing resources, data transfer facilities, and the like. For example, a basic service level may provide a minimum level of storage, data transmission, or number of users, and higher service levels may include additional resources.

In addition, in some instances, the order information received by cloud infrastructure system 2000 may include information indicative of a customer level, and the time period during which the service is desired. The customer level specifies the priority of the customer making the subscription request. In one example, the priority may be determined based on the quality of service that the cloud infrastructure system 2000 guarantees or promises the customer as specified by a Service Level Agreement (SLA) agreed to between the customer and the provider of the cloud services. In one example, the different customer levels include a basic level, a silver level and a gold level. The time period for a service may specify the start date and time for the service and the time period for which the service is desired (e.g., a service end date and time may be specified).

In one embodiment, a customer may request a new subscription via store UI 2110 or request for a trial subscription via cloud UI 2112. In certain embodiments, store UI 2110 may represent the service provider's eCommerce store front (e.g., www.oracle.com/store for Oracle Cloud services). Cloud UI 2112 may represent a business interface for the service provider. Consumer can explore available services and sign up for interested services through cloud UI 2112. Cloud UI 2112 captures user input necessary for ordering trial subscriptions provided by cloud infrastructure system 2000. Cloud UI 2112 may also be used to view account features and configure the runtime environment located within cloud infrastructure system 2000. In addition to placing an order for a new subscription, store UI 2110 may also enable the customer to perform other subscription-related tasks such as changing the service level of a subscription, extending the term of the subscription, increasing the service level of a subscription, terminating an existing subscription, and the like.

After an order has been placed per (1), at (2), the order information that is received via either store UI 2110 or cloud UI 2112 is stored in order database 2124, which can be one of several databases operated by cloud infrastructure system 2000 and utilized in conjunction with other system elements. While order database 2124 is shown logically as a single database in FIG. 21, in actual implementation, this may comprise one or more databases.

At (3), the order is forwarded to order management module 2114. Order management module 2114 is configured to perform billing and accounting functions related to the order such as verifying the order and upon verification, booking the order. In certain embodiments, order management module 2114 may include a contract management module and an install base module. The contract management module may store contract information associated with the customer's subscription order such as the customer's service level agreement (SLA) with cloud infrastructure system 2000. The install base module may include detailed descriptions of the services in the customer's subscription order. In addition to order information, the install base module may track installation details related to the services, product status and support service history related to the services. As a customer orders new services or upgrades existing ones, the install base module may automatically add new order information.

At (4), information regarding the order is communicated to TAS module 2104. In one embodiment, TAS module 2104 utilizes the order information to orchestrate the provisioning of services and resources for the order placed by the customer. At (5), TAS component 2104 orchestrates the provisioning of resources to support the subscribed services using the services of SDI module 2106. At (6) TAS module 2104 provides information related to the provisioned order received from SDI module 2106 to services module 2102. In some embodiments, at (7), SDI module 2106 may also use services provided by services module 2102 to allocate and configure the resources needed to fulfill the customer's subscription order.

At (8), services module 2102 sends a notification to the customers on client devices 2124, 2126 and 2128 regarding the status of the order.

In certain embodiments, TAS module 2104 functions as an orchestration component that manages business processes associated with each order and applies business logic to determine whether an order should proceed to provisioning. In one embodiment, upon receiving an order for a new subscription, TAS module 2104 sends a request to SDI module 2106 to allocate resources and configure those resources needed to fulfill the subscription order. SDI module 2106 enables the allocation of resources for the services ordered by the customer. SDI module 2106 provides a level of abstraction between the cloud services provided by cloud infrastructure system 2000 and the physical implementation layer that is used to provision the resources for providing the requested services. TAS module 2104 may thus be isolated from implementation details such as whether or not services and resources are actually provisioned on the fly or pre-provisioned and only allocated/assigned upon request.

In certain embodiments, a user may use store UI 2110 to directly interact with order management module 2114 to perform billing and accounting related functions such as verifying the order and upon verification, booking the order. In some embodiments, instead of a customer placing an order, at (9), the order may instead be placed by sales personnel 2118 on behalf of the customer such as a customer's service representative or sales representative. Sales personnel 2118 may directly interact with order management module 2114 via a user interface (not shown in FIG. 21) provided by order management module 2114 for placing orders or for providing quotes for the customer. This, for example, may be done for large customers where the order may be placed by the customer's sales representative through order management module 2114. The sales representative may set up the subscription on behalf of the customer.

EM module 2108 is configured to monitor activities related to managing and tracking a customer's subscription in cloud infrastructure system 2000. EM module 2108 collects usage statistics for the services in the subscription order such as the amount of storage used, the amount data transferred, the number of users, and the amount of system up time and system down time. At (10), a host operator personnel 2120, who may be an employee of a provider of cloud infrastructure system 2000, may interact with EM module 2108 via an enterprise manager user interface (not shown in FIG. 21) to manage systems and resources on which services are provisioned within cloud infrastructure system 2000.

Identity management (IDM) module 2100 is configured to provide identity services such as access management and authorization services in cloud infrastructure system 2000. In one embodiment, IDM module 2100 controls information about customers who wish to utilize the services provided by cloud infrastructure system 2000. Such information can include information that authenticates the identities of such customers and information that describes which actions those customers are authorized to perform relative to various system resources (e.g., files, directories, applications, communication ports, memory segments, etc.) IDM module 2100 can also include the management of descriptive information about each customer and about how and by whom that descriptive information can be accessed and modified.

In one embodiment, information managed by the identity management module 2100 can be partitioned to create separate identity domains. Information belonging to a particular identity domain can be isolated from all other identity domains. Also, an identity domain can be shared by multiple separate tenants. Each such tenant can be a customer subscribing to services in the cloud infrastructure system 2000. In some embodiments, a customer can have one or many identity domains, and each identity domain may be associated with one or more subscriptions, each subscription having one or many services. For example, a single customer can represent a large entity and identity domains may be created for divisions/departments within this large entity. EM module 2108 and IDM module 2100 may in turn interact with order management module 2114 at (11) and (12) respectively to manage and track the customer's subscriptions in cloud infrastructure system 2000.

In one embodiment, at (13), support services may also be provided to the customer via a support UI 2116. In one embodiment, support UI 2116 enables support personnel to interact with order management module 2114 via a support backend system to perform support services at (14). Support personnel in the cloud infrastructure system 2000 as well as customers can submit bug reports and check the status of these reports via support UI 2116.

Other interfaces, not shown in FIG. 21 may also be provided by cloud infrastructure system 2000. For example, an identity domain administrator may use a user interface to IDM module 2100 to configure domain and user identities. In addition, customers may log into a separate interface for each service they wish to utilize. In certain embodiments, a customer who wishes to subscribe to one or more services offered by cloud infrastructure system 2000 may also be assigned various roles and responsibilities. In one embodiment, the different roles and responsibilities that may be assigned for a customer may include that of a buyer, an account administrator, a service administrator, an identity domain administrator or a user who utilizes the services and resources offered by cloud infrastructure system 2000. The different roles and responsibilities are described more fully in FIG. 23 below.

Figure 22A:
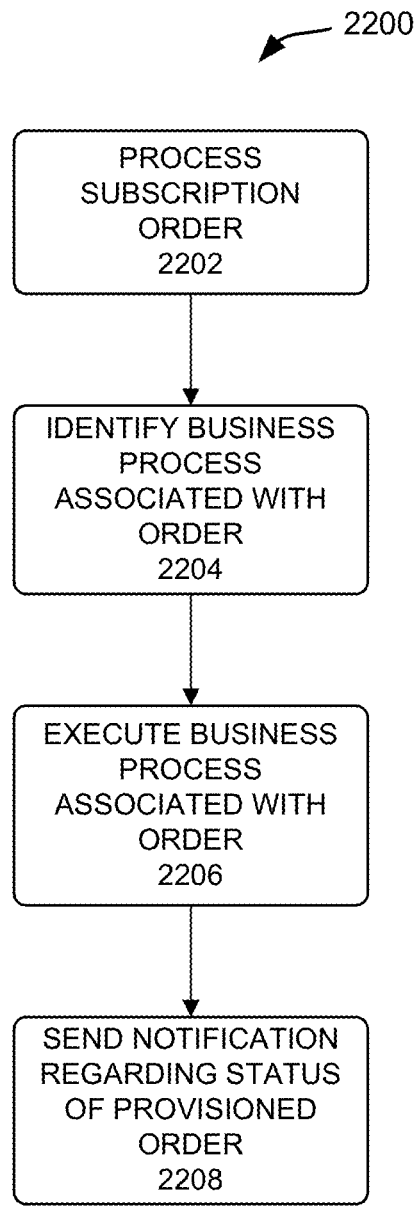
FIG. 22A depicts a simplified flowchart depicting processing that may be performed by the TAS module in the cloud infrastructure system, in accordance with an embodiment of the present invention.

FIG. 22A depicts a simplified flowchart 2200 depicting processing that may be performed by the TAS module in the cloud infrastructure system, in accordance with an embodiment of the present invention. The processing depicted in FIG. 22A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 22A is not intended to be limiting. Other sequences of steps may also be performed according to alternative embodiments. For example, alternative embodiments of the present invention may perform the steps outlined above in a different order. Moreover, the individual steps illustrated in FIG. 22A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 22A may be performed by one or more components in TAS component 2104 as will be described in detail in FIG. 22B.

At 2202, a customer's subscription order is processed. The processing may include validating the order, in one example. Validating the order includes ensuring that the customer has paid for the subscription and ensuring that the customer does not already have subscriptions with the same name or that the customer is not attempting to create multiple subscriptions of the same type in the same identity domain for subscription types for which this is disallowed (such as, in the case of a CRM service). Processing may also include tracking the status of an order for each order that is being processed by cloud infrastructure system 2000.

At 2204, a business process associated with the order is identified. In some instances, multiple business processes may be identified for an order. Each business process identifies a series of steps for processing various aspects of the order. As an example, a first business process may identify one or more steps related to provisioning physical resources for the order, a second business process may identify one or more steps related to creating an identity domain along with customer identities for the order, a third business process may identify one or more steps for related to performing back office functions such as creating a customer record for the user, performing accounting functions related to the order, and the like. In certain embodiments, different business processes may also be identified for processing different services in an order. For example, different business process may be identified to process a CRM service and a database service.

At 2206, the business process identified for the order in 2204 is executed. Executing the business process associated with the order may include orchestrating the series of steps associated with the business process identified in step 2204. For example, executing a business process related to provisioning physical resources for the order may include sending a request to SDI module 2106 to allocate resources and configure those resources needed to fulfill the subscription order.

At 2208, a notification is sent to the customer regarding the status of the provisioned order. Additional description related to performing steps 2202, 2204, 2206 and 2208 is provided in detail in FIG. 22B.

Figure 22B:
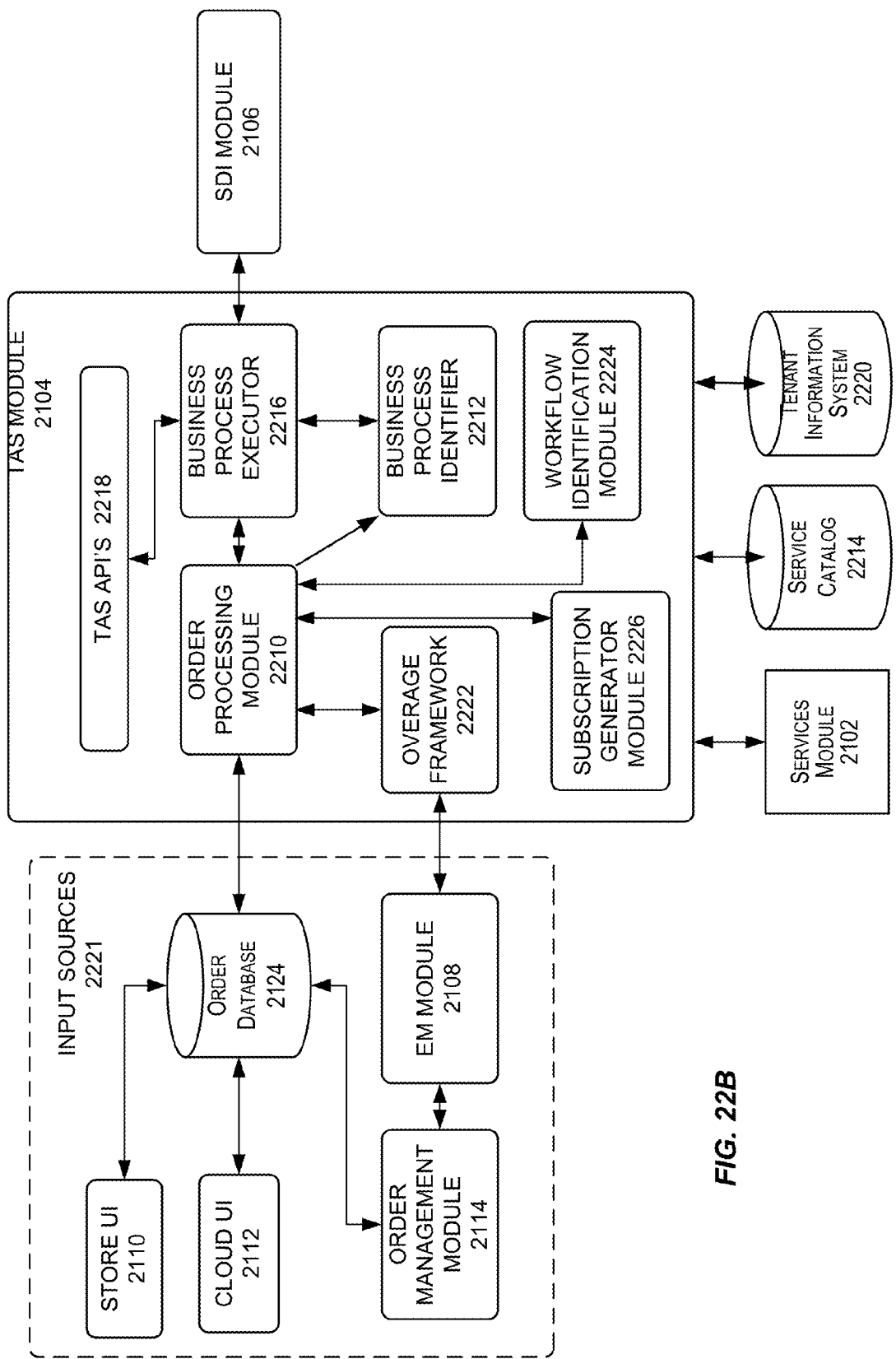
FIG. 22B depicts a simplified high level diagram of one or more sub-modules in the TAS module in the cloud infrastructure system, in accordance with an embodiment of the present invention.

FIG. 22B depicts a simplified high level diagram of one or more sub-modules in the TAS module in the cloud infrastructure system, in accordance with an embodiment of the present invention. In one embodiment, the modules depicted in FIG. 22B perform the processing described in steps 2202-308 discussed in FIG. 22A. In the illustrated embodiment, TAS module 2104 comprises an order processing module 2210, a business process identifier 2212, a business process executor 2216, an overage framework 2222, a workflow identification module 2224, and a bundled subscription generator module 2226. These modules may be implemented in hardware, or software, or combinations thereof. The various modules of the TAS module depicted in FIG. 22B are meant for illustrative purposes only and are not intended to limit the scope of embodiments of the present invention. Alternative embodiments may include more or fewer modules than those shown in FIG. 22B.

In one embodiment, order processing module 2210 receives an order from a customer from one or more input sources 2221. For example, order processing module 2210 may directly receive an order via cloud UI 2112 or store UI 2110, in one embodiment. Alternatively, order processing module 2210 may receive an order from order management module 2114 or order database 2124. Order processing module 2210 then processes the order. In certain embodiments, processing the order includes generating a customer record which includes information about the order such as a service type, a service level, a customer level, the type of resources, the amount of the resources to be allocated to the service instance and a time period during which the service is desired. As part of the processing, order processing module 2210 also determines whether the order is a valid order. This includes ensuring that the customer does not already have subscriptions with the same name or that the customer is not attempting to create multiple subscriptions of the same type in the same identity domain for subscription types where this is disallowed (such as, in the case of a fusion CRM service).

Order processing module 2210 may also perform additional processing on the order. Processing may include tracking the status of an order for each order that is being processed by cloud infrastructure system 2000. In one embodiment, order processing module 2210 may process each order to identify a number of states pertaining to the order. In one example, the different states of an order may be an initialized state, a provisioned state, an active state, an administration required state, an error state, and the like. An initialized state refers to the state of a new order; a provisioned state refers to the state of an order once the services and resources for the order have been provisioned. An order is in an active state when the order has been processed by TAS module 2104 and a notification to that effect has been delivered to the customer. An order is in an administration required state when intervention by an administrator is needed to resolve the issue. The order is in an error state when the order cannot be processed. In addition to maintaining the order progress status, order processing module 2210 also maintains detailed information about any failures encountered during process execution. In other embodiments, and as will be discussed in detail below, the additional processing performed by order processing module 2210 may also include changing the service level for a service in the subscription, changing the services included in the subscription, extending the time period of the subscription, and canceling the subscription or specifying different service levels for different time periods in the subscription.

After an order has been processed by order processing module 2210, business logic is applied to determine whether the order should proceed to provisioning. In one embodiment, as part of orchestrating the order, business process identifier 2212 receives the processed order from order processing module 2210 and applies business logic to identify a particular business process to use for the order being processed. In one embodiment, business process identifier 2212 may utilize information stored in a service catalog 2214 to determine the particular business process to be used for the order. In one embodiment, and as discussed in FIG. 22A, multiple business processes may be identified for an order and each business process identifies a series of steps for processing various aspects of the order. In another embodiment, and as discussed above, different business processes may be defined for different types of services, or combinations of services such as a CRM service or a database service. In one embodiment, service catalog 2214 may store information mapping an order to a particular type of business process. Business process identifier 2212 may use this information to identify a specific business process for the order being processed.

Once a business process has been identified, business process identifier 2212 communicates the particular business process to be executed to business process executor 2216. Business process executor 2216 then executes steps of the identified business process by operating in conjunction with one or more modules in the cloud infrastructure system 2000. In some embodiments, business process executor 2216 acts as an orchestrator for performing the steps associated with a business process. For example, the business process executor may interact with order processing module 2210 to execute steps in a business process that identifies workflows related to the order, determines the overage of services in the order or identifies service components related to the order.

In one example, business process executor 2216 interacts with SDI module 2106 to execute steps in a business process for allocating and provisioning resources for services requested in the subscription order. In this example, for each step in the business process, business process executor 2216 may send a request to SDI component 2106 to allocate resources and configure resources needed to fulfill the particular step. SDI component 2106 is responsible for the actual allocation of the resources. Once all the steps of the business processes of an order have been executed, business process executor 2216 may send a notification to the customer of the processed order by utilizing the services of services component 2102. The notification may include sending an email notification to the customer with details of the processed order. The email notification may also include deployment information related to the order to enable the customer to access the subscribed services.

In certain embodiments, TAS module 2104 may provide one or more TAS Application Programming Interfaces (APIs) 2218 that enable TAS module 2104 to interact with other modules in cloud infrastructure system 2000 and for other modules to interact with TAS module 2104. For example, the TAS APIs may include a system provisioning API that interacts with SDI module 2106 via an asynchronous Simple Object Access Protocol (SOAP) based web services call to provision resources for the customer's subscription order. In one embodiment, TAS module 2104 may also utilize the system provisioning API to accomplish system and service instance creation and deletion, switch a service instance to an increased service level, and associate service instances. An example of this is the association of a Java service instance to a fusion applications service instance to allow secure web service communications. The TAS APIs may also include a notification API that interacts with the services module 2102 to notify the customer of a processed order. In certain embodiments, the TAS module 2104 also periodically propagates subscription information, outages, and notifications (e.g. planned downtime) to services component 2102.

In certain embodiments, TAS module 2104 periodically receives usage statistics for each of the provisioned services such as the amount of storage used, the amount data transferred, the number of users, and the amount of system up time and system down time from EM module 2108. Overage framework 2222 utilizes the usage statistics to determine whether over use of a service has occurred, and if so, to determine how much to bill for the overage, and provides this information to order management module 2114.

In certain embodiments, TAS module 2104 includes an order workflow identification module 2224 that is configured to identify one or more workflows associated with processing a customer's subscription order. In certain embodiments, TAS module 2104 may include a subscription order generation framework 2226 for generating subscription orders for a customer when the customer places a subscription order for one or more services offered by the cloud infrastructure system 2000. In one embodiment, a subscription order includes one or more service components responsible for providing the services requested by a customer in the subscription order.

Additionally, TAS module 2104 may also interact with one or more additional databases such as a Tenant Information System (TIS) database 2220 to enable the provisioning of resources for one or more services subscribed by the customer while taking into consideration historical information, if any, available for the customer. TIS database 2220 may include historical order information and historical usage information pertaining to orders subscribed by the customer.

TAS module 2104 may be deployed using different deployment models. In certain embodiments, the deployment includes a central component that interfaces with one or more distributed components. The distributed components may, for example, be deployed as various data centers and accordingly may also be referred to as data center components. The central component includes capabilities to process orders and co-ordinate services in cloud infrastructure system 2000, while the data center components provide capabilities for provisioning and operating the runtime system that provides the resources for the subscribed services.

Figure 23:
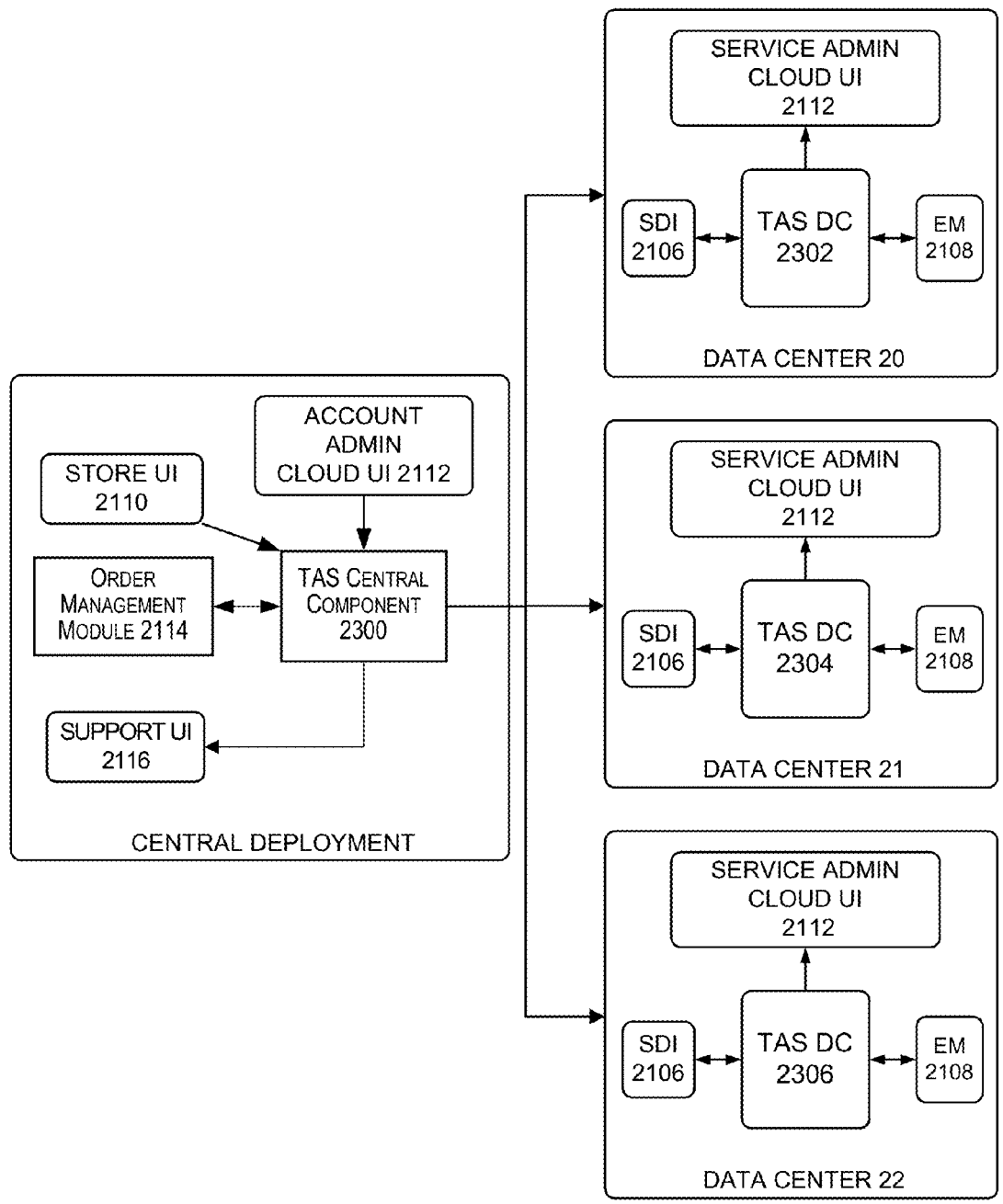
FIG. 23 depicts an exemplary distributed deployment of the TAS component, according to an embodiment of the present invention.

FIG. 23 depicts an exemplary distributed deployment of the TAS module, according to an embodiment of the present invention. In the embodiment depicted in FIG. 23, the distributed deployment of TAS module 2104 includes a TAS central component 2300 and one or more TAS Data Centers (DCs) components 2302, 2304 and 2306. These components may be implemented in hardware, or software, or combinations thereof.

In one embodiment, the responsibilities of TAS central component 2300 include, without limitation, to provide a centralized component for receiving customer orders, performing order-related business operations such as creating a new subscription, changing the service level for a service in the subscription, changing the services included in the subscription, and extending the time period of the subscription, or canceling the subscription. The responsibilities of TAS central component 2300 may also include maintaining and serving subscription data needed by cloud infrastructure system 2000 and interfacing with order management module 2114, support UI 2116, cloud UI 2112 and store UI 2110 to handle all the back-office interactions.

In one embodiment, the responsibilities of TAS DCs 2302, 2304 and 2306 include, without limitation, performing runtime operations for orchestrating the provisioning the resources for one or more services subscribed by the customer. TAS DCs 2302, 2304 and 2306 also include capabilities to perform operations such as locking, unlocking, enabling, or disabling a subscription order, collecting metrics related to the order, determining the status of the order, and sending notification events related to the order.

In an exemplary operation of the distributed TAS system shown in FIG. 23, TAS central component 2300 initially receives an order from a customer via cloud UI 2112, store UI 2110, via order management system 2114, or via order database 2124. In one embodiment, the customer represents a buyer who has financial information and the authority to order and/or change a subscription. In one embodiment, the order information includes information identifying the customer, the type of services that the customer wishes to subscribe to, and an account administrator who will be responsible for handling the request. In certain embodiments, the account administrator may be nominated by the customer when the customer places an order for a subscription to one or more services offered by cloud infrastructure system 2000. Based on the order information, the TAS central component 2300 identifies the data region of the world such as Americas, EMEA, or Asia Pacific in which the order originates and the particular TAS DCs (for e.g., 2302, 2304 or 2306) that will be deployed for provisioning the order. In one embodiment, the particular TAS DC (for e.g., from among DCs 2302, 2304 or 2306) that will be deployed for provisioning the order is determined based on the geographical data region in which the request originated.

TAS central component 2300 then sends the order request to the particular TAS DC in which to provision services for the order request. In one embodiment, TAS DCs 2302, 2304 or 2306 identify a service administrator and an identity domain administrator responsible for processing the order request at the particular TAS DC. The service administrator and the identity administrator may be nominated by the account administrator identified in the subscription order. TAS DCs 2302, 2304 or 2306 communicate with SDI module 2104 to orchestrate the provisioning of physical resources for the order. SDI component 2104 in respective TAS DCs 2302, 2304 or 2306 allocates resources and configures those resources needed to fulfill the subscription order.

In certain embodiments, TAS DCs, 2302, 2304 or 2306 identify an identity domain associated with the subscription. SDI component 2106 may provide the identity domain information to IDM component 2100 (shown in FIG. 21) for identifying an existing identity domain or creating a new identity domain. Once the order is provisioned by the SDI module at respective TAS DCs, 2302, 2304 or 2306, TAS central component 2300 may place information regarding the provisioned resources in a support system, via support UI 2116. Information may include, for example, displaying resource metrics related to the services and usage statistics of the services.

Once in operation, at each data center, EM module 2108 to periodically collects usage statistics for each of the provisioned services provisioned at that data center, such as the amount of storage used, the amount data transferred, the number of users, and the amount of system up time and system down time. These statistics are provided to the TAS DC that is local to EM module 2108 (i.e., at the same data center). In an embodiment, the TAS DCs may use the usage statistics to determine whether overuse of a service has occurred, and if so, to determine how much to bill for the overage, and provide the billing information to order management system 2114.

Figure 24:
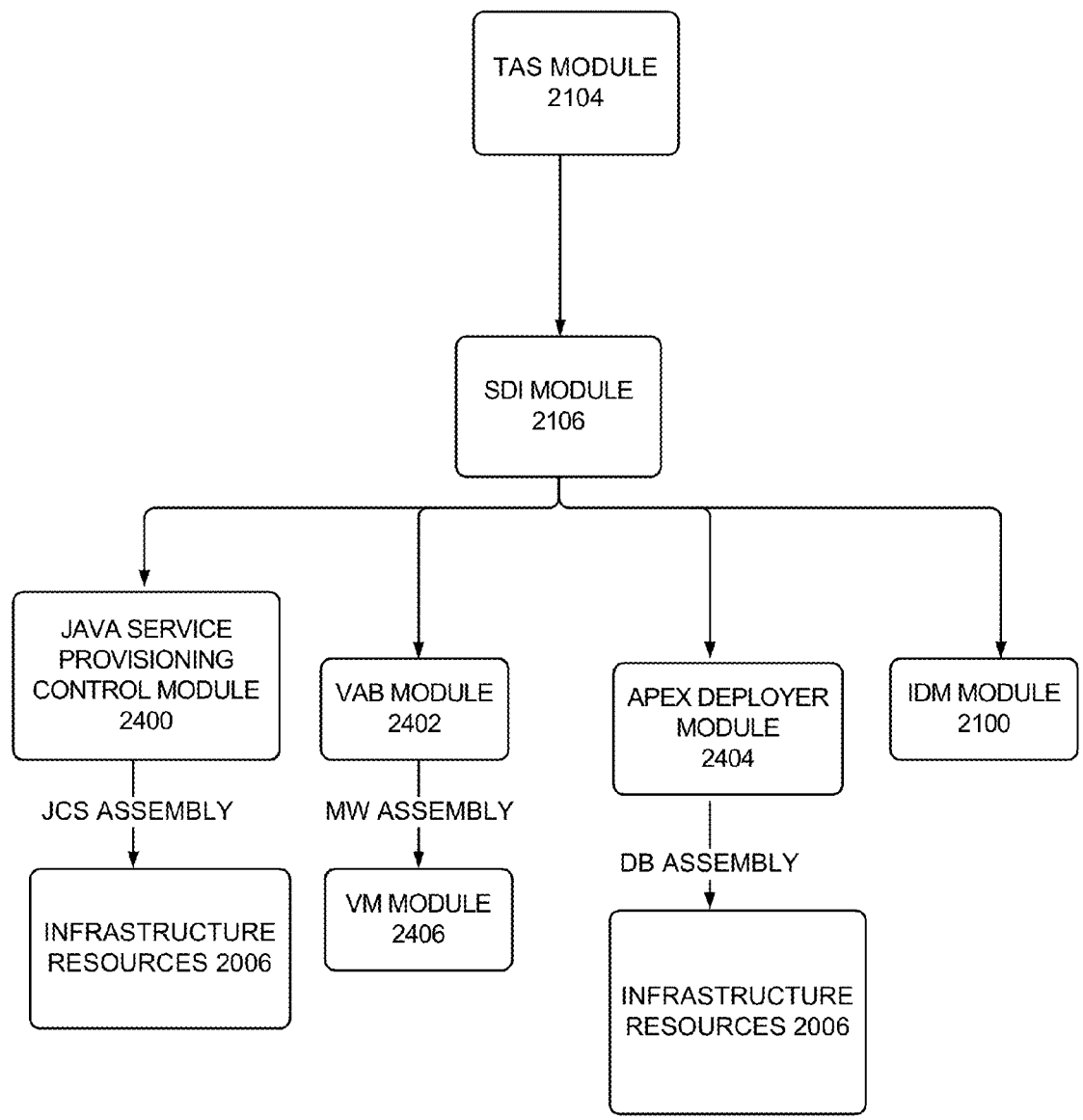
FIG. 24 is a simplified block diagram illustrating the interactions of the SDI module with one or more modules in the cloud infrastructure system, in accordance with an embodiment of the present invention.

FIG. 24 is a simplified block diagram illustrating the interactions of the SDI module with one or more modules in the cloud infrastructure system, in accordance with an embodiment of the present invention. In one embodiment, SDI module 2106 interacts with TAS module 2104 to provision resources for services in a subscription order received by TAS module 2104. In certain embodiments, one or more of the modules illustrated in FIG. 24 may be modules within cloud infrastructure system 2000. In other embodiments, one or more of the modules that interact with SDI module 2106 may be outside cloud infrastructure system 2000. In addition, alternative embodiments may have more or less modules than those shown in FIG. 24. These modules may be implemented in hardware, or software, or combinations thereof.

In one embodiment, the modules in SDI module 2106 may include one or more modules in SaaS platform 2002 and PaaS platform 2004 in cloud infrastructure system 2000. In order to perform provisioning of resources for various services, SDI module 2106 may interact with various other modules, each customized to help with provisioning resources for a particular type of service. For example, as illustrated in FIG. 24, SDI module 2106 may interact with a Java service provisioning control module 2400 to provision Java cloud services. In one embodiment, Java service provisioning control component 2400 may deploy a Java Cloud Service (JCS) assembly specified by SDI module 2106 that includes a set of tasks to be performed to provision Java cloud services. Infrastructure resources 2006 then determines the resources needed to provision the Java cloud services.

As other examples, SDI module 2106 may interact with one or more modules such as a Virtual Assembly Builder (VAB) module 2402, an Application Express (APEX) deployer module 2404, a Virtual Machine (VM) module 2406, an IDM module 2100, and a database machine module 2018. VAB module 2402 includes capabilities to configure and provision complete multi-tier application environments. In one embodiment, VAB module 2402 deploys a Middleware (MW) service assembly specified by SDI module 2106 to provision a MW service in cloud infrastructure system 2000 using the services provided by VM module 2406. APEX deployer module 2404 includes capabilities to configure and provision database services. In one embodiment, APEX deployer module 2404 deploys a database service assembly specified by SDI module 2106 to provision a database service in cloud infrastructure system 2000 using the resources provided by infrastructure resources 2006. SDI module 2106 interacts with IDM module 2100 to provide identity services such as access management across multiple applications in cloud infrastructure system 2000.

Figure 25:
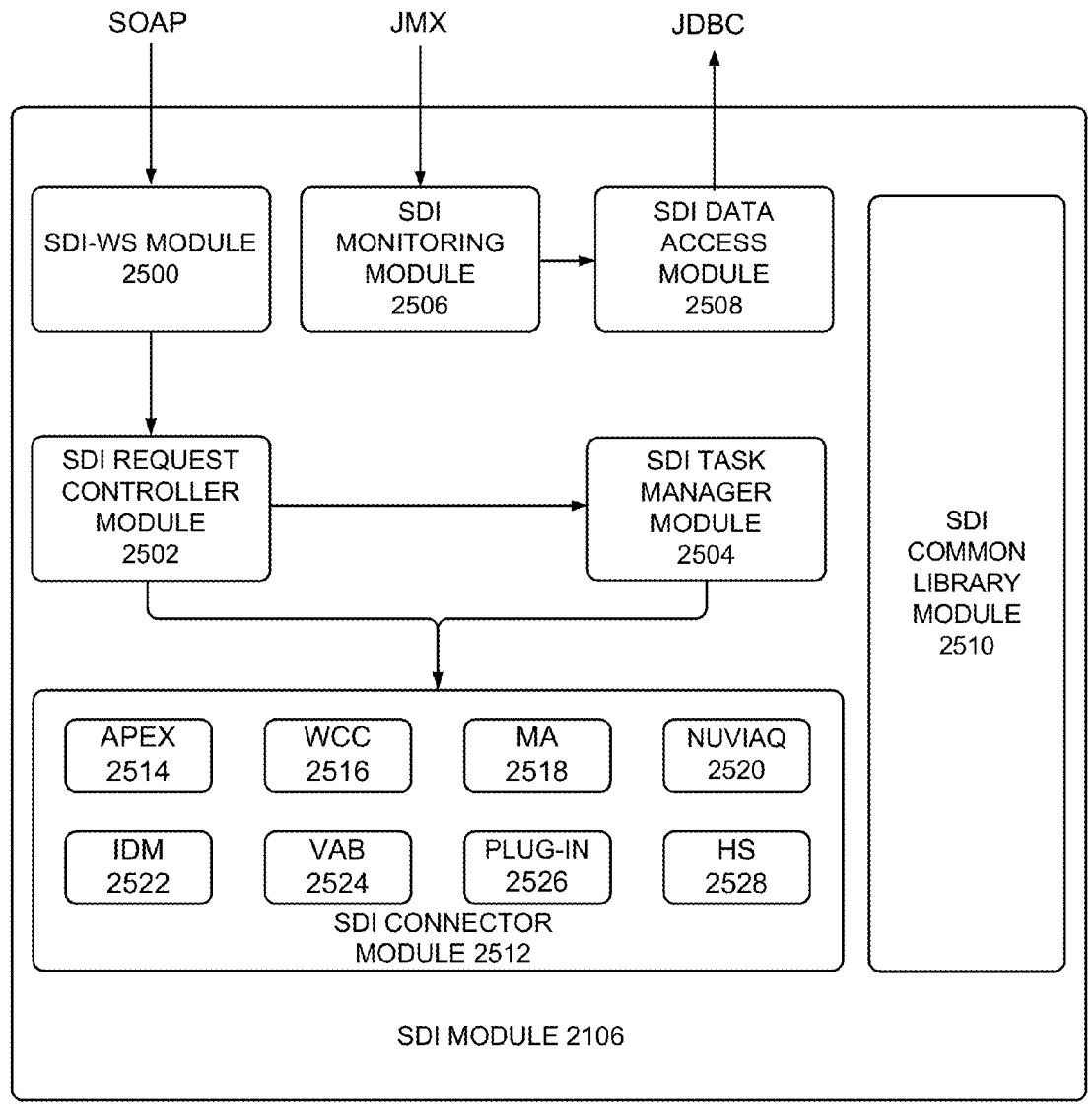
FIG. 25 depicts a simplified high level diagram of sub-modules of the SDI module according to an embodiment of the present invention.

FIG. 25 depicts a simplified high level diagram of sub-modules of the SDI module according to an embodiment of the present invention. In the embodiment depicted in FIG. 25, SDI module 2106 includes a SDI-Web Services (WS) module 2500, an SDI request controller module 2502, an SDI task manager module 2504, an SDI monitoring module 2506, an SDI data access module 2508, an SDI common library module 2510, and an SDI connector module 2512. These modules may be implemented in hardware, or software, or combinations thereof. SDI module 2106 depicted in FIG. 25 and its various modules are meant for illustrative purposes only and are not intended to limit the scope of embodiments of the present invention. Alternative embodiments may have more or less modules than those shown in FIG. 25. These modules and their functions are described in detail below.

SDI-WS module 2500 includes capabilities for receiving a step in the business associated with an order from business process executor 2216 of TAS component 2104. In one embodiment, SDI-WS module 2500 parses each step of the business process and converts the step into an internal representation used by SDI module 2106. In one embodiment, each step of the business process associated with the order arrives through a web service processing layer (for example, via System Provisioning API discussed in FIG. 22B) in the form of a SOAP request to SDI-WS module 2500.

SDI request controller module 2502 is the internal request processing engine in SDI module 2106 and includes capabilities for performing asynchronous request processing, concurrent request processing, concurrent task processing, fault tolerant and recovery and plug-in support related to the order requests. In one embodiment, SDI request controller module 2502 accepts each step of the business process associated with the order from SDI-WS module 2500 and submits the step to SDI task manager module 2504.

SDI task manager module 2504 translates each step specified in the business process into a series of tasks for provisioning the particular step. Once the set of tasks for a specific step have been provisioned, SDI task manager module 2504 responds to business process executor 2216 in TAS module 2104 with operation results that includes an order payload with details of the resources provisioned to fulfill the particular step. SDI task manager module 2504 repeats this process until all the steps of the particular business process associated with the order are complete.

In certain embodiments, SDI task manager module 2504 translates each step specified in the business process into a series of tasks by utilizing the services of SDI connector module 2512. SDI connector module 2512 includes one or more connectors for handling the deployment of tasks specified by SDI task manager module 2504 to provision one or more services related to the order request. In certain embodiments, one or more of the connectors may handle tasks that are specific to a particular service type while other connectors may handle tasks that are common across different service types. In one embodiment, SDI connector module 2512 includes a set of connectors (wrapper APIs) that interface with one or more of the external modules (shown in FIG. 24) in cloud infrastructure system 2000 to provision the services and resources related to the order request. For example, Application Express (APEX) connector 2514 interfaces with APEX deployer module 2404 to provision database services. Web Center Connector 2516 (WCC) interfaces with a web center module in cloud infrastructure system 2000 to provision web services. The web center module is a user engagement platform and includes capabilities for delivering connectivity between people and information in cloud infrastructure system 2000.

In certain embodiments, Middleware Applications (MA) connector 2518 interfaces with VAB module 2402 in cloud infrastructure system 2000 to provision middleware application services. NUVIAQ connector 2520 interfaces with VAB module 2402 to provision Java services. IDM connector 2522 interfaces with IDM module 2100 to provide identity and access management for users subscribing to services and resources in cloud infrastructure system 2000. Virtual Assembly Builder (VAB) connector 2524 interfaces with VAB module 2402 in cloud infrastructure system 2000 to configure and provision complete multi-tier application environments. Plug-in connector 2526 interfaces with EM module 2108 to manage and monitor the components in cloud infrastructure system 2000. HTTP server connector 2528 interfaces with one or more web servers in the PaaS platform to provide connection services to users in cloud infrastructure system 2000.

SDI monitoring module 2506 in SDI module 2106 provides an inbound interface for receiving Java Management Extensions (JMX) requests. SDI monitoring module 2506 also provides tools for managing and monitoring applications, system objects and devices in cloud infrastructure system 2000. SDI-data access module 2508 provides an inbound interface for receiving Java Database Connectivity (JDBC) requests. SDI-data access module 2508 supports data access and provides object relational mapping, java transaction API services, data access objects, and connection pooling in cloud infrastructure system 2000. The SDI-common library module 2510 provides configuration support for the modules in SDI module 2106.

Figure 26A:
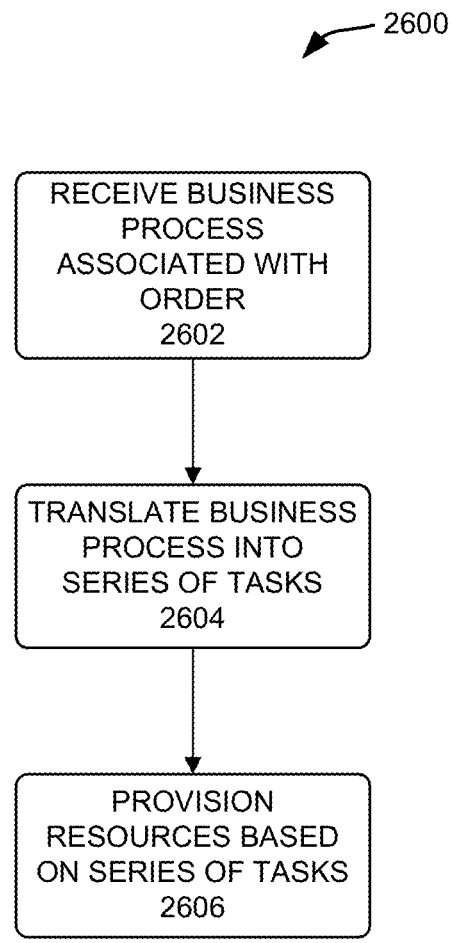
FIG. 26A depicts a simplified flowchart depicting processing that may be performed by the SDI component in the cloud infrastructure system, in accordance with an embodiment of the present invention.

The embodiment of FIG. 25 discussed above describes modules in the SDI module according to an embodiment of the present invention. FIG. 26A depicts a simplified flowchart 2600 depicting processing that may be performed by the modules of the SDI module in the cloud infrastructure system, in accordance with an embodiment of the present invention. The processing depicted in FIG. 26A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 26A is not intended to be limiting. Other sequences of steps may also be performed according to alternative embodiments. For example, alternative embodiments of the present invention may perform the steps outlined above in a different order. Moreover, the individual steps illustrated in FIG. 26A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 26A may be performed by one or more modules in the SDI module 2106 discussed in detail in FIG. 25.

At 2602, a business process associated with a subscription order is received. In one embodiment, SDI-WS module 2500 in SDI module 2106 receives one or more steps in the business process associated with the subscription order from business process executor 2216. At 2604, each step in the business process is translated into a series of tasks for provisioning resources for the subscription order. In one embodiment, SDI task manager module 2504 in SDI module 2106 translates each step specified in the business process into a series of tasks by utilizing the services of SDI connector module 2512. At 2606, the subscription order is provisioned based on the series of tasks. In one embodiment, and as discussed in FIG. 25, SDI connector module 2512 includes one or more connectors for handling the deployment of tasks specified by SDI task manager module 2504 to provision resources for the services in the subscription order.

As described above with respect to FIG. 25, SDI task manager module 2504 translates each step specified in a business process into a series of tasks by utilizing the services of SDI connector module 2512, which may include one or more connectors for handling the deployment of tasks specified by SDI task manager module 2504 to provision one or more services related to the order request. One or more of the connectors may handle tasks that are specific to a particular service type while other connectors may handle tasks that are common across different service types. In one embodiment, SDI connector module 2512 includes a set of connectors (wrapper APIs) that interface with one or more of the external modules (shown in FIG. 24) in cloud infrastructure system 2000 to provision the services and resources related to the order request. For example, a NUVIAQ connector 2520 interfaces with VAB module 2402 to provision Java services.

Figure 26B:
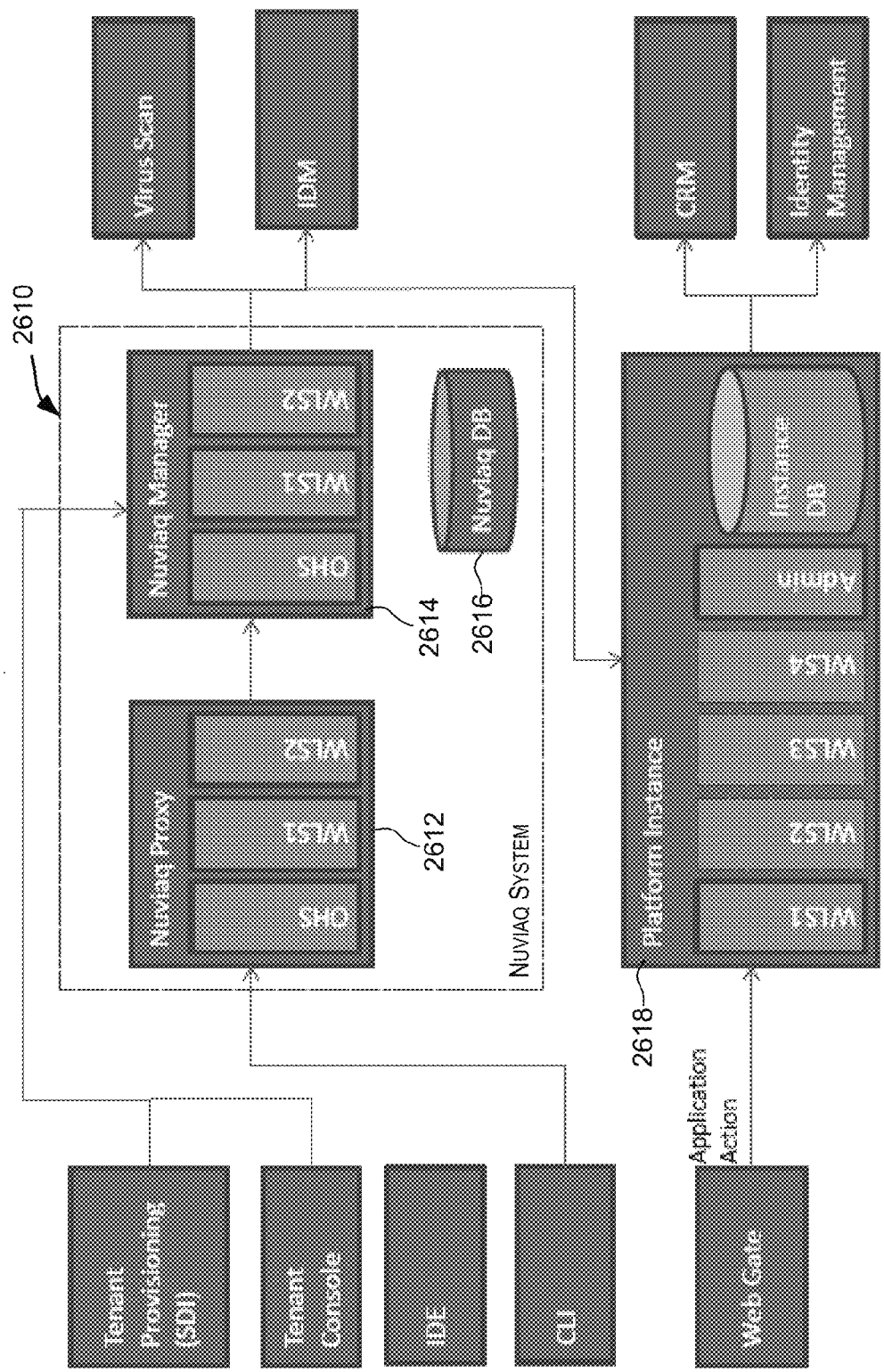
FIG. 26B depicts a simplified block diagram showing the high-level architecture of a Nuviaq system and its relationships with other cloud infrastructure components according to an embodiment of the present invention.

FIG. 26B depicts a simplified block diagram showing the high-level architecture of a Nuviaq system 2610 and its relationships with other cloud infrastructure components according to an embodiment of the present invention. It should be appreciated that Nuviaq system 2610 depicted in FIG. 26B may have other components than those depicted in FIG. 26B. Further, the embodiment shown in FIG. 26B is only one example of a cloud infrastructure system that may incorporate an embodiment of the invention. In some other embodiments, Nuviaq system 2610 may have more or fewer components than shown in FIG. 26B, may combine two or more components, or may have a different configuration or arrangement of components.

In certain embodiments, Nuviaq system 2610 may be configured to provide a runtime engine for orchestrating PaaS operations. Nuviaq system 2610 may provide a web service API to facilitate integration with other products and services. Nuviaq system 2610 also provides support for complex workflows in system provisioning, application deployment and associated lifecycle operations and integrates with management and monitoring solutions.

In the embodiment depicted in FIG. 26B, Nuviaq system 2610 comprises a Nuviaq proxy 2612, a Nuviaq manager 2614, and a Nuviaq database 2616. In certain embodiments, Nuviaq manager 2614 provides an entry point into Nuviaq system 2610, providing secure access to PaaS operations via the web service API. Internally, it tracks system state in the database and controls job execution on the workflow engine. In a public cloud, Nuviaq manager 2614 may be accessed by the Tenant Provisioning system (SDI 2106) and the Tenant Console, to drive provisioning and deployment operations respectively.

In one embodiment, Nuviaq manager 2614 executes jobs asynchronously via an internal workflow engine. A job may be a sequence of actions specific to a given PaaS workflow. Actions may be performed in order, with failure in any step resulting in failure of the overall job. Many workflow actions delegate to external systems relevant to the workflow, such as the EM command line interface (cli). In one implementation, Nuviaq manager 2614 application may be hosted in a 21-node WebLogic cluster with associated HTTP server (e.g., Oracle HTTP Server or OHS) instance, running inside a firewall.

In certain embodiments, Nuviaq proxy 2612 is the public access point to the Nuviaq API. In one embodiment, only Public API may be exposed here. Requests received by proxy 2612 may be forwarded to Nuviaq manager 2614. In one embodiment, Nuviaq proxy 2612 runs outside the firewall, whereas manager 2614 runs within the firewall. In one implementation, Nuviaq proxy 2612 application runs on a WebLogic cluster running outside the firewall.

In certain embodiments, Nuviaq database 2616 tracks various domain entities such as, without limitation, platform instance, deployment plan, application, WebLogic domain, jobs, alerts, and the like. Primary keys may be aligned with the Service Database where appropriate.

In one embodiment, Platform Instance 2618 may contain all resources required for a WebLogic service for a given tenant.

Nuviaq system 2610 may rely on additional systems of cloud infrastructure system 2000 to carry out the workflows used the WebLogic cloud service. These dependencies may include dependencies on SDI 2106, IDM 2100, a virus scan system, a service database, CRM instances, and the like. For example, Nuviaq system 2610 may depend upon functions performed by an Assembly Deployer in SDI 2106. In one embodiment, the Assembly Deployer is a system to manage interactions with OVAB (Oracle Virtual Assembly Builder) and OVM (Oracle Virtual Machine). Capabilities of the Assembly Deployer used by Nuviaq system 2610 may include, without limitation, functions for deploying an assembly, un-deploying an assembly, describing assembly deployment, scaling appliance, and the like. In one implementation, Nuviaq system 2610 accesses the Assembly Deployer via a web service API.

In certain embodiments, security policies may require certain artifacts to be scanned for viruses before being deployed to an application. Cloud infrastructure system 2000 may provide a virus scan system for this purpose that provides scanning as a service for multiple components of the public cloud.

In certain embodiments, a public cloud infrastructure may maintain a Service Database containing information about tenants (e.g., customers) and their service subscriptions. Nuviaq workflows may access to this data in order to properly configure a WebLogic service as a client to other services that the tenant also subscribes to.

Nuviaq system 2610 may depend on IDM 2100 for its security integration. In certain embodiments, Java Service instances can be associated with a CRM instance. The association allows user applications deployed to their Java Service instance to access a CRM instance though Web Service calls.

Various entities may use services provided by Nuviaq system 2610. These clients of Nuviaq system 2610 may include: a Tenant Console, which is an management server (e.g., Oracle Management Server) based user interface that customers may access to manage their applications on their platform instances; several IDEs such as Oracle IDEs (JDeveloper, NetBeans, and OEPE) have been extended to offer access to application lifecycle management operations; one or more Command Line Interfaces (CLIs) that are available to access lifecycle operations on the platform instances.

Provisioning use case for Nuviaq system 2610—A Provision Platform Instance use case is realized via the Create Platform Instance operation of the Nuviaq API. In the context of cloud infrastructure system 2000, a service instance with respect to the Nuviaq system corresponds to a Nuviaq platform instance. A platform instance is assigned a unique identifier is used on all subsequent operations related to this instance. A Platform Deployment descriptor provided to the Create Platform Instance action allows for properties to be set that modify the configuration of the platform instance to meet the subscription requirements of the tenant. These properties may include for example:

Property#1: oracle.cloud.service.weblogic.size
  Values: BASIC, STANDARD, ENTERPRISE
  Description: Specifies the subscription type. This impacts the number of servers, database limits and quality of service settings.
Property#2: oracle.cloud.service.weblogic.trial
  Values: TRUE, FALSE
  Description: Indicates whether or not this is a trial subscription.
Property#3: oracle.cloud.service.weblogic.crm
  Values: CRM Service ID
  Description: Identifies a CRM service to be associated with this WebLogic service instance.

Figure 26C:
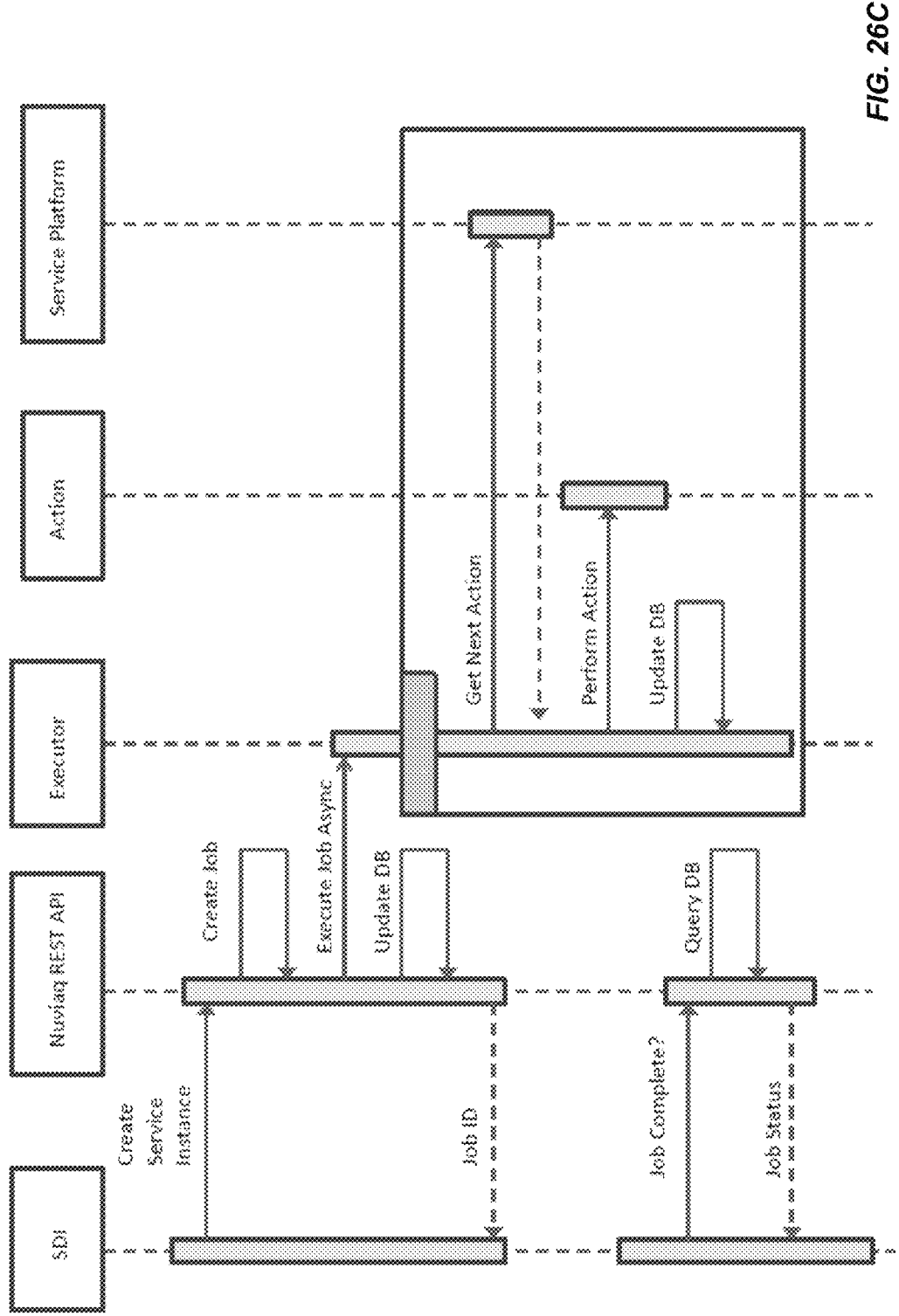
FIG. 26C depicts an example sequence diagram illustrating steps of a provisioning process using a Nuviaq system according to an embodiment of the present invention.

FIG. 26C depicts an example sequence diagram illustrating steps of a provisioning process using a Nuviaq system according to an embodiment of the present invention. The sequence diagram depicted in FIG. 26C is only an example and is not intended to be limiting.

Install/Update Application use case—The Install Application operation deploys an application to a running WebLogic Server after validating that the application archive meets the security requirements of the Public Cloud. In one embodiment, the Application Deployment descriptor provided to the Install Application action allows for properties to be set that modify the configuration of the application to meet the subscription requirements of the tenant. These properties may include for example:

Property: oracle.cloud.service.weblogic.state
Values: RUNNING, STOPPED
Description: Specifies the initial state of the application after deployment.

Figure 26D:
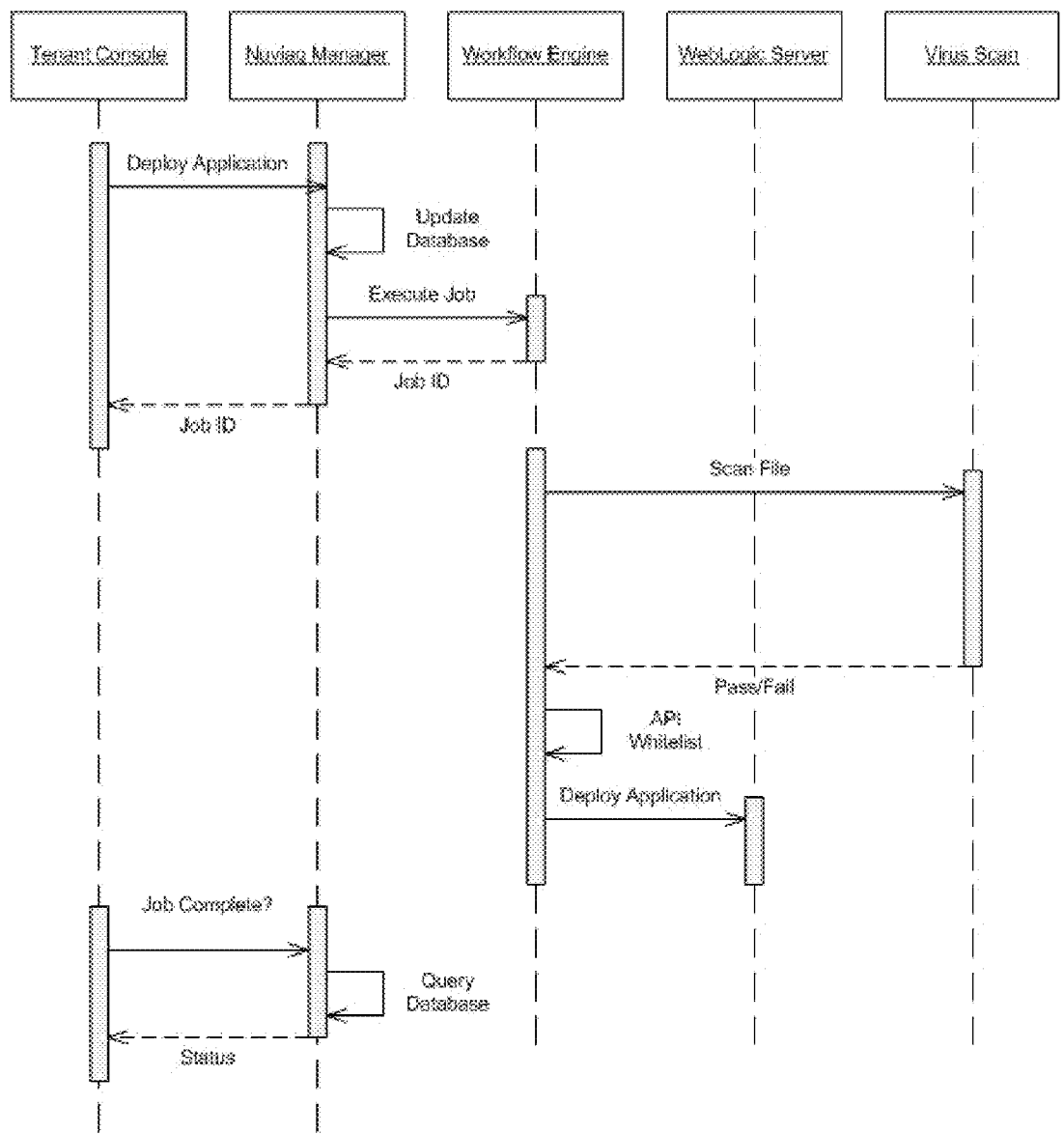
FIG. 26D depicts an example sequence diagram illustrating steps of a deployment process using a Nuviaq system according to an embodiment of the present invention.

FIG. 26D depicts an example sequence diagram illustrating steps of a deployment process using a Nuviaq system according to an embodiment of the present invention. The sequence diagram depicted in FIG. 26D is only an example and is not intended to be limiting.

Accordingly, in certain embodiments, TAS 2104 and SDI 2106 working in cooperation are responsible for provisioning resources for one or more services ordered by a customer from a set of services offered by cloud infrastructure system 2000. For example, in one embodiment, for provisioning a database service, the automated provisioning flow may be as follows for a paid subscription:

(1) Customer places an order for a paid subscription to a service via Store UI 2110.
(2) TAS 2104 receives the subscription order.
(3) When services are available TAS 2104 initiates provisioning by using the services of SDI 2106. TAS 2104 may perform business process orchestration, which will execute the relevant business process to complete the provisioning aspect of the order. In one embodiment, TAS 2104 may use a BPEL (Business Process Execution Language) Process Manager to orchestrate the steps involved in the provisioning and handle the lifecycle operations.

(4) In one embodiment, to provision a database service, SDI 2106 may call PLSQL APIs in the CLOUD_UI to associate a schema for the requesting customer.

(5) After successful association of a schema to the customer, SDI signals TAS and TAS send a notification to the customer that the database service is now available for use by the customer.

(6) The customer may log into cloud infrastructure system 2000 (e.g., using an URAL such as cloud.oracle.com) and activate the service.

In some embodiments, a customer may also be allowed to subscribe to a service on a trial basis. For example, such a trial order may be received via cloud UI 2112 (e.g., using cloud.oracle.com).

Figure 26E:
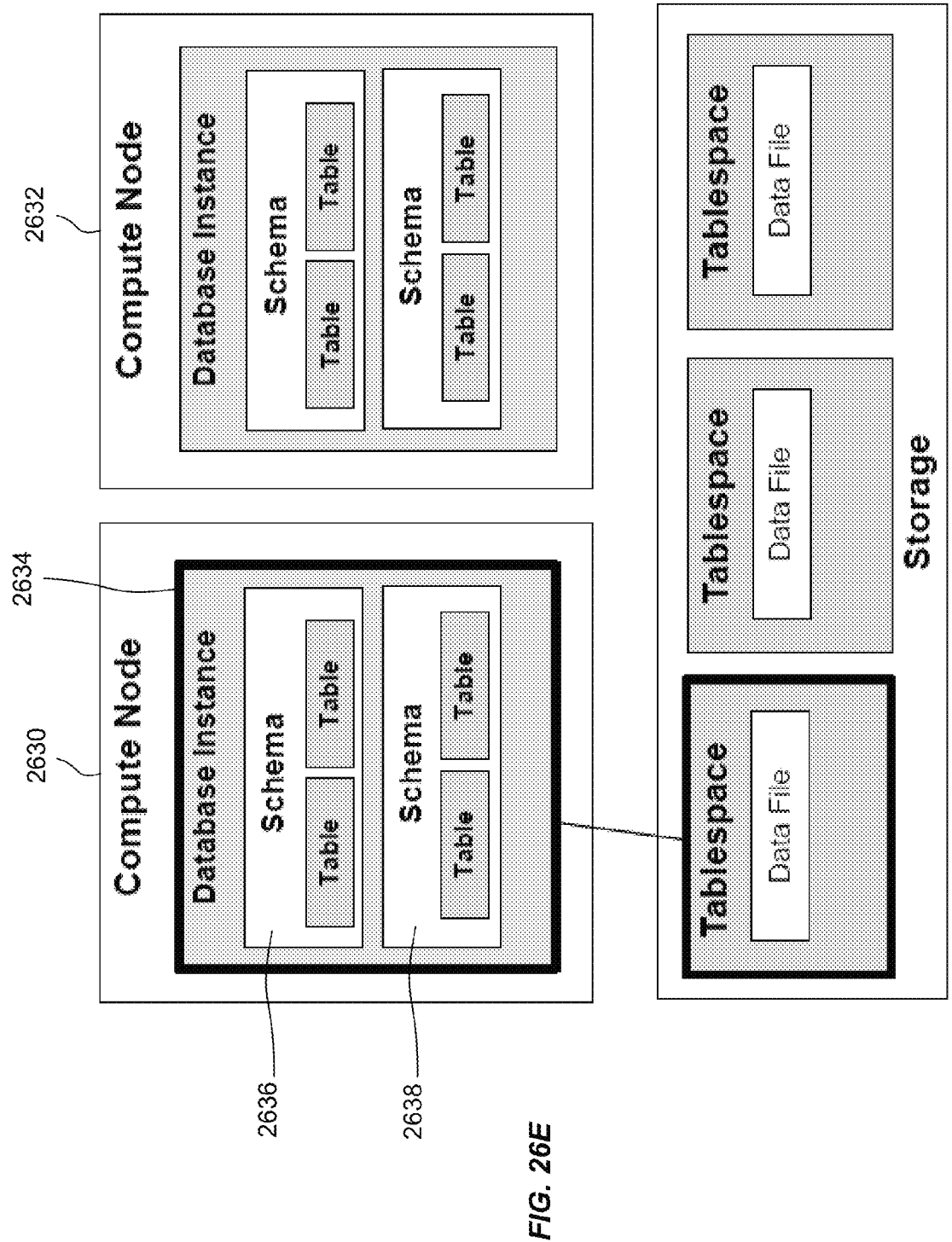
FIG. 26E depicts an example of database instances provisioned for a database service according to an embodiment of the present invention.

In certain embodiments, cloud infrastructure system 2000 enables underlying hardware and service instances to be shared between customers or tenants. For example, the database service may be provisioned as shown in FIG. 26E in one embodiment. FIG. 26E depicts multiple Exadata compute nodes 2630 and 2632, each providing a database instance provisioned for the database service. For example, compute node 2630 provides a database instance 2634 for a database service. Each Exadata compute node may have multiple database instances.

In certain embodiments, each database instance can comprise multiple schemas and the schemas may be associated with different customers or tenants. For example, in FIG. 26E, database instance 2634 provides two schemas 2636 and 2638, each with its own tables. Schema 2636 may be associated with a first customer or tenant subscribing to a database service and schema 2638 may be associated with a second customer or tenant subscribing to the database service. Each tenant gets a completely isolated schema. Each schema acts like a container that can manage database objects including tables, views, stored procedures, triggers, etc. for the associated tenant. Each schema may have one dedicated tablespace, with each tablespace having one data file.

In this manner, a single database instance can provide database services to multiple tenants. This not only enables sharing of underlying hardware resources but also enables sharing of service instance between tenants.

In certain embodiments, such a multi-tenancy system is facilitated by IDM 2100, which beneficially enables multiple separate customers, each having their own separate identity domains, to use hardware and software that is shared in the cloud. Consequently, there is no need for each customer to have its own dedicated hardware or software resources, and in some cases resources that are not being used by some customers at a particular moment can be used by other customers, thereby preventing those resources from being wasted. For example, as depicted in FIG. 26E, a database instance can service multiple customers each with their respective identity domains. Although each such database service instance can be a separate abstraction or view of a single physical multi-tenant database system that is shared among the many separate identity domains, each such database service instance can have a separate and potentially different schema than each other database service instance has. Thus, the multi-tenant database system can store mappings between customer-specified database schemas and the identity domains to which those database schemas pertain. The multi-tenant database system can cause the database service instance for a particular identity domain to use the schema that is mapped to that particular identity domain.

The multi-tenancy can also be extended to other services such as the Java Service. For example, multiple customers can have a JAVA service instance placed within their respective identity domains. Each such identity domain can have a JAVA virtual machine, which can be viewed as being a virtual "slice" of hardware. In one embodiment, a job-monitoring service (e.g., Hudson) can be combined with a JAVA enterprise edition platform (e.g., Oracle WebLogic) in the cloud to enable each separate identity domain to have its own separate virtual "slice" of the JAVA enterprise edition platform. Such a job-monitoring service can, for example, monitor the execution of repeated jobs, such as building a software project or jobs run by an operating system's time-based job scheduler. Such repeated jobs can include the continuous building and/or testing of software projects. Additionally or alternatively, such repeated jobs can include the monitoring of executions of operating system-run jobs that are executed on machines that are remote from the machine on which the job-monitoring service executes.

As is mentioned above, a single IDM system can include multiple layers and multiple sub-systems. At least some of these sub-systems can be conceptually oriented relative to each other in a horizontal manner, such that they are conceptually located within the same layer of the IDM system. However, different components of the IDM system can be located among different layers thereof. In the conceptually bottom-most layer, the IDM system's identity data can be stored. Among other kinds of information, the identity data can include user identities and definitions. The identity data can include identities of all entities known by the IDM system, regardless of the specific partition, or identity domain, to which those entities are confined. Such entities can include humans who interact with the IDM system. Such entities also can include non-human systems.

The identities stored within the identity data can be organized as a directory. Various products that interact with the IDM system can be configured and designed to have an awareness of the directory. Such products can include, for example, an identity manager and/or an access manager that implements single sign-on (SSO) functionality. In an embodiment, although all of the identities for the IDM system can be stored in the conceptually bottom-most layer of the IDM system, these identities can be organized into partitions that are isolated from each other. In one sense, the identity data can be imagined as the core of the IDM system. A multitude of various identity management services can rely on the isolation that is achieved through this partitioning. These identity management services can provide an abstraction of tenancy. In each particular layer of the IDM system, the sub-systems present within that particular layer can rely upon the abstraction of tenancy that is provided by the sub-systems that are present within the layer immediately below (except for the bottom-most layer), and the sub-systems within that particular layer can provide an abstraction of tenancy to the sub-systems that are present within the layer immediately above (except for the top-most layer).

Embodiments of the invention can partition the single IDM system into multiple separate identity domains. Data managed by the IDM system can be partitioned by identity domain. Data belonging to a particular identity domain can be isolated from all other identity domains. As is discussed above, the IDM system can be shared by multiple separate tenants. Each such tenant can be a customer that has created an identity domain for his organization within the IDM system. Thus, the identity domain may be considered the unit of isolation from a security point of view. An identity domain, or tenancy, can provide security isolation for its tenant. In one embodiment, a single customer can create multiple separate identity domains, or tenancies, within the IDM system. For example, a single customer might purchase, from the IDM system provider, one identity domain dedicated to testing purposes and another identity domain dedicated to production purposes.

In an embodiment of the invention, upper-layer sub-systems that utilize the lower-layer identity store can be designed with an awareness of the manner in which identity domains map to the identity store. These upper-layer sub-systems can receive identity domain handles from the identity store. These upper-layer sub-systems can use such identity domain handles to create mappings between identity domains and the identity store. In each layer of the IDM system, the sub-systems within that layer can be consumers of information from other layers of the IDM system. Each sub-system can use its identity domain handle to manage the information pertaining to its partition of the identity store. A sub-system within a particular layer can pass down its identity domain handle to the sub-systems within the immediately lower layer to ensure that those sub-systems will interact with the correct partition of the identity store.

Various different sub-systems can each perform a part in creating a multi-tenant IDM system. For example, an SSO sub-system can be designed to cause the appearance of multiple separate SSO deployments within the IDM system. Each such sub-system can include a run-time component and a repository in which its metadata is contained. Each such run-time component can be designed to interact with separate identity domains in a multi-tenant environment.

Applications similarly can be designed to interact with separate identity domains in a multi-tenant environment. For example, two different applications in such an environment can interact with each other, and both such applications can be multi-tenant aware. Under such circumstances, when a user interacts with a first of the applications, the first application can determine the identity domain (from a set of identity domains) to which the user belongs. Having made this determination, the first application can then communicate the user's identity domain to the second application. The second application can then query the proper data partition, within the second application's repository, pertaining to the user's identity domain when obtaining data. Conceptually, the identity domain can be imagined as correlating a slice of information across application instances that are multi-tenant aware.

In a cloud-computing environment, some applications can be multi-tenant aware while others might not be multi-tenant aware. Applications that are not multi-tenant aware are referred to herein as "single-tenant applications," while applications that are multi-tenant aware are referred to herein as "multi-tenant applications." In an embodiment, an instance of a single-tenant application that is dedicated to a particular identity domain can be used exclusively by entities that belong to that particular identity domain. For example, a separate instance of an Oracle Fusion application can be instantiated and dedicated to each identity domain to which that application has been provisioned. A particular service instance can be dedicated to a particular identity domain, such that each separate identity domain can have its own dedicated instance of that particular service. Each transaction occurring within the cloud computing environment can be conducted in the context of an identity domain, regardless of whether the applications involved in the transaction are single-tenant applications or multi-tenant applications.

FIG. 1 is a block diagram that conceptually illustrates an example of a shared IDM system 100 from a tenant's perspective, according to an embodiment of the invention. Shared IDM system 100 can include a shared IDM and security infrastructure 102, service instances in identity domains 110A, 110B, and 110C, and tenant users 112A, 112B, and 112C. Notably, tenant A users 112A can use service instances in identity domain A 110A, tenant B users 112B can use service instances in identity domain B 110B, and tenant C users 112C can use service instances in identity domain C 110C. Each identity domain can be isolated from each other identity domain in shared IDM system 100, such that each tenant's users can be permitted to use only the service instances in that tenant's identity domain. As is discussed above, a particular customer of the provider of shared IDM system 100 can create one or more tenancies, or identity domains, within the cloud computing environment.

Each identity domain in shared IDM system 100 can include a separate and potentially different set of service instances. The inclusion of a particular set of service instances within a particular identity domain can be the result of that particular identity domain's customer having purchased or leased the use of those service instances from the provider of shared IDM system 100. Similar to the manner in which a customer can deploy applications in that customer's own network, a customer can purchase or lease the use of service instances within a cloud computing environment; such service instances therefore can be provided through hardware, software, and/or networks that is not owned or possessed by the customer himself. Service instances in identity domain A 110A can include a database service instance 116A, a JAVA service instance 118A, and a fusion customer relationship management (CRM) service instance 120A. Service instances in identity domain B 110B can include a database service instance 116B and a JAVA service instance 118B. Service instances in identity domain C 110C can include a database service instance 116C, a fusion CRM service instance 120C, and a social network service instance 122C. Although some service instances can actually be separate single-tenant instances in each identity domain, other service instances can be manifestations of the same single multi-tenant service instance. For example, database service instances 116A, 116B, and 116C all can be manifestations of the same single multi-tenant database service instance.

If a particular customer desires a particular set of service instances to be associated with a particular identity domain, then the particular customer can express that intent to the provider of shared IDM system 100 at the time that the particular customer purchases or leases that particular set of service instances. The identities (e.g., of users) within a particular identity domain all can be centrally managed by one or more identity domain administrators for that particular identity domain. For example, a particular identity domain might include identities for three different users. An identity administrator for the particular identity domain can specify that the first user can access a first subset of the particular identity domain's service instances, and that the second user can access a second and different subset of the particular identity domain's service instances, and that the third user can access a third and still different subset of the particular identity domain's service instances. Thus, each of the users can access a different subset of the particular identity domain's service instances, all as specified by an identity domain administrator for the particular identity domain.

In an embodiment, all of the service instances within a particular identity domain can use the same definition of a user's identity. As in a typical enterprise system, each user's identity within an identity domain can be created once. The applications and services included within that identity domain can then obtain information regarding the user identities created within that identity domain. The identity domain administrator can user various techniques for mapping user identities to applications and services. For example, such mappings can be constructed through the use of roles, groups, rules, etc. A role having associated permissions and authorizations can be created in the identity domain. Each role can be associated with a different set of applications and services that can be accessed by those users associated with that role. The identity domain administrator can then associate each role with a different set of user identities, thereby granting certain sets of the identity domain's users access to certain sets of applications and services within the identity domain. Alternatively, the identity domain administrator can directly grant access to a custom set of the identity domain's applications and services directly to certain user identities. In one embodiment of the invention, roles themselves can be formatted and stored as identities within an identity store of shared IDM system 100. A user can be associated with a variety of different roles.

As is discussed above, in one embodiment, all of the identities created for shared IDM system 100 can be stored within the same identity store, but this identity store can be partitioned into different "slices," with each slice being associated with a different identity domain. Thus, identities of tenant A users 112A can be found in a first slice, identities of tenant B users 112B can be found in a second slice, and identities of tenant C users 112C can be found in a third slice. In one embodiment of the invention, each identity in the identity store of shared IDM system 100 can indicate, as an attribute, the identity domain to which that identity belongs.

Each of the identity domains included in shared IDM system 100 can include a corresponding instance of Oracle platform security services, shown as Oracle platform security services 112A, 112B, and 112C, respectively. Each of Oracle platform security services 112A, 112B, and 112C can be a collection of application programming interfaces (APIs) designed to enable access to identity information. Shared IDM and security infrastructure 102 can include many different components, such as identity administration module 104, directory service and policy store 106, and access management module 108. In an embodiment, each such component within infrastructure 102 implements the APIs of Oracle platform security services 112A, 112B, and 112C. These APIs can expose, to service instances with each of the identity domains, methods that those service instances can invoke in order to access and make use of components within infrastructure 102.

In an embodiment of the invention, the first time that a particular customer purchases or leases service instances from the provider of shared IDM system 100, at least one identity domain is either explicitly or implicitly created for that customer. Alternatively, if at least one identity domain has already been created for and associated with the particular customer, then a mechanism of shared IDM system 100 can ask the customer whether he desires the newly purchased or leased service instances to be added to an identity domain that has already been created for and associated with the particular customer. If the customer answers affirmatively, then shared IDM system 100 can add the newly purchased or leased service instances to the set of existing service instances that are already associated with the existing identity domain. In this manner, a particular customer's service instances all can become associated with the same identity domain if that is the particular customer's intention. Such service instances can include, for example, various SaaS and PaaS instances.

In an embodiment of the invention, a customer can establish an account with a centralized store in order to enable that customer to purchase cloud-based services through the centralized store. Upon purchasing a service through the centralized store using this account, an identity domain-specific account can be created for that customer within the cloud computing environment. This identity domain-specific account can be associated with and isolated to the identity domain that is created for the customer upon the customer's first purchase of a cloud-based service through the centralized store. Thus, one account can be created to interact with the centralized store, and another separate account can be created to manage and administer the identity domain that is created through shared IDM system 100.

In an embodiment, at the time that an identity domain is created for a customer, the customer can instruct shared IDM system 100 to bind a specified name and/or uniform resource locator (URL) to that identity domain so that the customer can distinguish that identity domain from potential other identity domains that have been created for the same customer. The customer and his users can use the bound URL to access the corresponding identity domain, and its included service instances, in the cloud computing environment.

Components of infrastructure 102 do not belong to any single identity domain created for any customer Infrastructure 102 can be imagined as belonging, instead, to the cloud computing environment generally. In one embodiment of the invention, infrastructure 102 nevertheless can be associated with an identity domain for the cloud computing environment as a whole. This overarching cloud identity domain (which also can be called the "operations identity domain") can be distinguished from identity domains that are associated with customers. Users who belong to the cloud identity domain can be granted privileges to access service instances within, and to administer, any of the customers' identity domains. Such users are referred to herein as "operations users." Customer service representatives (CSRs) can have operations user identities created for them and associated with the cloud identity domain; therefore, the cloud identity domain also can be considered to be the CSR identity domain. A common security model can not only govern the isolation of an identity domain's users to their corresponding identity domains, but also can facilitate the interactions needed to manage all identity domains centrally. Thus, shared IDM system 100 can prevent users associated with customers' identity domains from performing operations relative to resources outside of their identity domains, but also can allow operations users associated with the cloud domain to perform operations relative to resources across customers' identity domains. The purposes of tenancies therefore can be at least twofold: first, to isolate tenancies from each other, and second, to manage other tenancies (in the case of the cloud identity domain).

Figure 2:
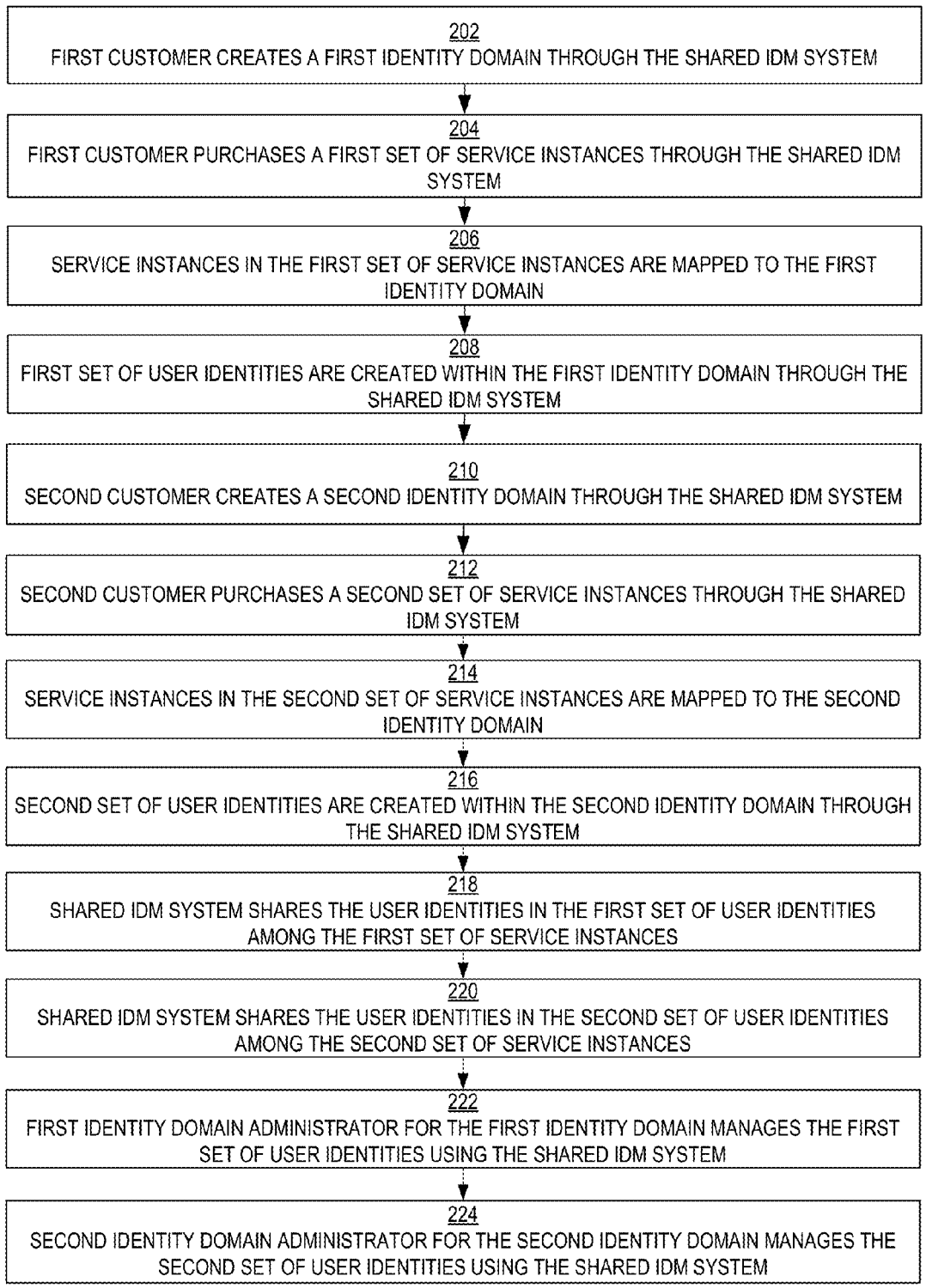
FIG. 2 is a flow diagram that illustrates an example of a technique for creating multiple identity domains for multiple customers through a shared IDM system, according to an embodiment of the invention.

FIG. 2 is a flow diagram that illustrates an example of a technique 200 for creating multiple identity domains for multiple customers through a shared IDM system, according to an embodiment of the invention. Although technique 200 is shown is including certain operations being performed in a certain order, alternative embodiments of the invention can involve additional, fewer, or alternative operations potentially being performed in a different order. In block 202, a first customer creates a first identity domain through the shared IDM system. In block 204, the first customer purchases a first set of service instances through or in connection with the shared IDM system. In block 206, the service instances in the first set of service instances are mapped to the first identity domain. For example, the shared IDM system may persistently store such a mapping within a computer-readable storage memory. Notably, as will be seen further below, each of several customers can make use of the same shared IDM system in establishing separate and isolated identity domains, so that there is no need for a separate IDM system to be instantiated per customer. In block 208, a first set of user identities are created within the first identity domain through the shared IDM system. The user identities in the first set of user identities are mapped to the first identity domain.

In block 210, a second customer creates a second identity domain through the shared IDM system. In block 212, the second customer purchases a second set of service instances through or in connection with the shared IDM system. In block 214, the service instances in the second set of service instances are mapped to the second identity domain. For example, the shared IDM system may persistently store such a mapping within a computer-readable storage memory. Thus, each of several customers can make use of the same shared IDM system in establishing separate and isolated identity domains, so that there is no need for a separate IDM system to be instantiated per customer. In block 216, a second set of user identities are created within the second identity domain through the shared IDM system. The user identities in the second set of user identities are mapped to the second identity domain.

In block 218, the shared IDM system shares the user identities in the first set of user identities among the first set of service instances but not among the second set of user instances. In block 220, the shared IDM system shares the user identities in the second set of user identities among the second set of service instances but not among the first set of user instances. Both the first and second sets of user identities may be stored in the same identity store of the same shared IDM system. In block 222, a first identity domain administrator for the first identity domain manages the first set of user identities using the shared IDM system. In block 224, a second identity domain administrator for the second identity domain manages the second set of user identities using the shared IDM system. Management of the user identities can include, for example, adding user identities, deleting user identities, modifying attributes of user identities, adding or removing associations between user identities and roles and/or groups, creating roles and/or groups, granting or removing service instance access permissions to or from users, roles, and/or groups, etc. In an embodiment of the invention, such management can be conducted through administrator interfaces provided by the shared IDM system. The administration of various different identity domains can be conducted through such administrator interfaces.

In an embodiment of the invention, various policies can be specified within the shared IDM system. Each such policy can include a set of rules which must be satisfied if the policy as a whole is to be satisfied. A policy can specify that access to a service instance or system resource is only to be granted if the policy's rules are all satisfied. An implicit policy can also exist, which requires that in order to a particular user to access a customer's identity domain's service instances, that particular user's identity must belong to that same identity domain. However, this implicit policy can permit operations users, who can exist outside of any customer's identity domains, to access the service instances of any customer's identity domains. In a multi-tenant IDM system, each policy can be crafted to reflect the intent that service instances associated with a particular identity domain are to be isolated within that particular identity domain.

For example, a cloud computing environment may include a directory and an access management system such as an SSO system. The SSO system can protect a multitude of URLs. The SSO system can be configured to protect a specified set of URLs, but no URLs that are not within the specified set (meaning that those latter URLs are not protected). A single host machine within the cloud computing environment can be associated with multiple different URLs. Conceptually, each host machine within the cloud computing environment can be visualized as having multiple gates standing between that host machine and users that desire to access that host machine. When a user attempts to access a URL that is associated with a particular host machine, the SSO system can route that user to the appropriate host machine. A gate that protects the host machine can examine the fully qualified URL that is being used in the attempt to access the host machine. This gate can either redirect the user to an SSO server or look up and enforce a policy pertaining to the host machine and the URL. Such a policy can indicate that the user is to be authenticated, that the user's attributes are to be discovered, and that based on the user's attributes, a decision is to be made as to whether the user is allowed to access the host machine using the URL or not. In an embodiment of the invention, such policies can be enhanced to reflect the boundaries of identity domains defined by the shared IDM system.

FIG. 3 is a block diagram that illustrates an example of an overview of a layered cloud-based IDM system 300, according to an embodiment of the invention. Cloud-based IDM system 300 can include multiple layers, such as cloud security foundation layer 302, cloud shared IDM layer 304, and Oracle IDM/security layer 306. In an embodiment, cloud security foundation layer 302 interfaces with cloud shared IDM layer 304, which interfaces with Oracle IDM/security layer 306. Oracle IDM/security layer 306 can implement a "raw" identity management system. Cloud shared IDM layer 304 can include a model for isolating each tenant's data, thus creating an abstraction of the "raw" identity system that is supportive of the concept of multiple tenants and isolated identity domains. Each layer can include multiple sub-layers and sub-systems, some of which are discussed further below.

Figure 4:
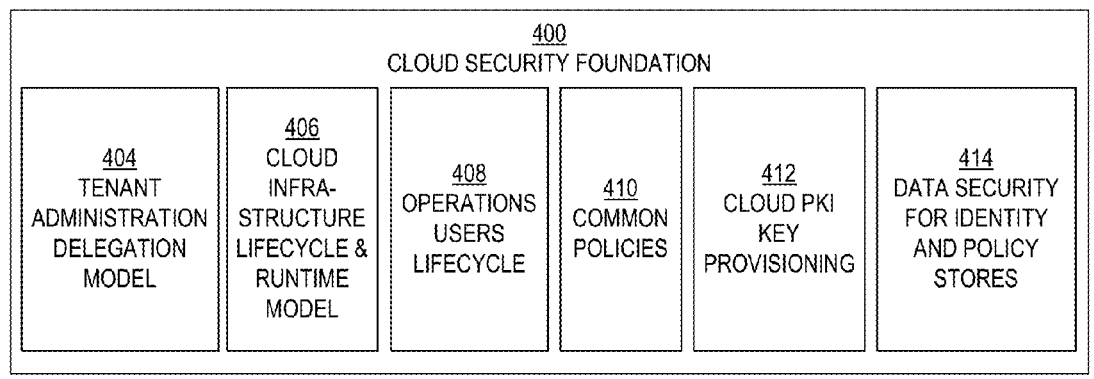
FIG. 4 is a block diagram that illustrates an example of the sub-systems of the cloud security foundation layer, according to an embodiment of the invention.

FIG. 4 is a block diagram that illustrates an example of the sub-systems of the cloud security foundation layer 400, according to an embodiment of the invention. Cloud security foundation layer 400 of FIG. 4 can correspond to cloud security foundation layer 302 of FIG. 3. Security foundation layer 400 can include multiple sub-systems, such as a tenant administration delegation model 404, a cloud infrastructure lifecycle & runtime model 406, an operations users lifecycle 408, common policies 410, cloud public key infrastructure (PKI) key provisioning 412, and data security for identity and policy stores 414.

Tenant administration delegation model 404 can be a model that takes into account the existence of the architecture of identity domains and associations of those identity domains with service instances. This model can be used to specify the roles that various users associated with an identity domain have relative to that identity domain or elements therein. The model can specify the permissions (e.g., relative to service instances, users, roles, etc.) that are granted to each role. Tenant administration delegation model 404 can enable a customer who has purchased an identity domain to appoint a user to be an identity domain administrator for that identity domain. In one embodiment, such a customer can use components of cloud security foundation layer 400 to create a hierarchy of roles. Such a hierarchy can be created implicitly upon the initial creation of the identity domain, and can pertain specifically to the identity domain whose creation caused the creation of the hierarchy. Thus, each identity domain can be associated with a separate and potentially different hierarchy of roles. In an embodiment, the role implicitly created at the top, or root, of the hierarchy is that of an identity domain administrator for the identity domain. Each identity domain can have one or more identity domain administrators. The identity domain administrator can have permissions and authorities sufficient to administer the identity domain as a whole, including all service instances, users, and other roles that exist within that identity domain.

Beneath the identity domain administrator in the role hierarchy, service administrators can be placed. Although the term "service administrator" is used herein to describe a category of roles that have permissions to administer service instances within an identity domain, there is not necessarily any role called "service administrator"; rather, there can be a variety of specific roles that all fall into the "service administrator" category. For example, each type of service instance can have a type of service administrator role to administer that service. Examples of service administrator roles include JAVA service administrator, database service administrator, fusion application administrator, etc. An identity domain administrator can use components of cloud security foundation layer 400 to appoint one or more users, who are associated with the identity domain, to be service administrators. Inasmuch as "service administrator" can be a category of roles rather than a role per se, the user interface that the identity domain administrator uses to appoint other users to service administrator roles may list each specific type of service administrator role (e.g., JAVA service administrator, database service administrator, fusion application administrator, etc.) to which the identity domain administrator can appoint a user. Each service administrator can have the permissions and authorities needed in order to administer and manage a particular service instance within the identity domain. Each service administrator can have the permissions and authorities needed in order to manage roles that are specifically related to and limited in scope to the particular service instance that he administers. However, a particular service administrator does not necessarily have any authority to manage any other service instance, or to administer the identity domain as a whole. Each service instance can have its own separate service administrator. Potentially, the same user can be appointed to be a service administrator for multiple service instances in the same identity domain. An identity domain administrator can perform all of the functions that a service administrator can perform, because the identity domain administrator is higher in the role hierarchy, but not vice-versa. In an embodiment, the designer of each service for which a service instance may be created in an identity domain is given the responsibility of ensuring that the hierarchy of service designer-defined roles that is associated with that service includes, typically at its root, the service-specific service administrator role for that service as a whole.

Figure 7:
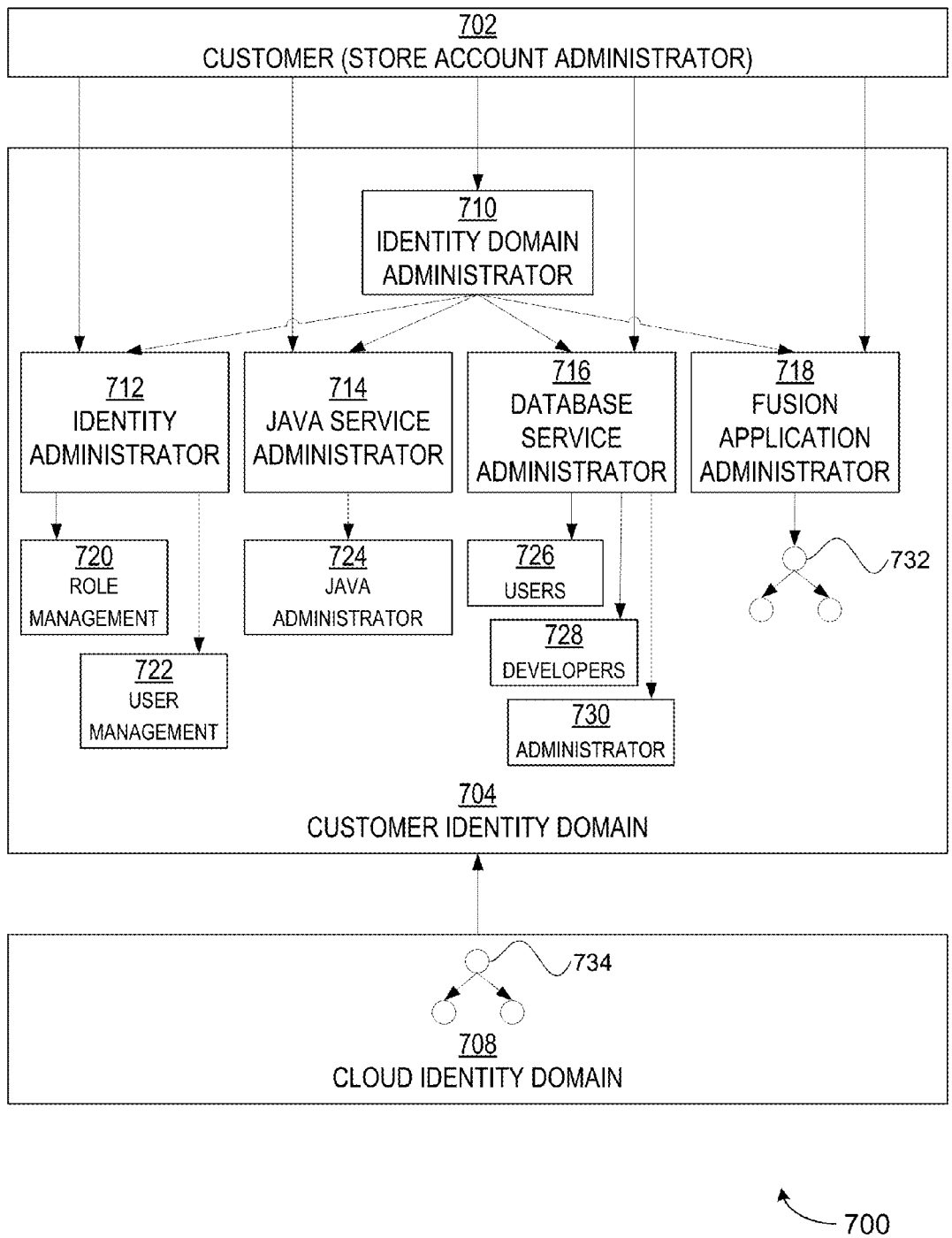
FIG. 7 is a block diagram that illustrates an example of a cloud-based IDM system in which role hierarchies can be used to administer identity domains, according to an embodiment of the invention.

FIG. 7 is a block diagram that illustrates an example of a cloud-based IDM system 700 in which role hierarchies can be used to administer identity domains, according to an embodiment of the invention. FIG. 7 shows a customer (store account administrator) 702, a customer identity domain 704, and a cloud identity domain 708. Customer 702 is not necessarily actually within any identity domain. Instead, customer 702 can have a store account with an on-line store. Customer 702 is therefore the administrator of the store account, which can be an account outside of the cloud-based system entirely. Customer 702 can use this account to purchase one or more identity domains, such as customer identity domain 704, and to purchase service instances to be deployed into such identity domains. Customer 702 can act in the capacity of a buyer. Because customer 702 does not necessarily have a user identity within an identity domain, customer 702 can, at the time of purchasing customer identity domain 704 through the on-line store, nominate another user (e.g., by specifying that other user's e-mail address to the on-line store) to be an identity domain administrator 710 (discussed in greater detail below) for customer identity domain 704. In this manner, a user having a user identity within customer identity domain 704 can access customer identity domain 704, even if customer 702 has no such user identity.

Customer identity domain 704 includes users who have been assigned various roles that are scoped within customer identity domain 704 and do not extend to any other identity domain. Among these roles can be that of identity domain administrator 710, mentioned above. Identity domain administrator 710 can be nominated by customer 702. Identity domain administrator 702 can delegate at least some of the permissions and authorities that he has, as part of his role, to other roles within customer identity domain 704. These other roles can include service and application administrator roles such as identity administrator 712, JAVA service administrator 714, database service administrator 716, and fusion application administrator 718. Each of these service administrators can have the permissions and authorities that are needed for, but limited to, the administration and management of users and roles relative to specific service instances within customer identity domain 704.

Identity administrator 712 can have the permissions to perform the tasks of role management 720 and user management 722 within customer identity domain 704. Identity administrator 712 can delegate role management 720 and user management 722 as roles to other user identities within customer identity domain 704. With these permissions, user identities and role identities pertaining to customer identity domain 704 can be managed, for example (e.g., password-resetting operations). Identity administrator 712 can be the same user as identity domain administrator 710. JAVA service administrator 714 can have the permissions to perform the task of JAVA administrator 724. JAVA service administrator 714 can delegate JAVA administrator 724 as a role to other user identities within customer identity domain 704. With these permissions, JAVA virtual machines can be instantiated, modified, and deleted, for example. Database service administrator 716 can have the permissions to assign database service-specific roles to other users within customer identity domain 704. These database service-specific roles can include those of users 726, developers 728, and administrator 730. Each such role can have different permissions relative to a database service instance. For example, users 726 can be limited to permissions that enable users 726 to query and otherwise use the data stored in the tables of a database; developers 728 can additionally have permissions that enable developers 728 to modify a configuration of the database, including system parameters, for example; and administrator 730 can have permission to perform all actions relative to the database service instance, including the management of other users relative to that service instance. Administrator 730 can be the same user as database service administrator 716. Fusion application administrator 718 can have the permissions to create and modify a CRM hierarchy 732 for use by a fusion application instance. Using these permissions, fusion application administrator can place, into CRM hierarchy 732, users who have user identities within customer identity domain 704. Fusion application administrator 718 can have the permissions to define roles and corresponding permissions for each position in CRM hierarchy 732, each such role being limited to the performance of operations relative to a fusion application instance. Other service administrator roles also can be defined and assigned.

In an embodiment, as discussed above, identity domain administrator 710, nominated by customer 702 (typically upon creation of customer identity domain 704), can delegate permissions and service instance roles to other users within customer identity domain 704. Additionally, in an embodiment, customer 702 can directly nominate users within customer identity domain 704 to become service administrators having those service instance roles. For example, in an embodiment, customer 702 can directly nominate each of identity domain administrator 710, identity administrator 712, JAVA service administrator 714, database service administrator 716, and fusion application administrator 718. In an embodiment, customer 702 can nominate these other users to service instance roles as a part of the purchase of the service instances to which those roles pertain. For example, customer 702 can, at the time of purchasing a service instance, specify, to an on-line store from which the service instance is being purchased, one or more e-mail addresses of users whom customer 702 is nominating to be service instance administrators for that service instance. Within the identity domain specified by customer 702, user identities can be automatically created for users having these e-mail addresses, and these users can be assigned service administrator roles for the service instance(s) specified by customer 702.

Furthermore, as is discussed above, cloud-based IDM system 700 can include, in addition to customer identity domains such as customer identity domain 704, an overarching cloud identity domain such as cloud identity domain 708. Cloud identity domain 708 can include operations users, discussed above. Cloud identity domain 708 does not belong to any customer, and exists independent of any customer. Users in cloud identity domain 708 can have permissions to administer roles, users, and service instances within customer identity domains such as customer identity domain 704 (as well as other customer identity domains, not shown, that may exist within cloud-based IDM system 700). An operational role hierarchy 734 can be defined within cloud identity domain 708. Operational role hierarchy 734 can define, for each of the operations users in cloud identity domain 708, the permissions, authorities, and roles possessed by that operations user. Policies defined within cloud identity domain 708 can place limitations on which customer identity domains certain operational roles can access, and on the types of operations that certain operational roles can perform relative to services, users, and resources within those customer identity domains. For example, a subset of operational user identities within cloud identity domain 708 can be limited by role and/or policy to the performance of identity management functions, although these operational user identities may have the capability to perform such identity management functions relative to identities defined in any customer identity domain in the cloud-based environment. In each identity domain, a run-time instance can enforce such policies.

In cloud-based IDM system 700, roles can be defined hierarchically. Privileges and permissions available to a lower-level role in the hierarchy can be inherited by higher-level roles in that hierarchy. The parent or ancestor role of another role in a role hierarchy can inherit the privileges and permissions that are available to the child or descendant role. Thus, although identity administrator 712 can inherit the roles and corresponding permission-based capabilities of role management 720 and user management 722 roles, and identity domain administrator 710 can inherit the roles and corresponding permission-based capabilities of identity administrator 712, the inheritance does not flow in the opposite direction in the hierarchy. In an embodiment, a role hierarchy is automatically created for each service instance at the time that the service instance is added to an identity domain; the roles within that role hierarchy can later be assigned and/or modified by users having permissions to do so. Each service instance's role hierarchy can differ in that it can define roles different from those defined in role hierarchies for other service instances.

In an embodiment, pre-defined roles (potentially thousands) for a service instance can be automatically created within an identity domain based on the type of service instance that is being added to the identity domain; a user does not necessarily need to define each role in each role hierarchy manually. Each type of service can be associated, prior to the addition of any instance of that service to any identity domain, with a service type role hierarchy that can be pre-defined by the authors of the service and automatically created when the service instance is added to an identity domain; for example, a database service can be associated with a pre-defined database service role hierarchy and a JAVA service can be associated with a pre-defined JAVA service role hierarchy. Thus, each type of service can be associated with a separate and potentially different pre-defined "template" of hierarchically related roles for that type of service. Some roles, such as identity domain administrator 710, can be pre-defined within a cloud-wide role model (and potentially can have an immutable definition), while other service instance-specific roles can be created and manually defined, by those having appropriate permissions, to have custom permissions relative to specific service instances.

Permissions associated with roles in pre-defined service type-specific role hierarchies can be inherited by hierarchically higher roles that are defined within the cloud-wide model. For example, each service administrator role for a particular type of service (e.g., database service) can inherit all roles (and associated permissions) pre-defined in the role hierarchy specific to that particular type of service. The identity domain administrator role can inherit all roles (and associated permissions) inherited by all service administrator roles in the identity domain. Thus, although identity domain administrator 710 is enabled by role inheritance to be able to perform any of the operations that any of service administrators 712-718 can perform, identity administrator 712 is not necessarily able to perform operations that the other service administrators 714-718 can perform; identity administrator 712 can be limited to performing general identity-based operations within the identity domain, not specific to any particular service instance. Being outside of the identity domain, customer 702 in one embodiment does not inherit any roles.

In an embodiment, when customer 702 uses the on-line store to nominate a person to have a particular role within customer identity domain 704, such as identity domain administrator 710 or any of service administrators 712-718, the on-line store can responsively send an e-mail message to the e-mail address of that nominated person. Customer 702 can provide the e-mail address to the on-line store as a part of the nomination process. The e-mail message sent to the nominated person's e-mail address can include a hyperlink that points to a web-based form that is served by a web server within the cloud computing environment. The web-based form can include fillable fields through which the message recipient can specify a user name, a password, and other information useful for creating a user identity for the nominee within customer identity domain 704. Upon the nominee's submission of the filled web-based form to the web server, the web server can cause the nominee's user identity to be created within customer identity domain 704, and can cause the specified role to be assigned to that user identity. Nomination can be viewed as a process through which an entity outside of the identity domain assigns a role to a user identity within the identity domain, while delegation can be viewed as a process through which a user identity within the identity domain assigns, to another user identity within that user identity domain, a role that the former user has authority (by virtue of his own role in the identity domain) to assign.

Figure 11:
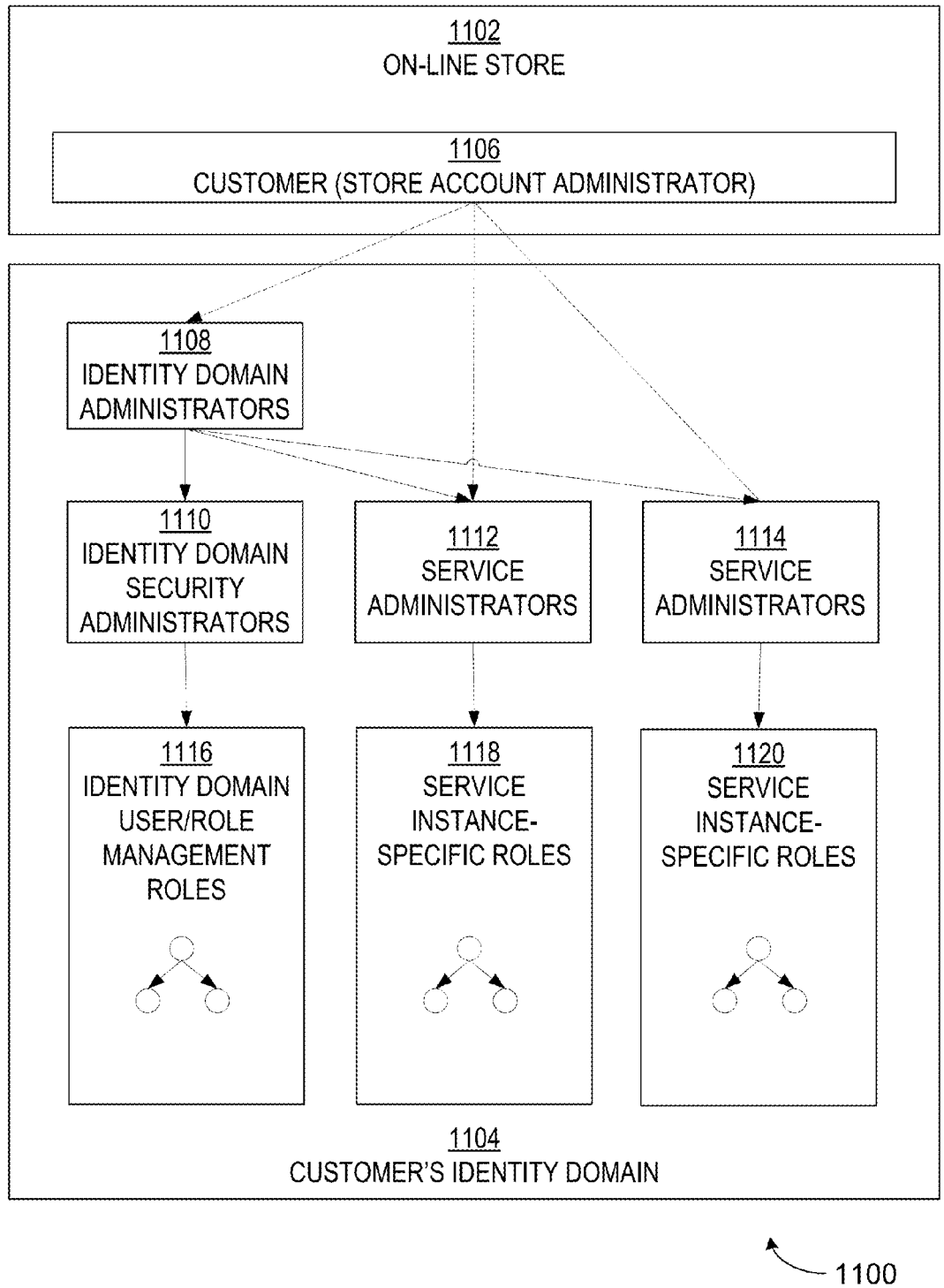
FIG. 11 is a block diagram that illustrates role delegation in a multi-tenant IDM system, according to an embodiment of the invention.

FIG. 11 is a block diagram that further illustrates role delegation in a multi-tenant IDM system, according to an embodiment of the invention, and as discussed above. System 1100 can include an on-line store 1102 and a customer's identity domain 1104. A customer (store account administrator) 1106 can have an account within on-line store 1102. Customer 1106 can nominate various users having identities within identity domain 1104 to various roles, as indicated by dashed arrow lines in FIG. 11. For example, customer 1106 can nominate such users to be identity domain administrators 1108, and/or service administrators 1112 and 1114 for different service instances. Such nomination can occur at the time that customer 1106 purchases identity domain 1104 from on-line store 1102. In turn, these users having identities within identity domain 1104 can delegate various roles to other users having identities within identity domain 1104, as indicated by solid arrow lines in FIG. 11. For example, identity domain administrators 1108 can delegate, to other users, roles such as identity domain security administrators 1110, and/or service administrators 1112 and 1114 for different service instances. These other users can further delegate roles to yet other users having identities within identity domain 1104. For example, identity domain security administrators 1110 can delegate, to other users, identity domain user/role management roles 1116. For another example, service administrators 1112 for one service instance can delegate, to other users, service instance-specific roles 1118 for that service instance. For yet another example, service administrators 114 for another service instances can delegate, to other users, service instance-specific roles 1120 for that other service instance.

Figure 12:
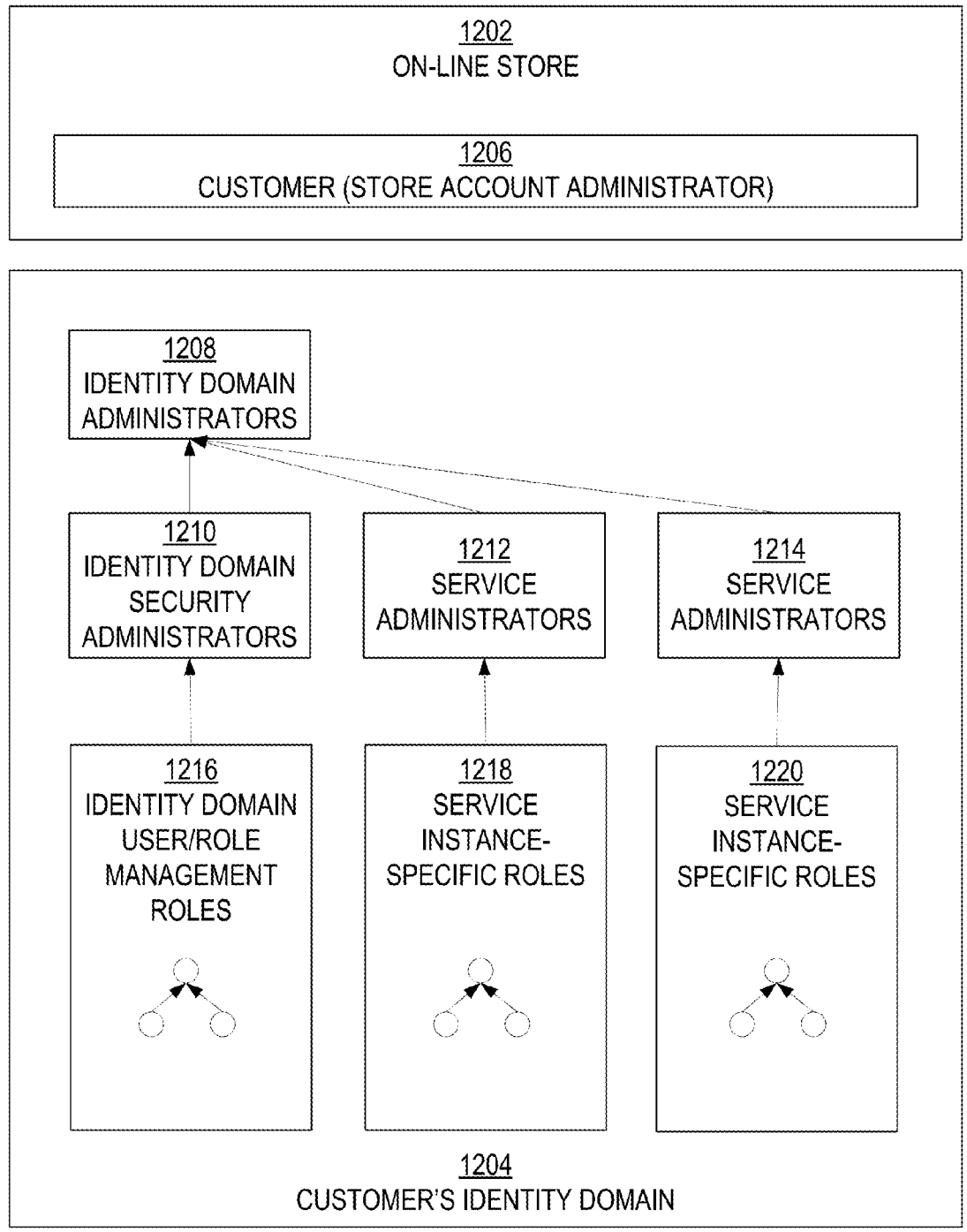
FIG. 12 is a block diagram that illustrates permission inheritance in a multi-tenant IDM system, according to an embodiment of the invention.

FIG. 12 is a block diagram that further illustrates permission inheritance in a multi-tenant IDM system, according to an embodiment of the invention, and as discussed above. System 1200 can include an on-line store 1202 and a customer's identity domain 1204. A customer (store account administrator) 1206 can have an account within on-line store 1202. In an embodiment, customer 1206 does not inherit any permissions because customer 1206 is not an identity within identity domain 1204. Within identity domain 1204, identity domain security administrators 1210 can inherit permissions from identity domain user/role management roles 1216. Service administrators 1212 for one service instance can inherit permissions from service instance-specific roles 1218 for that same service instance. Service administrators 1214 for another service instance can inherit permissions from service instance-specific roles 1220 for that other service instance. In turn, identity domain administrators 1208 can inherit permissions from each of identity domain security administrators 1210, and service administrators 1212 and 1214. Thus, in an embodiment, identity domain administrators 1208 can inherit permissions to administer all service instances in identity domain 1204.

Figure 5:
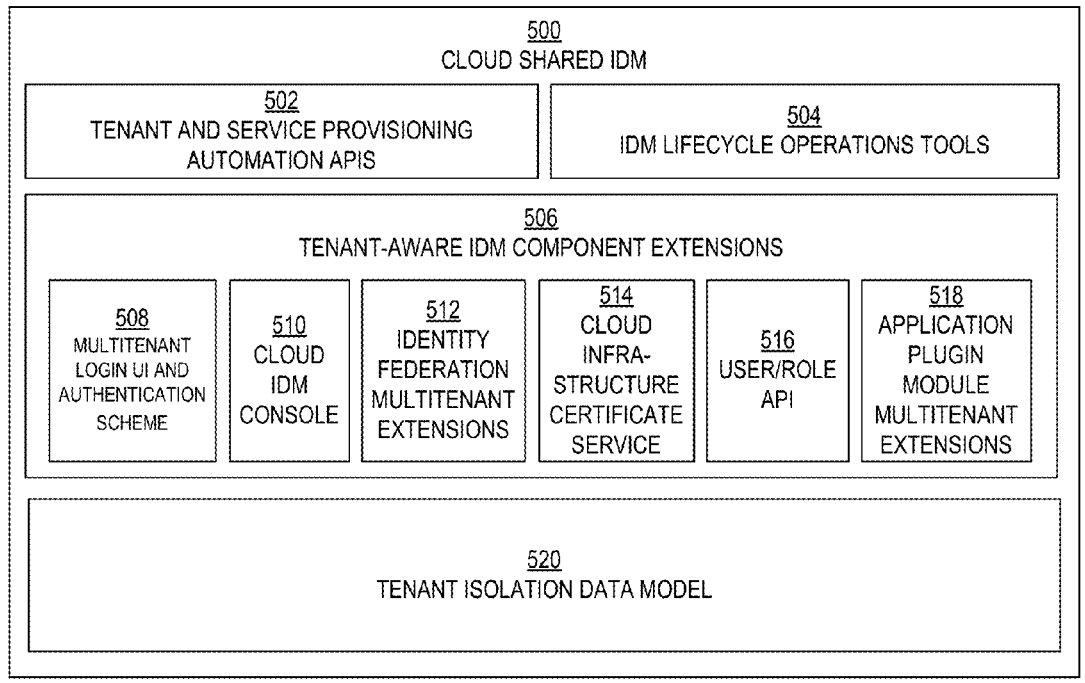
FIG. 5 is a block diagram that illustrates an example of the sub-systems of the cloud shared IDM layer, according to an embodiment of the invention.

FIG. 5 is a block diagram that illustrates an example of the sub-systems of the cloud shared IDM layer 500, according to an embodiment of the invention. Cloud shared IDM layer 500 of FIG. 5 can correspond to cloud shared IDM layer 304 of FIG. 3. Cloud shared IDM layer 500 can include tenant and service provisioning automation APIs 502, IDM lifecycle operations tools 504, tenant-aware IDM component extensions 506, and a tenant isolation data model 520. Tenant-aware IDM component extensions 506 can include a multi-tenant login user interface (UI) and authentication scheme 508, cloud IDM console 510, identity federation multitenant extensions 512, cloud infrastructure certificate service 514, user/role API 516, and application plugin module multi-tenant extensions 518.

In an embodiment, each component of the shared IDM system can include a tenant isolation construct for its artifacts, to enforce isolation in between identity domains. Each such tenant isolation construct can follow tenant isolation data model 520. An access management product, for example, might need identity management services and corresponding policies. In order to allow these policies to be different, customizable, and distinct for each customer, each customer can have its own "slice" of the shared IDM system's policy store. Thus, in one embodiment of the invention, policies within the shared IDM system's policy store can be partitioned by identity domain. Mechanisms for storing and managing policies can be tenant-specific. Tenant isolation data model 520 can be followed by each of the sub-systems within tenant-aware component extensions 506 in order to enforce isolation in between identity domains. By following tenant isolation data model 520, each shared IDM product can possess identity domain-aware features.

For example, multi-tenant login UI and authentication scheme 508 can follow tenant isolation data model 520 by providing a UI field through which a user can identify the particular identity domain to which he is attempting to gain access. This feature allows users to login to specific identity domains within the cloud computing environment. Multi-tenant login UI and authentication scheme 508 can then choose the particular identity domain as that against which the user will be authenticated. The authentication scheme, in particular, can use the particular identity domain in order to query the correct partition when looking up the actual password associated with the user identity supplied during the login process. Although unqualified user identities can be required to be unique within an identity domain, such user identities potentially can be duplicated across separate identity domains. In one embodiment of the invention, fully qualified user identities can specify the identity domains to which those user identities belong, and such fully qualified user identities are not duplicated across separate identity domains. Embodiments of the invention therefore provide mechanisms whereby authentication processes are multi-tenant aware. Such mechanisms can determine a user's identity domain and can authenticate the user based on data that is specific to that identity domain.

In an embodiment, cloud IDM console 510 can be among the tenant-aware component extensions 506 that follow tenant isolation data model 520. Cloud IDM console 510 can be used to change user passwords and to perform other user identity management functions, for example. Cloud IDM console 510 can include controls through which the identity domain in which console operations are to be performed can be determined. Thus, when an identity domain administrator adds or removes user identities using cloud IDM console 510, cloud IDM console 510 can determine the identity domain to which the identity domain administrator belongs, and can restrict the addition or removal of user identities to that identity domain alone.

Tenant and service provisioning automation APIs 502 can be used to provision purchased service instances to the identity domain for which those service instances were purchased. IDM lifecycle operations tools 504 can be used to upload to, download from, and synchronize data (e.g., patch applications) within an identity domain.

Figure 6:
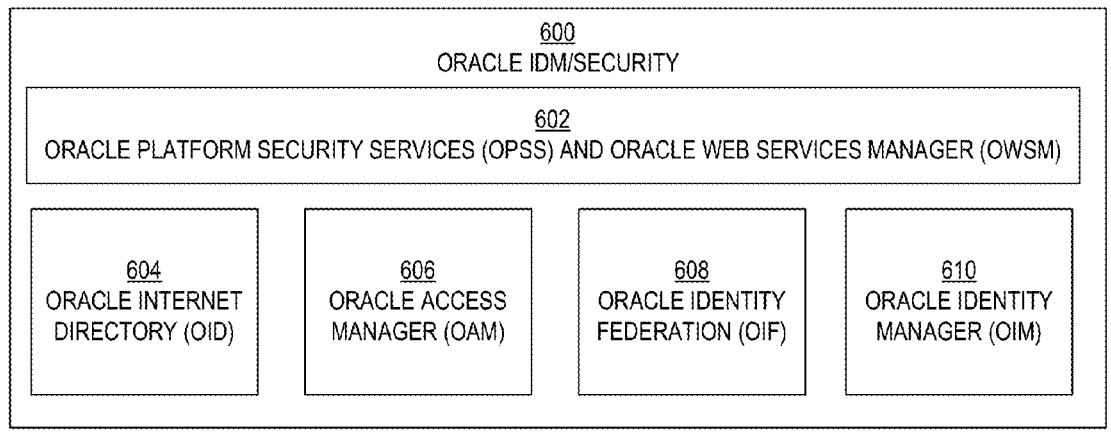
FIG. 6 is a block diagram that illustrates an example of the sub-systems of the Oracle IDM/security layer, according to an embodiment of the invention.

FIG. 6 is a block diagram that illustrates an example of the sub-systems of the Oracle IDM/security layer 600, according to an embodiment of the invention. Oracle IDM/security layer 600 of FIG. 6 can correspond to Oracle IDM/security layer 306 of FIG. 3. Oracle IDM/security layer 600 can include Oracle platform security services (OPSS) and Oracle web services manager (OWSM) 602, Oracle Internet directory (OID) 604, Oracle identity federation (OID) module 606, and Oracle identity manager (OIM) 608. In an embodiment of the invention, identities associated with each identity domain in the shared IDM system can be stored within OID 604. OID 604 can implement a lightweight directory access protocol (LDAP) directory. Thus, in an embodiment, all of the identities of all users in the shared IDM system can be stored in an LDAP directory that is partitioned by identity domain.

The access control sub-system for each identity domain can be policy-driven, in that access to a protected service or resource is granted only if a policy defined within that identity domain and associated with that protected service or resource is satisfied. Each identity domain can have a run-time instance that enforces the policies defined within that identity domain. In an embodiment, all policies for all identity domains can be stored in a common cloud-wide policy store, but this policy store can be partitioned by identity domain.

As is discussed above, in an embodiment of the invention, a customer can cause an identity domain to be created in the cloud-based environment, and can purchase, from an on-line store, one or more service instances to be made available within that identity domain. In an embodiment of the invention, APIs for the multi-tenant cloud-based IDM system are defined in such a manner to ensure that service instance provisioning operations will be performed in a correct order. Typically, the first operation that is to be performed relative to an identity domain is the creation of that identity domain in the cloud-based IDM system. One API method can receive a name for an identity domain and determine whether any identity domain within the cloud-based IDM system already has that name. If no identity domain having that name currently exists, then the API method can create the identity domain (in part by storing metadata defining that identity domain). Regardless of whether the identity domain existed prior to the invocation of the API method, the API method can return, to the entity that invoked the API method, information pertaining to the named identity domain. The entity can use this information to invoke further methods of the API to perform operations relative to the named identity domain, such as service instance addition.

Figure 13:
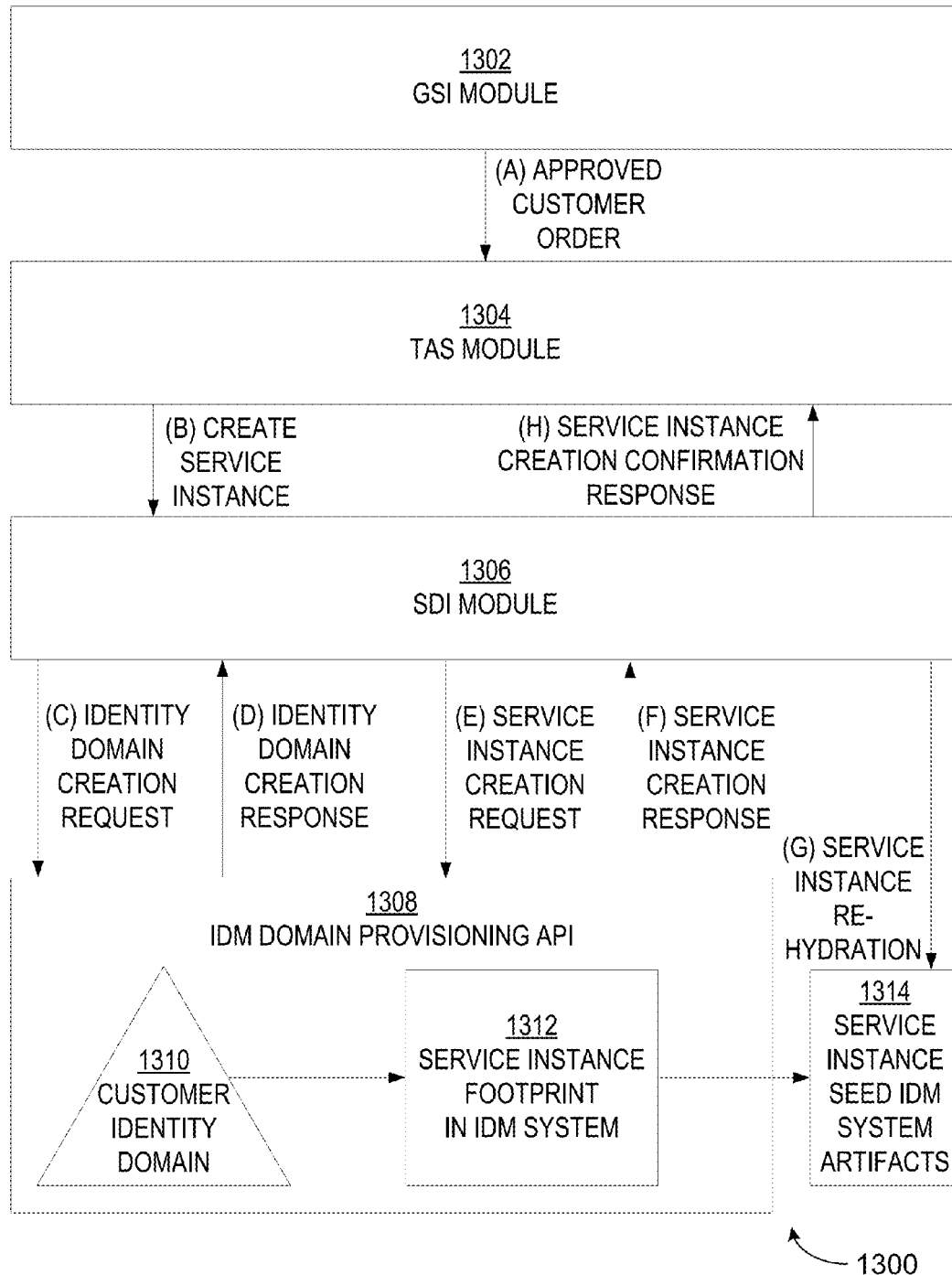
FIG. 13 is a block diagram that illustrates an example of a system for provisioning a service instance within an identity domain, according to an embodiment of the invention.

FIG. 13 is a block diagram that illustrates an example of a system 1300 for provisioning a service instance within an identity domain, according to an embodiment of the invention. The example operations assume a situation in which a customer is concurrently purchasing an identity domain and a service instance for that identity domain. For example, the service instance might be an instance of a fusion CRM application. At (A), a global single instance (GSI) module 1302 can send an approved customer order to a TAS module 1304. At (B), TAS module 1304 can instruct an SDI module 1306 to create the service instance. At (C), SDI module 1306 can determine that the identity domain in which the service instance is to be created has itself not been created yet, and so SDI module 1306 can send, to an IDM provisioning API 1308, an identity domain creation request. In response to this request, IDM domain provisioning API 1308 can cause a customer identity domain 1310 to be created. At (D), IDM domain provisioning API 1308 can send, to SDI module 1306, an identity domain creation response indicating that the identity domain was successfully created, and including linkage information that SDI module 1306 can use to refer to the newly created identity domain (customer identity domain 1310) in later transactions with IDM domain provisioning API 1308. At (E), SDI module 1306 can send a service instance creation request to IDM domain provisioning API 1308. In this request, SDI module 1306 can refer to the newly created identity domain (customer identity domain 1310) as being the identity domain in which the service instance is to be created. In response to this request, IDM domain provisioning API 1308 can create service instance footprint in IDM system 1312 specific to the type of service instance created (e.g., fusion CRM application). At (F), IDM domain provisioning API 1308 can send, to SDI module 1306, a service instance creation response. At (G), SDI module 1306 can "re-hydrate," within customer identity domain 1310, service instance seed IDM system artifacts 1314 for the type of service instance created (e.g., fusion CRM application). Such re-hydration can involve creating a copy of a stored generic "image" of the type of service instance and generating and storing linkage information that connects the service instance to the identity domain and customizes that service instance for that identity domain. At (H), SDI module 1306 can send, to TAS module 1304, a service instance creation confirmation response indicating that the service instance was successfully instantiated within customer identity domain 1310.

TABLE 1 below indicates, for various cloud-based events discussed above with reference to FIG. 13, the kinds of information that different components of and entities within the cloud-based multi-tenant IDM system can communicate to each other as part of those events, according to an embodiment of the invention.

TABLE 1

| SERVICE INSTANCE-TO-IDENTITY DOMAIN ASSIGNMENT | | | | |
|---|---|---|---|---|
| Oracle Cloud event | TAS => SDI | SDI => IDM domain provisioning API | IBM | User |
| Customer procures its first service instance in the cloud | Create service: identity domain name, identity domain administrator name and e-mail, service administrator domain name and e-mail | Create identity domain: identity domain name, identity domain administrator name, identity domain administrator e-mail | 1) Create identity domain 2) Create identity domain administrator user & identity domain administrator role | |
| | | Create service: identity domain name, service administrator name, service administrator e-mail, service name | 1) Create service administrator user 2) Create service roles from service instance type template | |

TABLE 1-continued

SERVICE INSTANCE-TO-IDENTITY DOMAIN ASSIGNMENT

| Oracle Cloud event | TAS => SDI | SDI => IDM domain provisioning API | IBM | User |
|---|---|---|---|---|
| Notification to administrators of successful provisioning of identity domain and first service instance | Notify identity domain administrator<br><br>Notify service administrator | | | Identity domain administrator receives notification, logs into cloud, resets initial password, and can manage users & roles in the identity domain<br>Service administrator can assign users to first service-specific roles and can manage first service instance |
| Customer procures its second service instance | Create service: identity domain name, identity domain name administrator name and e-mail, service administrator domain name and e-mail | Create service: identity domain name, service administrator name, service administrator e-mail, service name | 1) Create service administrator user<br>2) Create service roles from service instance type template | |
| Notification to administrators of successful provisioning of second service instance | Notify identity domain administrator<br><br>Notify service administrator | | | Identity domain administrator is apprised of new second service instance<br>Service administrator can assign users to second service-specific roles and can manage second service |

Addition of a service instance to an identity domain can involve the instantiation of one or more virtual machines in the cloud-based environment. Virtual machines for the type of service can be instantiated as a part of adding a service instance to an identity domain. In one embodiment, the instantiation of such virtual machines, or "service instance run-time components," can be accompanied by configuration operations that ensure that such virtual machines will be associated with, or "wired to" the appropriate identity domain. Additionally, the instantiation of such virtual machines can be accompanied by configuration operations that ensure that such virtual machines will be associated with, or "wired to," appropriate policy-based boundaries. In one embodiment of the invention, an API method for creating service instances of specified types is implemented within the cloud-based IDM system. Invocation of this service instance creation API method can cause the cloud-based IDM system to create handles that can be used to establish associations between the service instance virtual machines and the appropriate identity domain. Such handles can include coordinating information such as a name of the appropriate identity domain, a user name, a password, etc. A service instance virtual machine can use such a user name and password in order to connect to the cloud-based IDM system, and can specify during the connection process the name of the identity domain in whose context the service instance virtual machine will be executing. The service instance creation API method can ensure that that user name and password specified by the handle are not duplicated in handles created for any other service instance virtual machines, so that the virtual machines for other identity domains' service instances are not improperly enabled to connect relative to identity domains other than their own identity domains. The service instance creation API method therefore can return, to the entity that invoked that method, an informational vector that contains all of the data needed to instantiate a service instance.

Figure 8:
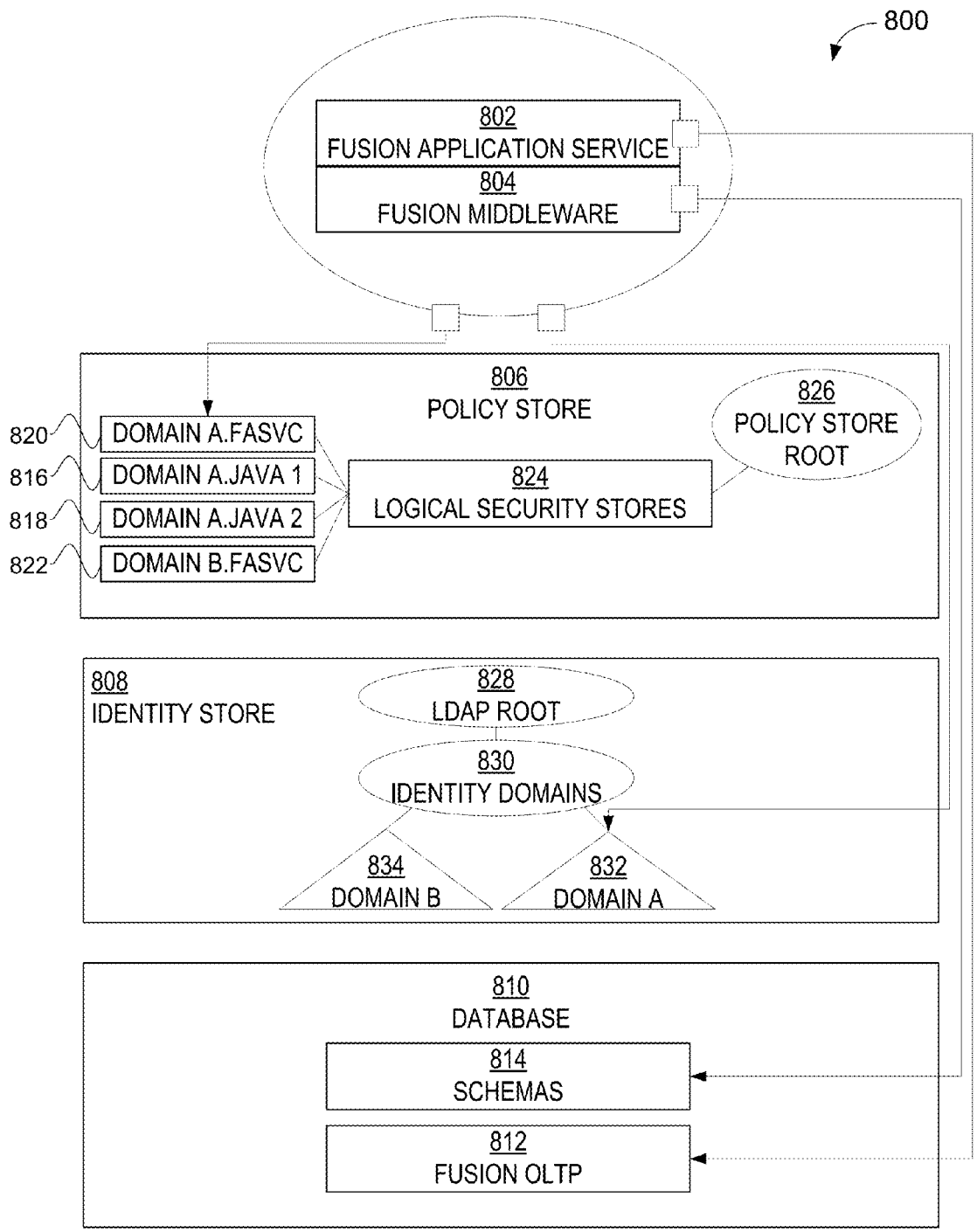
FIG. 8 is a block diagram that illustrates a multi-tenant IDM system in which an application instance run-time component can be provided access to identities that are defined within an identity domain, according to an embodiment of the invention.

Each service instance virtual machine can be provided access to the identities that are defined within the identity domain in whose context the service instance virtual machine executes. This access can be provided, for example, so that the service instance virtual machine can authenticate users and look up roles pertaining to the identity domain. FIG. 8 is a block diagram that illustrates a multi-tenant IDM system 800 in which an application instance run-time component can be provided access to identities that are defined within an identity domain, according to an embodiment of the invention. In the illustrated example, the application instance run-time component is for an instance of a fusion (CRM) application. System 800 can include fusion application service 802, fusion middleware 804, policy store 806, identity store 808, and database 810. Together, fusion application service 802 and fusion middleware 804 make up a fusion application runtime component. Policy store 806 and identity store 808 can be implemented as Oracle Internet directories (OIDs) or other LDAP directories, for example. Policy store 806, which can store policies from various separate identity domains, can include a policy store root node 826, from which can hierarchically descend logical security store nodes 824, from which can hierarchically descend policies 816, 818, 820, and 822. Policies 816, 818, and 820 can pertain to one identity domain, domain A, while policy 822 can pertain to another identity domain, domain B. Policies 816 and 818 can pertain to separate instances of JAVA services, while policies 820 and 822 can pertain to separate instances of fusion application services. Identity store 808, which can store identities from various separate identity domains, can include an LDAP root node 828, from which can hierarchically descend nodes for various identity domains 830, from which can hierarchically descend identities pertaining to identity domain A 832 and identities pertaining to identity domain B 834. Database 810 can store data that is used by fusion application service 802 and fusion middleware 804, such as fusion on-line transaction processing (OLTP) data 812 and schemas 814 (potentially including fusion middleware schemas and other database schemas).

A fusion application can be an example of a single-tenant application that exists within multi-tenant IDM system 800. Thus, a particular instance of fusion application service 802 and fusion middleware 804 can be specific to a particular identity domain. In this example, they are specific to identity domain A. Identity store 808 can be structured as an LDAP directory tree containing, toward its leaf nodes, various separate sub-trees that pertain to separate identity domains in multi-tenant IDM system 800. An identity store handle for the fusion application runtime component points only to a node of the LDAP identity hierarchy that is the root node of an LDAP sub-tree containing identities pertaining to identity domain A 832. Thus, the identity store handle for the fusion application runtime component points only to a "slice" of identity store 808 that is dedicated to identity domain A. This pointer is shown as an arrow line in FIG. 8 originating at the fusion application runtime component and terminating at LDAP sub-tree 832. Such a pointer can be established as a result of invoking an API method when the fusion application service is added to identity domain A. A handle returned by the API method can contain a credential that specifies a particular user name and password that is recognized within multi-tenant IDM system 800 and which is associated specifically with identity domain A. This credential therefore can be bound to the appropriate "slice," or partition, of identity store 808 pertaining to identity domain A. The fusion application runtime component can use this particular user name and password to access the appropriate partition of identity store 808. An access control inside of OID (which can be used to implement identity store 808) can confine the visibility of the fusion application runtime component solely to the appropriate partition of identity store 808, so that the fusion application runtime component cannot access identities that belong to identity domains other than identity domain A.

Each separate service instance in multi-tenant IDM system 800 can store its own separate set of policies, pertaining to that service instance, within the cloud-wide policy store 808. Policy store 808 can be structured as an LDAP tree containing sub-trees for each identity domain, and policy nodes for service instances within each identity domain's sub-tree. A policy store handle for the fusion application runtime component points only to a node of the LDAP policy hierarchy that is the root node of an LDAP sub-tree containing policies pertaining to the fusion application runtime instance that belongs to identity domain A. This pointer is shown in FIG. 8 as an arrow line originating at the fusion application runtime component and terminating at LDAP policy entry 820. Such a pointer can be established as a result of invoking an API method when the fusion application service is added to identity domain A. The fusion application runtime component therefore becomes bound or "wired to" to the specific partition of policy store 808 that pertains specifically to the policies that pertain to the fusion application service that belongs to identity domain A. Consequently, when the fusion application runtime component queries policy store 808, the query can be executed relative just to the specific partition of policy store 808 to which the fusion application runtime component is bound.

More generally, in an embodiment of the invention, boundaries exist for each service instance runtime component. Credentials can be created that point only to partitions of identity store 806 and policy store 808, respectively, that pertain to the appropriate identity domain and appropriate service instance, respectively, for a particular service instance runtime component. These credentials, once created, can be passed to a provisioning system so that the provisioning system can bind the service instance runtime component to the appropriate partitions of identity store 806 and policy store 808, which each can store data for various service instances in various identity domains in the cloud computing environment. Identity store 806 can be implemented separately from policy store 808 because identities are not service-specific while policies can be service-specific; thus, the security boundaries relevant to each type of data can differ in scope. Multiple service instances within a same identity domain can all be bound to the same LDAP sub-tree of identity store 806, but can each be bound to different LDAP policy entries of policy store 808.

Figure 16:
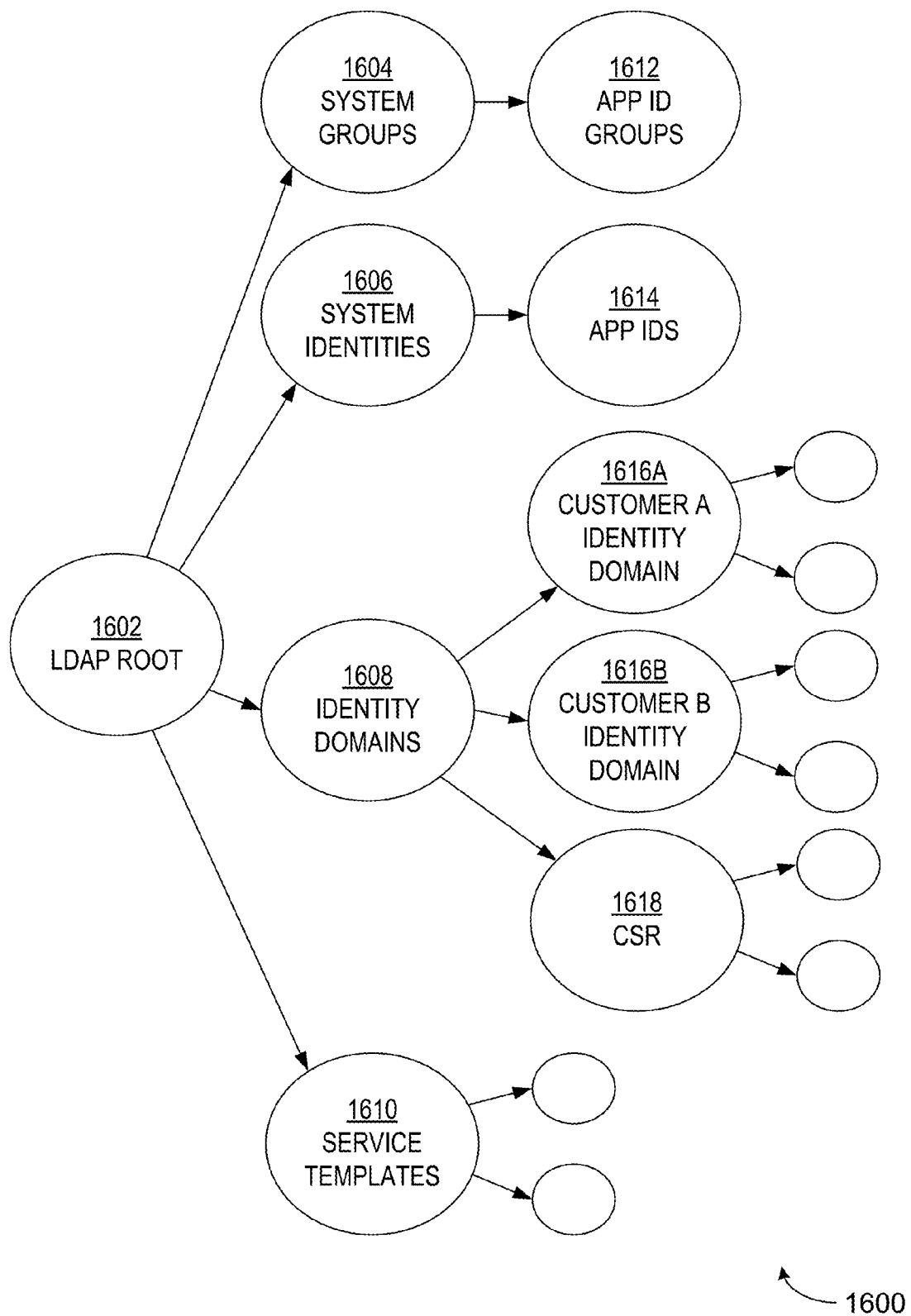
FIG. 16 is a hierarchical diagram that illustrates an example of a structure of multi-tenant LDAP directory for a cloud-based IDM system, according to an embodiment of the invention.

In an embodiment, one or more informational stores, such as identity store 806, can be stored in an LDAP directory such as an OID. Such an LDAP directory typically is hierarchically organized. In an embodiment, a single LDAP directory can store information pertaining to multiple separate identity domains within a cloud-based multi-tenant IDM system. FIG. 16 is a hierarchical diagram that illustrates an example of a structure of multi-tenant LDAP directory 1600 for a cloud-based IDM system, according to an embodiment of the invention. LDAP root 1602 can be a parent to multiple nodes such as system groups node 1604, system identities node 1606, identity domains node 1608, and service templates node 1610. System groups 1604 can be a parent to nodes that represent groups of identities that are cloud system-wide rather than identity domain-specific. System groups 1604 can be parent to app ID groups, which can group together various application identities into identified groups. System identities 1606 can be a parent to nodes that represent individual identities that are cloud system-wide rather than identity domain-specific. System identities can be parent to app IDs, which can identify individual applications whose identities are cloud system-wide rather than identity domain-specific. Identity domains 1608 can be parent to nodes for various separate identity domains, such as customer A identity domain 1616A, customer B identity domain 1616B, and CSR (or operations) identity domain 1618. As is discussed above, each of these identity domain nodes can be parent to numerous other nodes pertaining to roles and identities within their respective identity domains. Furthermore, although FIG. 16 shows a single identity domain per customer (e.g., A and B), in alternative embodiments, each customer can have multiple separate identity domains. Service templates 1610 can be parent to numerous nodes that are roots of role hierarchies for different service types. As is discussed above, different service types can be mapped to pre-defined role hierarchies that can be automatically added to an identity domain when a service of that type is added to that identity domain, sparing a user from manually creating such roles for that service.

Figure 17:
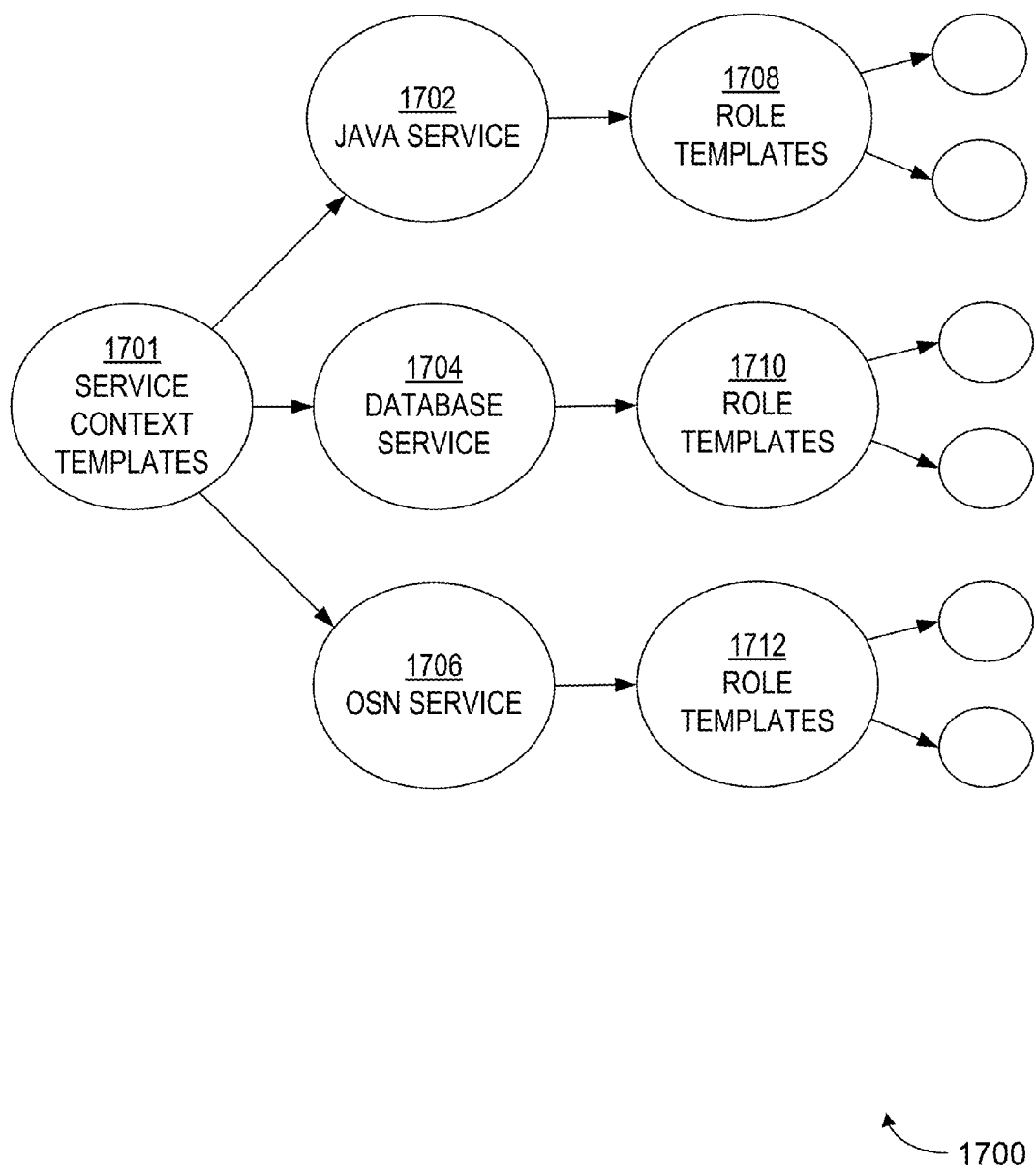
FIG. 17 is a hierarchical diagram that illustrates an example of a structure of an LDAP directory sub-tree that pertains to role templates for different service types, according to an embodiment of the invention.

FIG. 17 is a hierarchical diagram that illustrates an example of a structure of an LDAP directory sub-tree that pertains to role templates for different service types, according to an embodiment of the invention. Service context templates node 1701 can correspond to service templates node 1610 of FIG. 16. Service context templates node 1701 can be parent to numerous nodes for different service types. Such nodes can include a JAVA service node 1702, a database service node 1704, and an Oracle social network (OSN) service node 1706, for example. Each of nodes 1702-1706 can be parent to a node that is the root of a sub-tree that contains role nodes for that service type. For example, role templates node 1708 can be the root of a sub-tree of nodes that describe pre-defined roles for services having a JAVA service type. For another example, role templates node 1710 can be the root of a sub-tree of nodes that describe pre-defined roles for services having a database service type. For yet another example, role templates node 1712 can be the root of a sub-tree of nodes that describe pre-defined roles for services having an OSN service type. These sub-trees can be defined by the designers and creators of the services so that users and administrators of those services, such as identity domain administrators and service administrators, do not need to create such roles manually, although they can assign such roles to users within their identity domains.

According to an embodiment of the invention, a multi-tenancy IDM system beneficially enables multiple separate customers, each having their own separate identity domains, to use hardware and software that is shared in the cloud. Consequently, there is no need for each customer to have its own dedicated hardware or software resources, and in some cases resources that are not being used by some customers at a particular moment can be used by other customers, thereby preventing those resources from being wasted. For example, multiple customers can have a JAVA service instance placed within their respective identity domains. Each such identity domain can have a JAVA virtual machine, which can be viewed as being a virtual "slice" of hardware. For another example, in one embodiment, multiple customers can have a database service instance placed within their respective identity domains. Although each such database service instance can be a separate abstraction or view of a single physical multi-tenant database system that is shared among the many separate identity domains, each such database service instance can have a separate and potentially different schema than each other database service instance has. Thus, the multi-tenant database system can store mappings between customer-specified database schemas and the identity domains to which those database schemas pertain. The multi-tenant database system can cause the database service instance for a particular identity domain to use the schema that is mapped to that particular identity domain. In one embodiment, a job-monitoring service (e.g., Hudson) can be combined with a JAVA enterprise edition platform (e.g., Oracle WebLogic) in the cloud to enable each separate identity domain to have its own separate virtual "slice" of the JAVA enterprise edition platform. Such a job-monitoring service can, for example, monitor the execution of repeated jobs, such as building a software project or jobs run by an operating system's time-based job scheduler. Such repeated jobs can include the continuous building and/or testing of software projects. Additionally or alternatively, such repeated jobs can include the monitoring of executions of operating system-run jobs that are executed on machines that are remote from the machine on which the job-monitoring service executes.

Figure 14:
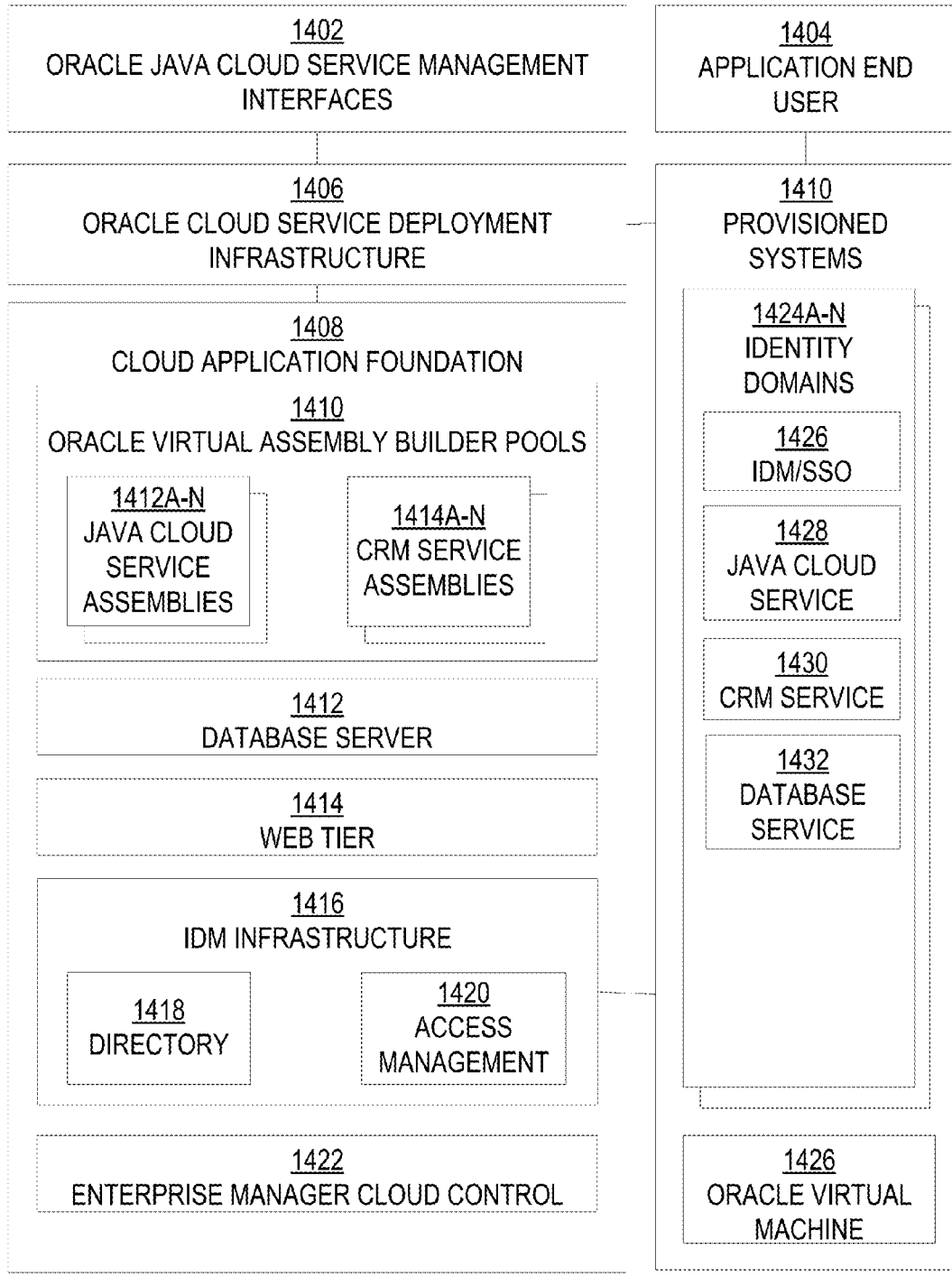
FIG. 14 is a block diagram that illustrates an example of a multi-tenant cloud-based system in which hardware and software resources of the cloud can be shared among identity domains, according to an embodiment of the invention

FIG. 14 is a block diagram that illustrates an example of a multi-tenant cloud-based system 1400 in which hardware and software resources of the cloud can be shared among identity domains, according to an embodiment of the invention. System 1400 can include Oracle JAVA cloud service management interfaces 1402, an application end user 1404, Oracle cloud service deployment infrastructure 1406, cloud application foundation 1408, and provisioned systems 1410. Oracle JAVA cloud service management interfaces 1402 can include a variety of user interfaces such as web-based interfaces and/or command-line interfaces. These interfaces can be used to interact with oracle cloud service deployment infrastructure 1406. Oracle cloud service deployment infrastructure 1406 can interface with cloud application foundation 1408. In an embodiment, cloud application foundation 1408 can be built using fusion middleware components. In an embodiment, cloud application foundation 1408 can include Oracle virtual assembly builder (OVAB) pools 1410, a database server 1412, a web tier 1414, IDM infrastructure 1416, and enterprise manager cloud control 1422. OVAB pools 1410 can include JAVA cloud service assemblies 1412A-N and CRM service assemblies 1414A-N. These assemblies can be instantiated upon service provision for each JAVA cloud service instance 1428 of each of identity domains 1424A-N. Each such assembly can be personalized for its associated JAVA cloud service instance 1428 by associating that assembly with enterprise manager cloud control 1422 and web tier 1414. End-point information used to access each assembly can be sent to an application end user (e.g., application end user 1404) through e-mail. IDM infrastructure 1416 can include a directory 1418 and an access management module 1420. Provisioned systems 1410 can include identity domains 1424A-N and an Oracle virtual machine 1426. Each of identity domains 1424A-N can include its own IDM/SSO module 1426, JAVA cloud service 1428, CRM service 1430, and database server 1432. Oracle cloud service deployment infrastructure 1406 and IDM infrastructure 1416 can interface with provisioned systems 1410.

Figure 15:
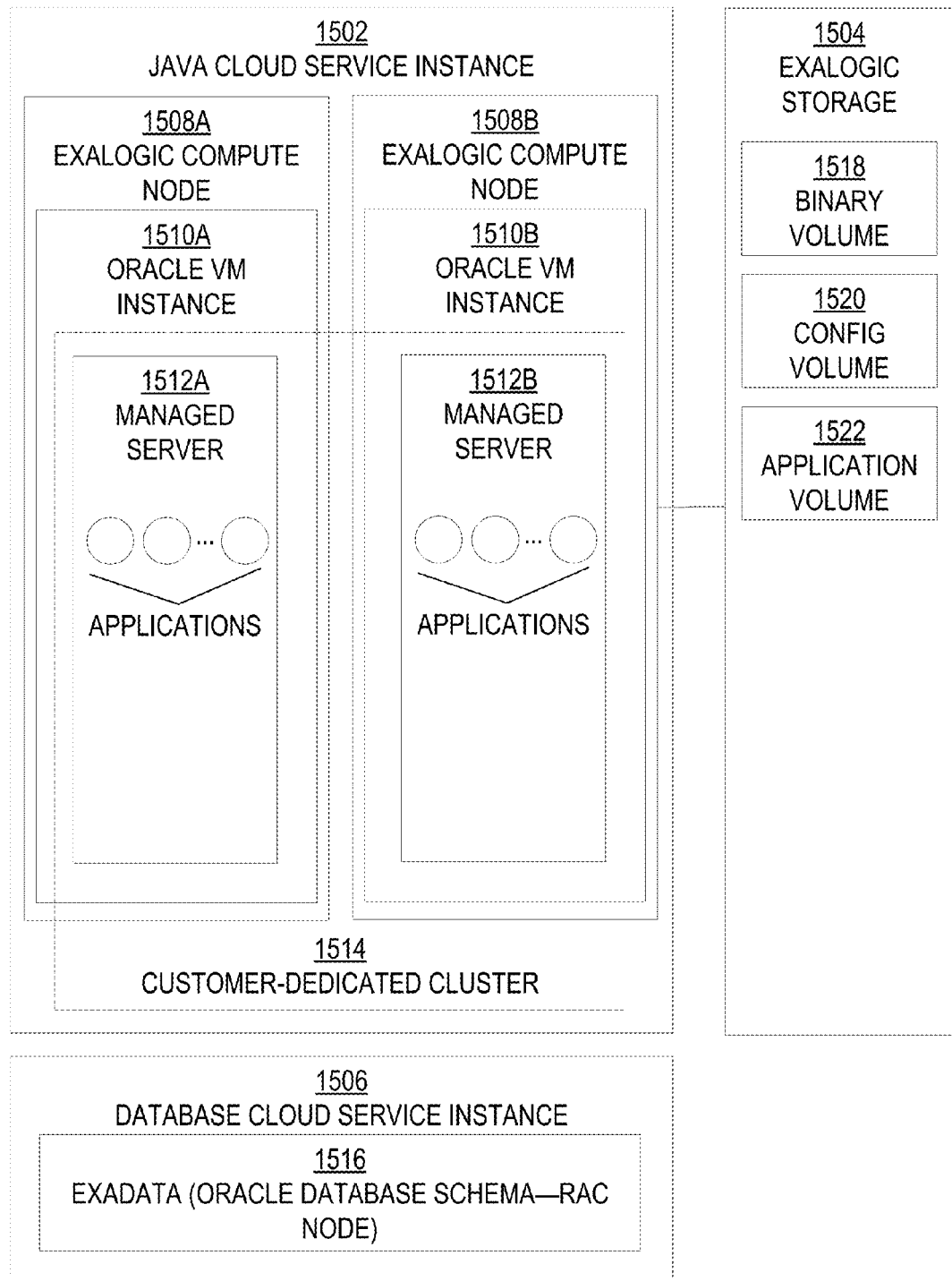
FIG. 15 is a block diagram that illustrates an example of a JAVA cloud service architecture that can be used in a cloud-based system to share virtual "slices" of cloud hardware between isolated customers, according to an embodiment of the invention.

FIG. 15 is a block diagram that illustrates an example of a JAVA cloud service architecture 1500 that can be used in a cloud-based system to share virtual "slices" of cloud hardware between isolated customers, according to an embodiment of the invention. Architecture 1500 can include a JAVA cloud service instance 1502, Exalogic storage 1504, and database cloud service instance 1506. JAVA cloud service instance 1502 can include multiple Exalogic compute nodes, such as Exalogic compute nodes 1508A and 1508B. Each Exalogic compute node can include an Oracle virtual machine (OVM) instance, such as OVM instances 1510A and 1510B. Each OVM instance can include a managed server, such as managed servers 1512A and 1512B. Each managed server can execute multiple separate applications. Together, the managed servers 1512 form a customer-dedicated cluster 1514 that provides high availability. Exalogic compute nodes 1508 can interface with Exalogic storage 1504. Exalogic storage can contain a binary volume 1518, a config volume 1520, and an application volume 1522. Database could service instance 1506 can include Exadata (Oracle database schema—real application cluster (RAC) node) 1516. In an embodiment, a WebLogic node manager can be configured for server re-starts for thread dead-locks and JAVA virtual machine (JVM) crashes. WebLogic clustering can be used for standard and enterprise offerings. Service OVM instances, such as OVM instance 1510A-B, can be started on separate exalogic compute nodes, such as Exalogic compute nodes 1508A-B. When an OVM fails on one Exalogic compute node, an OVM on another Exalogic compute node can re-start the failed OVM on the former Exalogic compute node. Database cloud service instance 1506 can be in an Oracle RAC one-node configuration.

Figure 18:
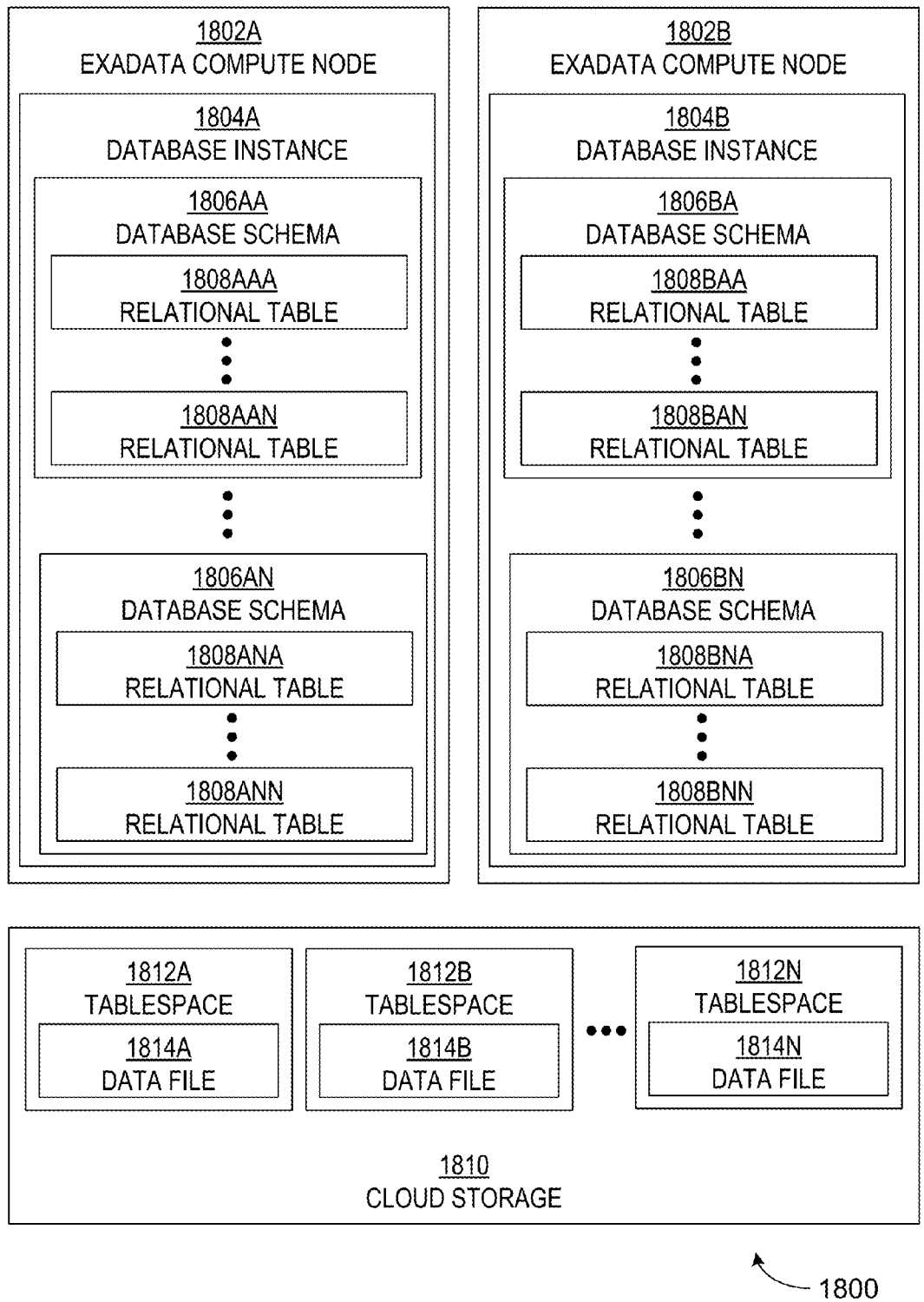
FIG. 18 is a block diagram that illustrates an example of a database cloud service multi-tenancy architecture that can be used in a cloud-based system and in which multiple schemas can be used within the same database instance, according to an embodiment of the invention.

FIG. 18 is a block diagram that illustrates an example of a database cloud service multi-tenancy architecture 1800 that can be used in a cloud-based system and in which multiple schemas can be used within the same database instance, according to an embodiment of the invention. By way of terminological explanation, a database instance is a collection of executing software processes that collectively function as a database server that can perform operations such as query execution and relational data manipulation. Traditionally, in an enterprise environment for a single organization, a database instance had a single database schema that specified the formats of the relational structures, such as relational tables, into which all of the data maintained by that database instance was organized. However, according to an embodiment of the invention, a single database instance hosted in a cloud computing environment can maintain multiple separate and potentially different schemas—one per each separate identity domain (or "tenancy"). Beneficially, this many-schemas-to-one-database-instance approach allows multiple typically unrelated customers (i.e., tenants) to make use of the same set of executing database software processes (a single database instance), so that separate instances of those database software processes do not need to be instantiated per each customer's identity domain.

Architecture 1800 can include multiple Exadata compute nodes, such as Exadata compute nodes 1802A-B. Exadata compute nodes 1802A-B can be hardware computing machines. Each such machine can include one or more hardware processing units (which perform processor-level fetch-decode-execute operations based on software-specified machine-language instructions). Each such machine can be a separate server computing device that is owned and operated by the provider of the cloud-based service; thus, in an embodiment, customers subscribing to and using the database functionalities provided by database software executing on Exadata compute nodes 1802A-B do not own Exadata compute nodes 1802A-B, but merely make use of the software processes executing thereon. Exadata compute node 1802A can be communicatively coupled by one or more packetized networks to Exadata compute node 1802B. In one embodiment, Exadata compute node 1802B operates as a replica on Exadata compute node 1802A for redundancy purposes; if Exadata compute node 1802A fails, then customers can automatically resume operations relative to Exadata compute node 1802B until Exadata compute node 1802A can be restored.

Exadata compute nodes 1802A-B each can execute a separate database instance, such as database instances 1804A-B. Each of database instances 1804A-B can be a separate collection of processes that execute from the same database software code set. Each of database instances 1804A-B can maintain multiple separate, isolated, and typically different database schemas. For example, database instance 1804A can maintain database schemas 1806AA-AN, and database instance 1804B can maintain database schemas 1806BA-BN. This maintenance of multiple database schemas per database instance, according to an embodiment of the invention, stands in contrast to the traditional one-schema-per-database-instance approach. Each of database schemas 1806AA-AN can be mapped to a separate identity domain. Each of database instances 1804A-B can maintain metadata that specifies mappings between its database schemas and the identity domains to which those database schemas belong. The isolation mechanisms provided by the shared IDM access controls discussed herein ensure that each identity domain's schema can only be accessed and used by users and services that are associated with that identity domain. Inasmuch as database instances 1804A-B can be shared among identity domains, while database schemas 1806AA-AN (and their replicas 1806BA-BN) can be dedicated to individual identity domains and isolated from all other identity domains, database schemas 1806AA-AN (and their replicas 1806BA-BN) can be referred to alternatively as "database service instances." Thus, according to an embodiment of the invention, references herein to "database service instances" are references to schema-database instance pairs rather than database instances alone.

Each database schema can specify multiple separate relational tables. For example, within database instance 1804A, database schema 1806AA can specify relational tables 1808AAA-1808AAN, while database schema 1806AN can specify relational tables 1808ANA-1808ANN. For another example, within database instance 1804B, database schema 1806BA can specify relational tables 1808BAA-1808BAN, while database schema 1806BN can specify relational tables 1808BNA-1808BNN. Inasmuch as Exadata compute node 1802B can be a replica of Exadata compute node 1802A, database schemas 1806BA-BN, with their relational tables 1808BAA-1808BNN, can be replicas of database schemas 1806AA-AN, with their relational tables 1808AAA-1808ANN. Changes made to a database schema or relational table on Exadata compute node 1802A automatically can be propagated to and duplicated upon Exadata compute node 1802B. Each database schema can also specify a separate set of stored procedures, triggers, etc.

Architecture 1800 also can include cloud storage 1810. Cloud storage 1810 can be formed of multiple potentially separate but interconnected hardware storage devices such as hard disk drives. These storage devices potentially can be, but are not necessarily, separate and distinct from Exadata compute nodes 1802A-B. Data accessed and managed by Exadata compute nodes 1802A-B can be distributed among various storage devices, such that portions of the data accessed and managed by an individual compute node can be dispersed among multiple separate storage devices, and/or such that at least some of the data accessed and managed by one compute node can be stored on at least some of the same storage devices as the data accessed and managed by the other compute node. Indeed, in one embodiment, because Exadata compute node 1802B is a replica of Exadata compute node 1802A, each of these compute nodes can share the same copy of database data; in such a scenario, although computational resources such as executing database software processes can be replicated, the data records accessed and maintained by those processes can be shared among the replicas. The hardware storage devices making up cloud storage 1810 can be owned and operated by the cloud service provider, who, as discussed above, typically is separate and distinct from customers whose data records are stored upon those hardware storage devices.

Cloud storage 1810 can store tablespaces 1812A-N. In an embodiment, each database schema has a separate dedicated tablespace in which the data conforming to that database schema is stored. For example, tablespace 1812A can be dedicated to the storage of data conforming to database schema 1806AA (and database schema 1806BA as its replica), tablespace 1812B can be dedicated to the storage of data conforming to database schema 1806AN (and database schema 1806BN as its replica). Because in one embodiment these tablespaces are only accessible through database instances 1804A-B, the isolation mechanisms imposed on database instances 1804A-B by the shared IDM access controls discussed herein are sufficient to ensure that each of tablespaces 1812A-N will be isolated from each other of tablespaces 1812A-N. Consequently, in an embodiment, only the users and service instances belonging to the same identity domain as a particular database schema are permitted (if also authorized by policies) to access any of the data conforming to that particular database schema, even though various tablespaces 1812A-N may be physically distributed and stored among separate hardware storage devices that are themselves not necessarily dedicated strictly to individual identity domains. In other words, dedication of individual physical storage devices to separate identity domains is not necessary to ensure that tablespaces 1812A-N are respectively dedicated to the database schemas belonging to those identity domains.

Each of tablespaces 1812A-N can store a separate data file. For example, tablespaces 1812A-N, respectively, can store data files 1814A-N, respectively. Each particular data file of data files 1814A-N can physically contain the data records (e.g., relational table rows) that are logically contained within the relational tables defined by the database schema to which the tablespace storing that particular data file is dedicated. For example, assuming that tablespace 1812A is dedicated to database schema 1806AA, data file 1814A can physically contain the data records that are logically contained in relational tables 1808AAA-AAN (and that are logically contained in their replicas, relational tables 1808BAA-BAN). For another example, assuming that tablespace 1812B is dedicated to database schema 1806AN, data file 1814B can physically contain the data records that are logically contained in relational tables 1808ANA-ANN (and that are logically contained in their replicas, relational tables 1808BNA-BNN).

Figure 19:
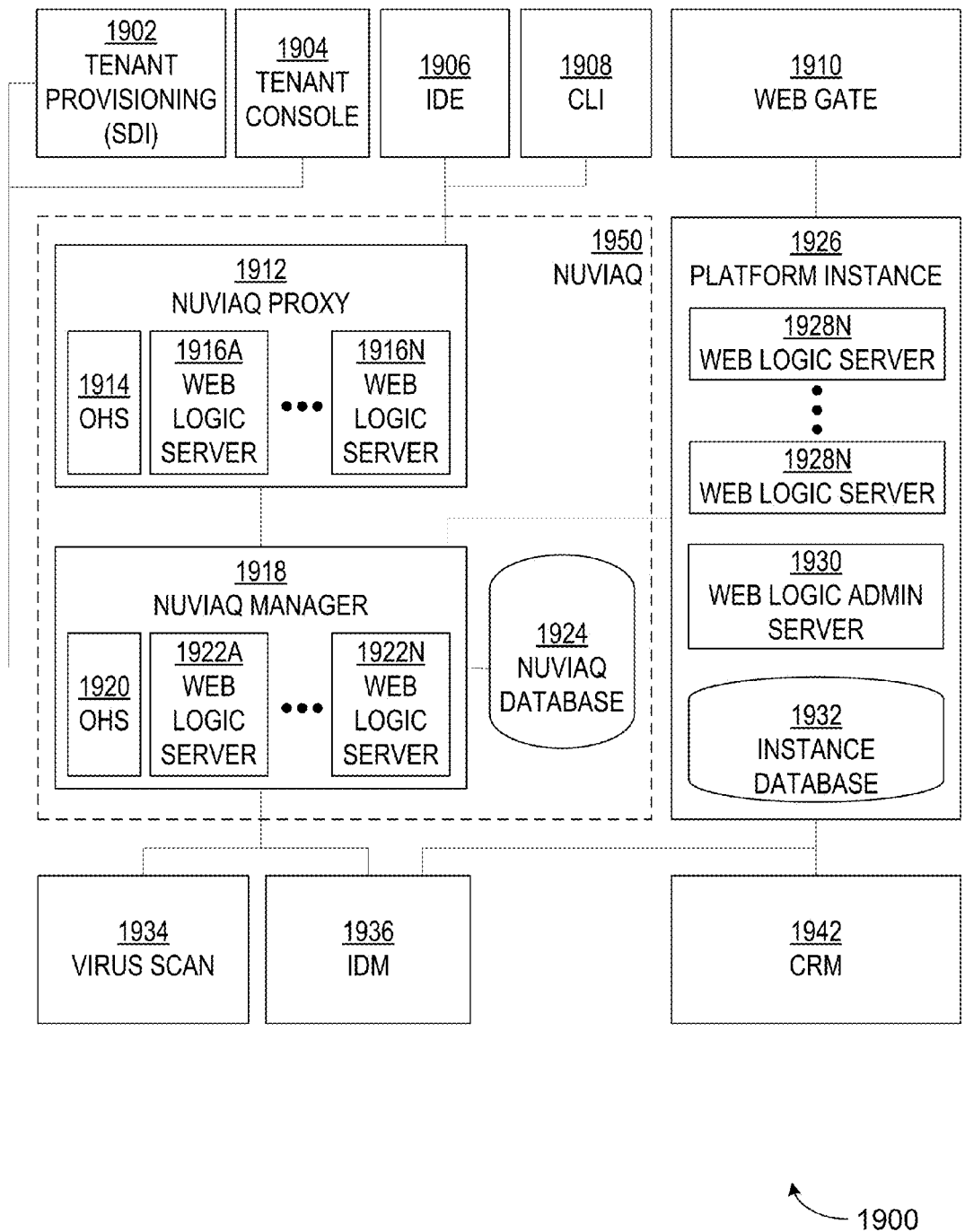
FIG. 19 is a block diagram that illustrates an example of a Nuviaq cloud system, according to an embodiment of the invention.

FIG. 19 is a block diagram that illustrates an example of a Nuviaq cloud system 1900, according to an embodiment of the invention. System 1900 can include a tenant provisioning system (SDI) 1902, a tenant console 1904, an Integrated Development Environment (IDE) 1906, a command-line interface (CLI) 1908, a web gate 1910, a Nuviaq proxy 1912, a Nuviaq manager 1918, a Nuviaq database 1924, a platform instance 1926, a virus scan module 1934, an IDM system 1936, a CRM module 1942, and identity management 1940. Together, Nuviaq proxy 1912, Nuviaq manager 1918, and Nuviaq database 1924 conceptually form Nuviaq 1950. Tenant provisioning API 1902 and tenant console 1904 can interface with Nuviaq proxy 1912. IDE 1906 and CLI 1908 can interface with Nuviaq manager 1918. Web gate 1910 can interface with platform instance 1926. Nuviaq manager 1918 can interface with Nuviaq database 1924, virus scan module 1934, IDM system 1936, and platform instance 1926. Platform instance 1926 can interface with CRM module 1942 and identity management 1940. Nuviaq proxy 1912 can include an Oracle Hypertext Transfer Protocol server (OHS) 1914 and Web Logic servers 1916A-N. Nuviaq manager 1918 can include OHS 1920 and Web Logic servers 1922A-N. Platform instance 1926 can include Web Logic servers 1928A-N, Web Logic admin server 1930, and instance database 1932.

In an embodiment, Nuviaq manager 1918 can serve as an entry point into system 1900. As such an entry point, Nuviaq manager 1918 can provide secure access to PaaS operations via a secure web service API. Nuviaq manager 1918 can track the state of system 1900 in Nuviaq database 1924. Nuviaq manager 1918 can control job execution. Tenant provisioning system (SDI) 1902 can access Nuviaq manager 1918 to instruct Nuviaq manager 1918 to perform provisioning operations (e.g., service instance provisioning operations) in the cloud-based computing environment. Tenant console 1914 can access Nuviaq manager 1918 to instruct Nuviaq manager 1918 to perform deployment operations (e.g., service instance deployment operations) in the cloud-based computing environment. Nuviaq manager 1918 can execute jobs involving such operations asynchronously. Such jobs can involve a sequence of actions that are specific to a PaaS workflow. Nuviaq manager 1918 can perform the job's actions in order. Such actions can involve the delegation of tasks to other components, such as a command-line interface of an enterprise manager (EM) module. Nuviaq manager 1918 can be executed upon a cluster of Web Logic servers 1920A-N in conjunction with OHS 1920.

In an embodiment, Nuviaq proxy 1912 can be an access point to which other systems can interface via an API. Nuviaq proxy 1912 can receive requests from other systems through this API and forward those requests to Nuviaq manager 1918. In one embodiment, Nuviaq proxy 1912 can be situated outside of a firewall inside of which Nuviaq manager 1918 is situated. Nuviaq proxy 1912 can be executed upon a cluster of Web Logic servers 1916A-N in conjunction with OHS 1914.

In an embodiment, Nuviaq database 1924 can track data pertaining to platform instance 1926 as well as deployment plans, applications, Web Logic domains, jobs, and alerts. Primary keys stored within Nuviaq database 1924 can be aligned with keys stored within a cloud-wide service database (not shown) that contains mappings between customers (or "tenants") and their identity domains (or "tenancies") and the service instances to which those customers have subscribed.

In an embodiment, platform instance 1926 provides Web Logic service resources for a specific identity domain. Thus, a separate platform instance 1926 can be instantiated for and dedicated to each separate identity domain in the cloud-based environment. However, each such platform instance 1926 can be centrally managed by Nuviaq manager 1918, such that no more than one instance of Nuviaq manager 1918 needs to be instantiated. In an embodiment, Nuviaq manager 1918 is the component that creates each separate platform instance 1926 for each identity domain. Platform instance 1926 can be imagined as being an identity-domain dedicated "slice" of a Web Logic server. Some workflows processed by Nuviaq 1950 can involve access to the service database discussed above in order to configure the Web Logic "slice" to act as a client to various other service instances to which customers have subscribed, as indicated by mapping stored within the service database. Tenant console 1904 can provide, to administrators appointed within an identity domain, a user interface that enables those administrators to manage applications that are executing on platform instance 1926 that is contained within that identity domain. CLI 1908 also can be used to manage such applications. Each platform instance 1926 can be assigned an identifier that is unique within the cloud computing environment, and this unique identifier can be used to reference that platform instance 1926 in operations that make use of that platform instance 1926.

In an embodiment, Nuviaq 1950 can operate in conjunction with components external to Nuviaq 1950 in order to perform Web Logic workflows. Among these external components, tenant provisioning module (SDI) 1902 can include an assembly deployer subsystem. The assembly deployer subsystem can manage interactions between Nuviaq 1950, an Oracle Virtual Assembly Builder (OVAB), and an Oracle Virtual Machine (OVM). Nuviaq 1950 can use the assembly deployer subsystem to deploy assemblies, undeploy assemblies, describe assembly deployments, and to scale appliances. Nuviaq 1950 can access the assembly deployer subsystem via a web service API.

Also among the external components, virus scan module 1934 can scan various artifacts for viruses and other harmful executable instructions before permitting those artifacts to be deployed to any applications in the cloud computing environment. Virus scan module 1934 can provide "scanning as a service" for multiple separate components in the cloud computing environment. In one embodiment, virus scan module 1934 can provide its services to components within multiple separate identity domains, so that no separate virus scan module needs to be instantiated per identity domain. IDM system 1936, details of which are discussed above, can provide security to jobs performs by Nuviaq 1950. CRM module 1942 can be associated with JAVA service instances that have been placed within various identity domains. Such an association between these JAVA service instances and CRM module 1942 can enable applications executed by such JAVA service instances to perform CRM functions of CRM module 1942 by making web service calls to CRM module 1942.

Hardware Overview

Figure 9:
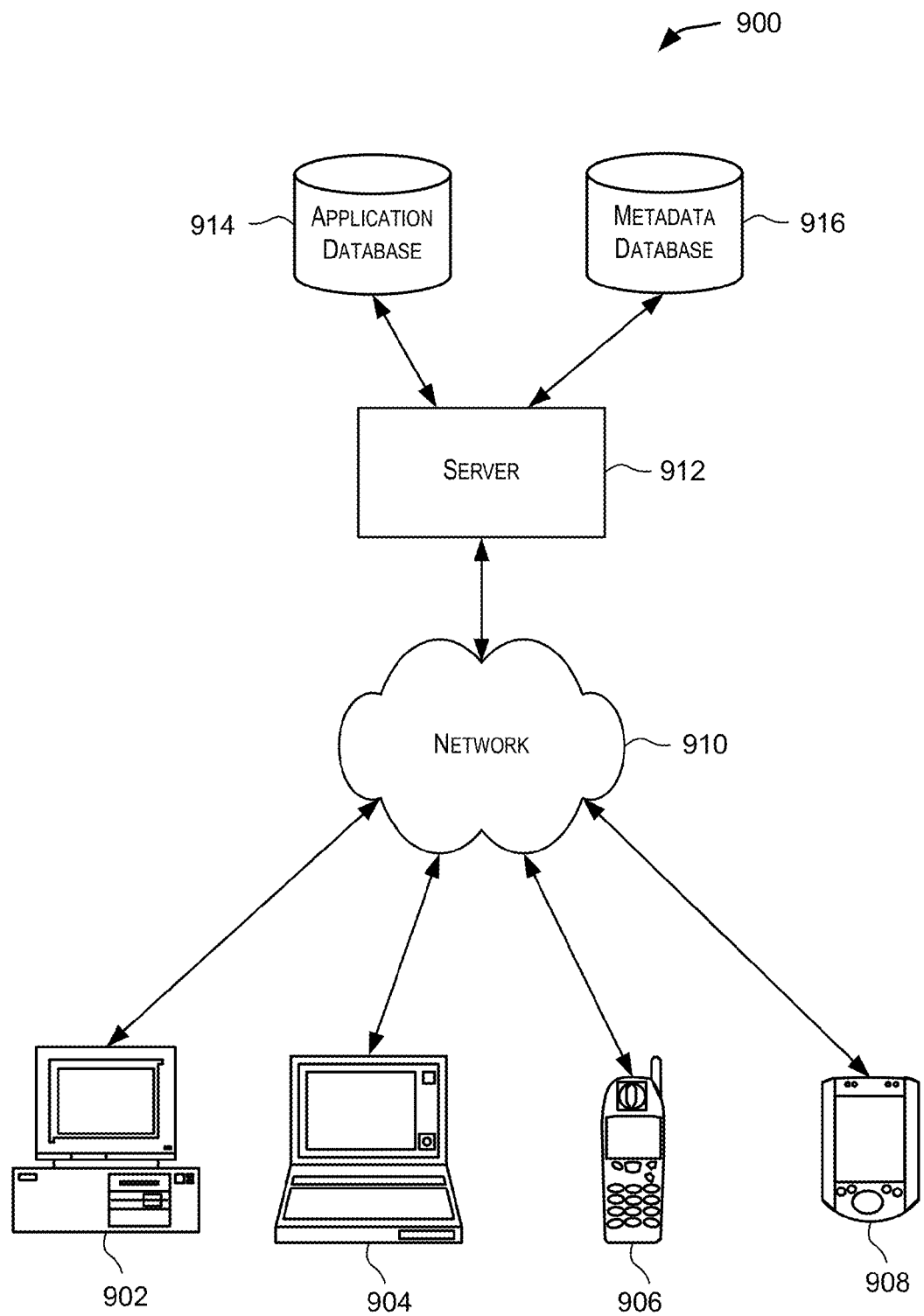
FIG. 9 is a simplified block diagram illustrating components of a system environment that may be used in accordance with an embodiment of the present invention.

FIG. 9 is a simplified block diagram illustrating components of a system environment 900 that may be used in accordance with an embodiment of the present invention. As shown, system environment 900 includes one or more client computing devices 902, 904, 906, 908, which are configured to operate client applications including native client applications and possibly other applications such as a web browser, or the like. In various embodiments, client computing devices 902, 904, 906, and 908 may interact with a server 912.

Client computing devices 902, 904, 906, 908 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 902, 904, 906, and 908 may be any other electronic device, such as a thin-client computer, Internet-enabled gaming system, and/or personal messaging device, capable of communicating over a network (e.g., network 910 described below). Although exemplary system environment 900 is shown with four client computing devices, any number of client computing devices may be supported. Other devices such as devices with sensors, etc. may interact with server 912.

System environment 900 may include a network 910. Network 910 may be any type of network familiar to those skilled in the art that can support data communications using any of a variety of commercially-available protocols, including without limitation TCP/IP, SNA, IPX, AppleTalk, and the like. Merely by way of example, network 910 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 900 also includes one or more server computers 912 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 912 may be adapted to run one or more services or software applications.

Server 912 may run an operating system including any of those discussed above, as well as any commercially available server operating system. Server 912 may also run any of a variety of additional server applications and/or mid-tier applications, including HTTP servers, FTP servers, CGI servers, JAVA servers, database servers, and the like. Exemplary database servers include without limitation those commercially available from Oracle, Microsoft, Sybase, IBM and the like.

System environment 900 may also include one or more databases 914, 916. Databases 914, 916 may reside in a variety of locations. By way of example, one or more of databases 914, 916 may reside on a non-transitory storage medium local to (and/or resident in) server 912. Alternatively, databases 914, 916 may be remote from server 912, and in communication with server 912 via a network-based or dedicated connection. In one set of embodiments, databases 914, 916 may reside in a storage-area network (SAN) familiar to those skilled in the art. Similarly, any necessary files for performing the functions attributed to server 912 may be stored locally on server 912 and/or remotely, as appropriate. In one set of embodiments, databases 914, 916 may include relational databases, such as databases provided by Oracle, that are adapted to store, update, and retrieve data in response to SQL-formatted commands.

Figure 10:
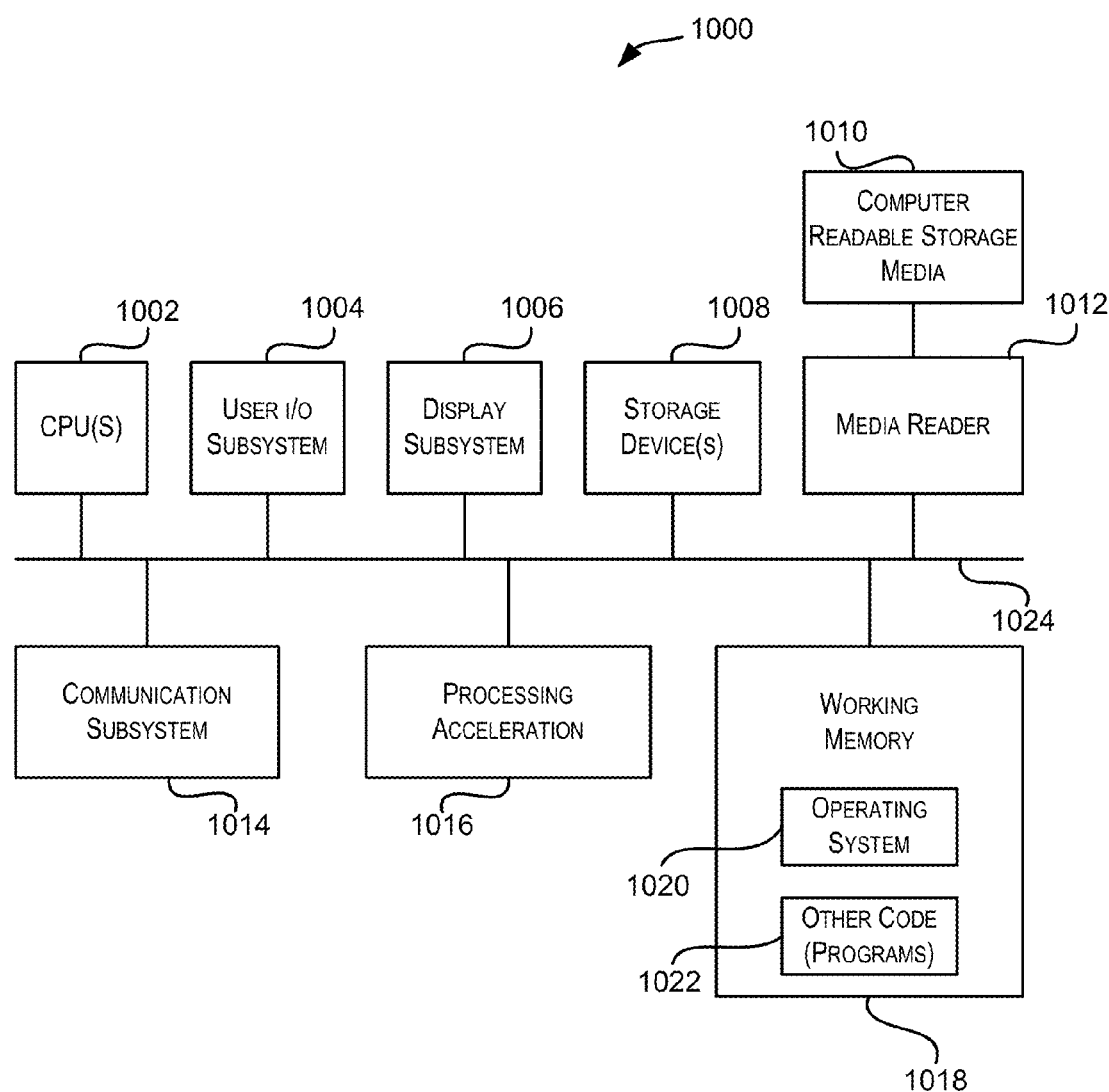
FIG. 10 is a simplified block diagram of a computer system that may be used in accordance with embodiments of the present invention.

FIG. 10 is a simplified block diagram of a computer system 1000 that may be used in accordance with embodiments of the present invention. For example server 912 or clients 902, 904, 906, or 908 may be implemented using a system such as system 1000. Computer system 1000 is shown comprising hardware elements that may be electrically coupled via a bus 1024. The hardware elements may include one or more central processing units (CPUs) 1002, one or more input devices 1004 (e.g., a mouse, a keyboard, etc.), and one or more output devices 1006 (e.g., a display device, a printer, etc.). Computer system 1000 may also include one or more storage devices 1008. By way of example, the storage device(s) 1008 may include devices such as disk drives, optical storage devices, and solid-state storage devices such as a random access memory (RAM) and/or a read-only memory (ROM), which can be programmable, flash-updateable and/or the like.

Computer system 1000 may additionally include a computer-readable storage media reader 1012, a communications subsystem 1014 (e.g., a modem, a network card (wireless or wired), an infra-red communication device, etc.), and working memory 1018, which may include RAM and ROM devices as described above. In some embodiments, computer system 1000 may also include a processing acceleration unit 1016, which can include a digital signal processor (DSP), a special-purpose processor, and/or the like.

Computer-readable storage media reader 1012 can further be connected to a computer-readable storage medium 1010, together (and, optionally, in combination with storage device(s) 1008) comprehensively representing remote, local, fixed, and/or removable storage devices plus storage media for temporarily and/or more permanently containing computer-readable information. Communications system 1014 may permit data to be exchanged with network 910 and/or any other computer described above with respect to system environment 900.

Computer system 1000 may also comprise software elements, shown as being currently located within working memory 1018, including an operating system 1020 and/or other code 1022, such as an application program (which may be a client application, Web browser, mid-tier application, RDBMS, etc.). In an exemplary embodiment, working memory 1018 may include executable code and associated data structures used for a multi-tenant cloud-based IDM system as described above. It should be appreciated that alternative embodiments of computer system 1000 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

What is claimed is:

1. A computer-implemented method comprising:
    storing, in a cloud computing environment, in a shared identity store in a shared identity management system used by multiple identity domains that are isolated from each other, identities of a plurality of users associated with different identity domains within the multiple identity domains;
    creating a first identity domain through the shared identity management system;
    associating a first plurality of services with the first identity domain;
    sharing, among the first plurality of services, identities of a first set of users from the plurality of users managed by the shared identity management system;
    creating, through the shared identity management system, a second identity domain that is isolated from the first identity;
    associating a second plurality of services with the second identity domain; and
    sharing, among the second plurality of services, identities of a second set of users from the plurality of users managed by the shared identity management system, wherein the second set of users is different from the first set of users;
    in response to a request to provision an instance of a particular service to the first or second identity domain of the multiple identity domains, selecting, from a plurality of different role hierarchy templates that are associated with different services, a particular role hierarchy template that was associated with the particular service prior to receiving the request; and
    in response to the request, creating, in the first or second identity domain, a role hierarchy to map the first or second set of users to specific roles based on the particular role hierarchy template.

2. The computer-implemented method of claim 1, further comprising:
    mapping, through the shared identity management system, (a) a first user of the first set of users to (b) first access permissions for a subset of the first plurality of services;
    mapping, through the shared identity management system, (c) a second user of the second set of users to (d) second access permissions for a subset of the second plurality of services.

3. The computer-implemented method of claim 1, further comprising:
    mapping, through the shared identity management system, (a) a first user of the first set of users to (b) a first role that is mapped to first access permissions for a subset of the first plurality of services;
    mapping, through the shared identity management system, (c) a second user of the second set of users to (d) a second role that is mapped to second access permissions for a subset of the second plurality of services.

4. The computer-implemented method of claim 1, further comprising:
    preventing users in the first set of users from performing operations relative to services that are in the second plurality of services but not in the first plurality of services;
    preventing users in the second set of users from performing operations relative to services that are in the first plurality of services but not in the second plurality of services;
    allowing operations users to perform operations relative to both services that are in the first plurality of services and services that are in the second plurality of services.

5. The computer-implemented method of claim 1, further comprising:
    storing the identities of the first set of users within a first partition of a lightweight access protocol (LDAP) directory that is partitioned by identity domain; and
    storing the identities of the second set of users within a second partition of the LDAP directory.

6. The computer-implemented method of claim 1, further comprising:
    presenting a user interface that includes a user interface element through which a particular user can identify, as a part of a login process, a particular identity domain to which the particular user is attempting to gain access.

7. The computer-implemented method of claim 1, further comprising:
    presenting a console that provides controls for adding user identities to and removing user identities from an identity domain;
    receiving a command through the console from an identity domain administrator;
    determining a particular identity domain to which the identity domain administrator belongs; and
    restricting user identity addition and removal operations performed by the identity domain administrator through the console to the particular identity domain.

8. The computer-implemented method of claim 1, further comprising:

assigning, to a first user of the first set of users, an identity domain administrator role that gives the first user a capability to assign, to other users in the first set of users, service administrator roles;

assigning, to a second user of the first set of users selected by the first user in an identity domain administrator capacity, a first service administrator role that gives the second user a capability to administer a first service of the first plurality of services; and assigning, to a third user of the first set of users selected by the first user in the identity domain administrator capacity, a second service administrator role that gives the third user a capability to administer a second service of the first plurality of services.

9. The computer-implemented method of claim 1, further comprising:

receiving, from a first person who does not have a user identity in the first identity domain, but who is associated with an account through which the first identity domain was purchased, an e-mail address of a second person who also does not have a user identity in the first identity domain;

receiving, from the first person, a role to which the first person is nominating the second person within the first identity domain;

sending, to the e-mail address of the second person, an e-mail message containing a hyperlink to a web-based form usable to create a user identity within the first identity domain;

adding an identity of the second person to the identities of the first set of users based on information that the second person supplied through the web-based form; and assigning the role to the second person within the first identity domain.

10. The computer-implemented method of claim 1, further comprising:

binding a particular service instance that is an instance of a service in the first plurality of services to a first partition of the shared identity store; and binding the particular service instance to a second partition of a policy store that stores policies for multiple service instances belonging to different identity domains defined in the cloud computing environment;

wherein the first partition contains only identities that belong to the first identity domain;

wherein the second partition contains only policies that pertain to the particular service instance.

11. The computer-implemented method of claim 1, wherein the plurality of different role hierarchy templates includes both:

a first role hierarchy template that is associated with a database service; and a second role hierarchy template, different from the first role hierarchy template, that is associated with a JAVA service.

12. A computer-readable storage memory device storing particular instructions capable of causing one or more processors to perform specified operations, the particular instructions comprising:

instructions to create a plurality of identity domains within a cloud computing environment;

instructions to enforce isolation between identity domains within the plurality of identity domains;

instructions to store, in the cloud computing environment, in a shared identity store in a shared identity management system used by multiple identity domains of the plurality of identity domains, identities of a plurality of users associated with different identity domains within the multiple identity domains;

instructions to add a service instance of a particular service to a particular identity domain of the plurality of identity domains;

instructions to store data associating the service instance with a particular partition of the shared identity store that stores identities for each identity domain of the multiple identity domains, wherein the identities for each identity domain of the multiple identity domains include identities of a different set of users from the plurality of users;

instructions to store data associating the service instance with a particular partition of a policy store that stores policies for a plurality of service instances that are associated with different identity domains of the plurality of identity domains;

instructions to select, from a plurality of different role hierarchy templates that are associated with different services, a particular role hierarchy template that was associated with the particular service prior to receipt of a request to provision the service instance of the particular service to the particular identity domain of the multiple identity domains; and instructions to create, in the particular identity domain, and in response to the request, a role hierarchy to map the set of users of the particular identity domain to specific roles based on the particular role hierarchy template.

13. The computer-readable storage memory device of claim 12, wherein the particular instructions further comprise:

instructions to assign a first role, from a hierarchy of roles, to a first user having a first user identity that is stored in the shared identity store and associated with the particular identity domain;

wherein the first role is a role that allows users having the first role to manage all service instances that are associated with the particular identity domain;

instructions to assign a second role, from the hierarchy of roles, to a second user having a second user identity that is stored in the shared identity store;

wherein the second role is a role that allows users having the second role to manage a single service instance that is associated with the particular identity domain.

14. The computer-readable storage memory device of claim 13, wherein the instructions to assign the second role to the second user comprise instructions to assign the second role to the second user in response to the first user delegating the second role to the second user.

15. The computer-readable storage memory device of claim 13, wherein the instructions to add the service instance to the particular identity domain of the plurality of identity domains comprise instructions to assign, to a third user having a third identity that is stored in the shared identity store and associated with the particular identity domain, a third role that is defined by a plurality of roles that are associated with a type of the service instance.

16. The computer-readable storage memory device of claim 15, wherein the particular instructions comprise instructions to cause the second role to inherit all permissions that are associated with the third role; and wherein the particular instructions comprise instructions to cause the first role to inherit all permissions that are inherited by the second role.

17. The computer-readable storage memory device of claim 12, wherein the instructions to create the plurality of identity domains within the cloud computing environment comprise instructions to create the particular identity domain within the cloud computing environment; and wherein the instructions to create the particular identity domain within the cloud computing environment comprise instructions to send, to a specified e-mail address, an e-mail message providing a mechanism whereby a recipient of the e-mail message can establish an administrative identity within the particular identity domain.

18. The computer-readable storage memory device of claim 12, wherein the plurality of different role hierarchy templates includes both:
- a first role hierarchy template that is associated with a database service; and
- a second role hierarchy template, different from the first role hierarchy template, that is associated with a JAVA service.

* * * * *